US008559789B2

(12) United States Patent
Tanaka et al.

(10) Patent No.: US 8,559,789 B2
(45) Date of Patent: Oct. 15, 2013

(54) REPRODUCING APPARATUS THAT USES CONTINUOUS MEMORY AREA

(75) Inventors: Keiichi Tanaka, Osaka (JP); Masahiro Oashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 1017 days.

(21) Appl. No.: 12/377,361

(22) PCT Filed: May 23, 2008

(86) PCT No.: PCT/JP2008/001297
§ 371 (c)(1),
(2), (4) Date: Feb. 12, 2009

(87) PCT Pub. No.: WO2008/149501
PCT Pub. Date: Dec. 11, 2008

(65) Prior Publication Data

US 2010/0034516 A1 Feb. 11, 2010

(30) Foreign Application Priority Data

Jun. 6, 2007 (JP) ................................ 2007-150592

(51) Int. Cl.
*H04N 9/80* (2006.01)

(52) U.S. Cl.
USPC ............................ 386/248; 386/240; 386/247

(58) Field of Classification Search
USPC .......................................... 386/240, 247, 248
See application file for complete search history.

(56) References Cited

U.S. PATENT DOCUMENTS 5,307,494 A 4/1994 Yasumatsu et al.
5,850,266 A * 12/1998 Gimby ......................... 348/558
6,118,924 A 9/2000 Nakatani et al.
6,285,827 B1 9/2001 Nakatani et al.
6,345,028 B1 * 2/2002 Jaeger ............................ 369/84
6,353,704 B1 3/2002 Nakatani et al.
6,370,325 B2 4/2002 Nakatani et al.
7,103,262 B2 9/2006 Nakatani et al.

(Continued)

FOREIGN PATENT DOCUMENTS

CN 1460367 12/2003
CN 1701607 11/2005

(Continued)

OTHER PUBLICATIONS

English language Abstract of JP 2007-128584 A.

(Continued)

*Primary Examiner* — Victor Lesniewski
(74) *Attorney, Agent, or Firm* — Greenblum & Bernstein, P.L.C.

(57) ABSTRACT

A playback device that creates a virtual package by combining a structural element recorded on a BD-ROM with an additional content recorded on a removable medium. The middleware in the playback device is provided with a file I/O module 34 that controls data input/output of the removable medium, in accordance with a request from an application program. When a BD-J application requests writing the structural element of the virtual package and the additional content to be written is an AV stream, the file I/O module 34 writes the structural element into one or more allocation units composed of a plurality of continuous empty logical blocks in the removable medium. When the additional content to be written is not an AV stream, it writes the additional content into a normal data area that is composed of a plurality of separately scattered empty blocks in the removable medium.

15 Claims, 40 Drawing Sheets

(56) References Cited

U.S. PATENT DOCUMENTS

| | | | | |
|---|---|---|---|---|
| 7,149,156 | B2 * | 12/2006 | Fujisawa | 369/30.05 |
| 7,290,013 | B2 * | 10/2007 | Doucette et al. | 707/823 |
| 7,536,420 | B2 * | 5/2009 | Takashima | 1/1 |
| 7,565,062 | B2 * | 7/2009 | Iwamoto et al. | 386/240 |
| 7,616,864 | B2 | 11/2009 | Tanaka et al. | |
| 7,639,923 | B2 * | 12/2009 | Ikeda et al. | 386/335 |
| 7,660,837 | B2 * | 2/2010 | Rajakarunanayake | 707/999.205 |
| 7,701,811 | B2 * | 4/2010 | Fujisawa | 369/30.05 |
| 7,782,719 | B2 * | 8/2010 | Fujisawa | 369/30.05 |
| 7,827,588 | B2 * | 11/2010 | Mukaide et al. | 725/141 |
| 7,840,115 | B2 | 11/2010 | Nakatani et al. | |
| 7,860,821 | B2 * | 12/2010 | Takakura et al. | 707/600 |
| 8,036,513 | B2 * | 10/2011 | Oashi et al. | 386/240 |
| 8,213,781 | B2 * | 7/2012 | Fujinami et al. | 386/355 |
| 8,285,115 | B2 * | 10/2012 | Ohizumi et al. | 386/248 |
| 2001/0043804 | A1 | 11/2001 | Nakatani et al. | |
| 2001/0043805 | A1 | 11/2001 | Nakatani et al. | |
| 2002/0194618 | A1 | 12/2002 | Okada et al. | |
| 2006/0098936 | A1 | 5/2006 | Ikeda et al. | |
| 2006/0257114 | A1 | 11/2006 | Nakatani et al. | |
| 2006/0280455 | A1 * | 12/2006 | Ando et al. | 386/95 |
| 2007/0041709 | A1 * | 2/2007 | Kim | 386/95 |
| 2007/0041710 | A1 * | 2/2007 | Kim | 386/95 |
| 2007/0041711 | A1 * | 2/2007 | Kim et al. | 386/95 |
| 2007/0041712 | A1 * | 2/2007 | Kim et al. | 386/95 |
| 2007/0041713 | A1 * | 2/2007 | Kim et al. | 386/95 |
| 2007/0086727 | A1 | 4/2007 | Tanaka et al. | |
| 2007/0136282 | A1 | 6/2007 | Takashima | |
| 2007/0223876 | A1 | 9/2007 | Hashimoto et al. | |
| 2007/0253679 | A1 | 11/2007 | Tanaka et al. | |
| 2007/0286575 | A1 | 12/2007 | Oashi et al. | |
| 2008/0031601 | A1 | 2/2008 | Hashimoto et al. | |
| 2008/0075419 | A1 | 3/2008 | Okubo et al. | |
| 2008/0145031 | A1 | 6/2008 | Tanaka et al. | |
| 2008/0285947 | A1 | 11/2008 | Hashimoto et al. | |
| 2009/0204825 | A1 | 8/2009 | Takashima | |
| 2010/0014580 | A1 | 1/2010 | Tanaka et al. | |
| 2010/0046747 | A1 | 2/2010 | Oashi et al. | |
| 2010/0046923 | A1 | 2/2010 | Ikeda et al. | |
| 2010/0046924 | A1 | 2/2010 | Ikeda et al. | |
| 2010/0142930 | A1 | 6/2010 | Tanaka et al. | |
| 2011/0026386 | A1 | 2/2011 | Nakatani et al. | |

FOREIGN PATENT DOCUMENTS

| | | | |
|---|---|---|---|
| EP | 0777392 | A2 * | 6/1997 |
| EP | 0905699 | | 3/1999 |
| EP | 1791121 | | 5/2007 |
| JP | 1041039 | | 2/1989 |
| JP | 2000-013728 | | 1/2000 |
| JP | 2000-339868 | A | 12/2000 |
| JP | 2004-178712 | A | 6/2004 |
| JP | 2006-033067 | A | 2/2006 |
| JP | 2006-109494 | A | 4/2006 |
| JP | 2007-020211 | A | 1/2007 |
| JP | 2007-128584 | A | 5/2007 |
| WO | 2004/030356 | A1 | 4/2004 |
| WO | 2006/009270 | | 1/2006 |
| WO | 2006/009305 | | 1/2006 |

OTHER PUBLICATIONS

English language Abstract of JP 2004-178712 A.
English language Abstract of JP 2000-339868 A.
English language Abstract of JP 2006-109494 A.
English language Abstract of JP 2007-020211 A.
English language Abstract of JP 2006-033067 A.
CCITT Recommendation X.509, "The Directory—Authentication Framework", issued from the International Telegraph and Telephone Consultative Committee, pp. 1-30 (Nov. 1988).
Extended European Search Report from EPO in European Patent Application No. 08751806.4, dated Sep. 4, 2012.
Notice of Granting Patent Right for Invention issued by PRC State Intellectual Property Office in Chinese Patent Application No. 200880000574.1, dated Jan. 8, 2013, together with an English language translation thereof.

* cited by examiner

Normal playback in HDMV mode

High-value added playback in BD-J mode

Merge management information(bumf.xml)

| Removable medium | Virtual package |
|---|---|
| 12345abc/12345678/90abcdef/12345678/90abcdef/00001.mpl | BDMV/PLAYLIST/00001.mpls |
| 12345abc/12345678/90abcdef/12345678/90abcdef/mo.bdm | BDMV/MovieObject.bdmv |
| 12345abc/12345678/90abcdef/12345678/90abcdef/00001.mts | BDMV/STREAM/00001.m2ts |

File path in 8.3 format — Alias file path in LFN format

FIG. 35

| PID value ranges | Streams to be assigned to ranges |
|---|---|
| 0x0100 | program_map |
| 0x1001 | PCR |
| 0x1011 | Primary video stream |
| 0x1100～0x111F | Primary audio stream |
| 0x1200～0x121F | PG stream |
| 0x1400～0x141F | IG stream |
| 0x1B00～0x1B1F | In_MUX_Secondary video stream |

FIG. 37

| PID value ranges | Streams to be assigned to ranges |
|---|---|
| 0x0100 | program_map |
| 0x1001 | PCR |
| 0x1200~0x121F | PG stream |
| 0x1400~0x141F | IG stream |
| 0x1800 | Text subtitle stream |
| 0x1A00~0x1A1F | Secondary audio stream |
| 0x1B00~0x1B1F | Secondary video stream |

REPRODUCING APPARATUS THAT USES CONTINUOUS MEMORY AREA

TECHNICAL FIELD

The present invention relates to a technical field of the virtual package.

BACKGROUND ART

The virtual package is a technology aimed to expand the contents of the read-only type recording medium, by creating a virtual package by dynamically combining data recorded on a read-only type recording medium such as BD-ROM, with data recorded on a rewritable recording medium such as a semiconductor memory card or a hard disk. In such technologies, for example, data recorded on a rewritable hard disk is updated such that a work recorded on a BD-ROM can be modified even after the BD-ROM is distributed. More specifically, a provider of movie works can distribute BD-ROMs recording therein copies of a movie work main body, and then can always promote the latest movie works other than this movie work, regardless of the timing of distributing the BD-ROMs, by providing a digital stream of previews of the latest movies via a network.

The technologies related to the virtual package include those recited in the following Patent Documents 1, 2, and 3.

Patent Document 1: Japanese Patent Application Publication No. 2006-109494

Patent Document 2: Japanese Patent Application Publication No. 2007-20211

Patent Document 3: Japanese Patent Application Publication No. 2006-33067

DISCLOSURE OF THE INVENTION

The Problems the Invention is Going to Solve

Meanwhile, when a rewritable recording medium is used for a long period as a medium for storing additional contents for creating virtual packages, a lot of additional contents are recorded on the rewritable recording medium. In general, the recorded additional contents are destined to be deleted later since the capacity of the rewritable recording medium is limited and it would be required to delete the existing data to create sufficient space to record a new content. When such deleting and recording are repeated in a rewritable recording medium, a "fragmentation" occurs. Here, the additional contents for creating virtual packages include AV streams with large size and non-AV streams with small size. Suppose that an additional content in the AV stream format is divided into smaller parts and the divided parts are stored separately in a plurality of scattered areas in a rewritable recording medium. Then, to read the AV stream, it is necessary to read the scattered parts to restore the original AV stream. In the reading of the scattered parts of the AV stream, the burst transfer should be performed a plurality of times to read data from the rewritable recording medium. In general, the execution of the burst transfer generates overheads such as setting the read destination address and issuing the command. Suppose here that the burst transfer needs to be performed a plurality of times to read the AV stream that is recorded in scattered recording areas. This should increase the number of settings of the read destination addresses and increase the overhead to such an extent that the influence of the overhead cannot be neglected.

When this happens, the performance of reading the AV stream is degraded and a problem of a jerky movement or the like appears in the playback.

One may consider that, to prevent the fragmentation from occurring, continuous areas having a certain capacity such as 4 MB may be allocated, and the additional content may be written into the allocated continuous areas. However, in reality, as the additional contents for creating virtual packages, the number of non-AV streams is overwhelmingly greater than the number of AV streams. In these circumstances, when continuous areas were allocated to record the additional contents, only part of the allocated areas would be used and a great amount of space would remain unused. This raises a problem that the storage capacity is not used efficiently.

It is therefore an object of the present invention to provide a playback device that can maintain the performance of reading additional contents in the AV stream format and use the storage capacity efficiently even if the structural elements of the virtual package are a mixture of additional contents of the AV stream format and the non-AV stream format.

Means to Solve the Problems

The above-described object is fulfilled by a playback device for playing back a virtual package, comprising: an obtaining unit operable to, when a first recording medium is loaded, obtain an additional content corresponding to the first recording medium from outside the device, in accordance with a request from an application; a control unit operable to write the obtained additional content onto a second recording medium having a plurality of empty blocks, in accordance with a request from the application; and a creating unit operable to create the virtual package by combining a content recorded on the first recording medium with the additional content recorded on the second recording medium, wherein the writing request is performed by passing a file path that is used for writing to the second recording medium, to the control unit, the file path that is used for writing to the second recording medium includes specification of a file name and an extension, the control unit judges whether or not the additional content to be written onto the second recording medium in accordance with the request from the application is an AV stream, by judging whether or not an extension of a file corresponding to the additional content to be written is an appropriate character sequence, when the additional content to be written is an AV stream, the control unit writes the additional content into a continuous area that is composed of a plurality of continuous empty blocks in the second recording medium, and when the additional content to be written is not an AV stream, the control unit writes the additional content into any of a plurality of separately scattered empty blocks in the second recording medium.

Effects of the Invention

1. Effects of the Means to Solve the Problems

With the above-described structure of the playback device, when the application requests an additional content to be written and the additional content to be written is an AV stream, the additional content is written into a continuous area that is composed of a plurality of continuous empty blocks in the second recording medium. Accordingly, the AV stream is written into the continuous area as one "cluster", and an additional content being a non-AV stream is written into any of empty blocks.

Since the AV stream is written into the continuous area as one "cluster", one burst transfer enables the AV stream to be read out from a rewritable recording medium to a memory. This minimizes the influence of the overhead caused by the burst transfer. Thus, when a low-speed magnetic recording medium such as a semiconductor memory card having a slow write rate is adopted as the second recording medium, there would be no change in the quality of the AV playbacks.

Also, since the additional content being a non-AV stream is written into any of empty blocks that have been generated by deleting recorded files, the fragmentation would occur with respect to the additional content being a non-AV stream. However, this does not extremely degrade the capacity efficiency of the second recording medium.

In this way, with the structure of the present invention, the quality of the AV playbacks is maintained when a virtual package is played back. This makes it possible for the content authors to positively distribute the contents that are played back from virtual packages.

2. Identifying Continuous Area

Further, the continuous area is allocated to each first recording medium that is making a pair with a second recording medium, when the virtual package is created. This makes it possible to restrict the occurrence of the fragmentation, which would occur as the recording and deletion of AV stream are repeated, to a local area. That is to say, the reduction in the recording efficiency, which is caused by the use of the continuous area for recording the AV streams, is restricted to a local area. Thus, in the second recording medium as a whole, a predetermined level of recording efficiency is maintained.

Also, since the additional content storage area is identified by a file path that includes the certificate identifier; the organization identifier, and the medium identifier, it is possible to allocate the continuous area to each organization that supplies the AV stream, and to each certificate used for authenticating the AV stream.

Also, with the above-described structure, it is possible to judge which first recording medium corresponds to the file recorded on the second recording medium, by referring to a file path that corresponds to the continuous area in the second recording medium. Therefore, even if various first recording mediums are loaded in the playback device, it is possible to restrict that a file access using a file path can be performed only when a first recording medium corresponding to the file path of the second recording medium is loaded in the playback device.

3. How to Determine Additional Content to be Written

In addition, even in the case where a file is to be recorded onto the second recording medium after an abbreviated file name and extension are assigned to the file, the control unit side can judge whether the file is an AV stream that should be written into the continuous area, by judging whether or not only the extension out of the abbreviated file name and extension is the predetermined character sequence. This makes it possible to correctly write the AV streams into the continuous area as far as the AV streams are observing the rule "the extension is a predetermined character sequence", while allowing the applications to freely assign file names and extensions.

With the above-described structure, each AV stream is written into the continuous area as far as the AV stream has a correct extension assigned thereto. This eliminates the need for applications to change the argument depending on the type of the second recording medium, regardless of whether a high-speed hard disk or a low-speed semiconductor memory card is adopted as the second recording medium. Accordingly, with this structure, developers of applications can write processing procedures of the applications more simply, and can get rid of unnecessary burdens.

With the above-described structure, when an AV stream has been recorded in a continuous area, other data are not written into the continuous area. In this way, the continuous area is used exclusively. This makes it possible to write or delete additional contents in units of continuous areas, establishing a rule "only one AV stream is recorded in one continuous area". This structure enables the fragmentation from occurring when an additional content is written into the continuous area.

6. Write Rate

When a semiconductor memory card is adopted as the second recording medium, the following problem should be taken into account. That is to say, in the semiconductor memory card, when it is necessary to write data into a block that stores other data, the existing data should be deleted first to make the block empty, and then the data is written into the block. In the EEPROM, which is called NAND type and is embedded in a great number of semiconductor memory cards, the process of emptying out the block needs to be performed onto a plurality of blocks at once. Thus, when the process of emptying out blocks is performed frequently, the write rate for writing AV streams is decreased extremely. It is accordingly preferable that the writing of the additional content by the control unit is either an additional writing or an overwriting; when writing the additional content onto the second recording medium, the control unit checks whether the writing requested by the application is the additional writing or the overwriting, by referring to management information in the file system of the 8.3 format; the additional writing includes a process of reading data from the second recording medium onto a memory and then deleting the data from the second recording medium, and a process of obtaining a new additional content by combining the additional content requested to be written with the data read onto the memory and then writing the new additional content into the continuous area; and the overwriting includes a process of deleting data from the second recording medium and then writing the additional content requested to be written into the continuous area.

With the above-described structure, in the overwriting or additional writing into the continuous area, recorded data is deleted in units of a plurality of continuous blocks. Thus, in the case of EEPROM that is called NAND type, the process of emptying out the block is performed onto a plurality of blocks at once. With this structure, the write rate for writing the AV streams is not decreased.

7. File Path Format

The following file path is preferable as the file path that is used by the application in writing an additional content. That is to say, in the second recording medium, a directory corresponding to a certificate identifier, a directory corresponding to an organization identifier, and a directory set corresponding to a medium identifier exist; the directory corresponding to an organization identifier is under the directory corresponding to a certificate identifier; the directory set corresponding to a medium identifier is under the directory corresponding to an organization identifier; the directory set corresponding to a medium identifier includes a plurality of sub-directories in hierarchical layers; and the additional content storage area corresponds to a sub-directory among the plurality of sub-directories that is in a lowest layer among the hierarchical layers.

In creating the virtual package, when an authentication is to be performed using the certificate identifier, organization identifier, and medium identifier assigned to the first recording medium, a file that strictly corresponds to these identifiers is recorded onto the second recording medium. Accordingly, even if a user has a lot of first recording mediums and frequently changes a recording medium to be inserted into the playback device among the first recording mediums, a file access is achieved correctly only when a correct first recording medium is inserted, with use of the file path of the first recording medium, and the virtual package is created.

8. Location of Continuous Area

It is preferable that the continuous area is arranged in the following manner. That is to say, the directory set corresponding to a medium identifier includes four sub-directories in hierarchical layers; a medium identifier assigned to the first recording medium is a character sequence composed of 32 or less characters; and each of the sub-directories constituting the directory set corresponding to a medium identifier has a directory name composed of eight or less characters, which is divided from the character sequence composed of 32 or less characters constituting the medium identifier.

With the above-described structure, even if the medium identifier of the first recording medium is long in bit length, the medium identifier of the first recording medium is associated with the directory on the second recording medium, without omitting meaningful characters among the characters constituting the identifier. Thus, the directory on the second recording medium is strictly associated with the medium identifier of the first recording medium.

BRIEF DESCRIPTION OF THE DRAWING

FIG. 35 shows a PID assignment map to the elementary streams recorded on the BD-ROM.

FIG. 37 shows a PID assignment map to the elementary streams multiplexed in an AV stream to be recorded into the additional content storage area.

DESCRIPTION OF CHARACTERS

Figure 1:
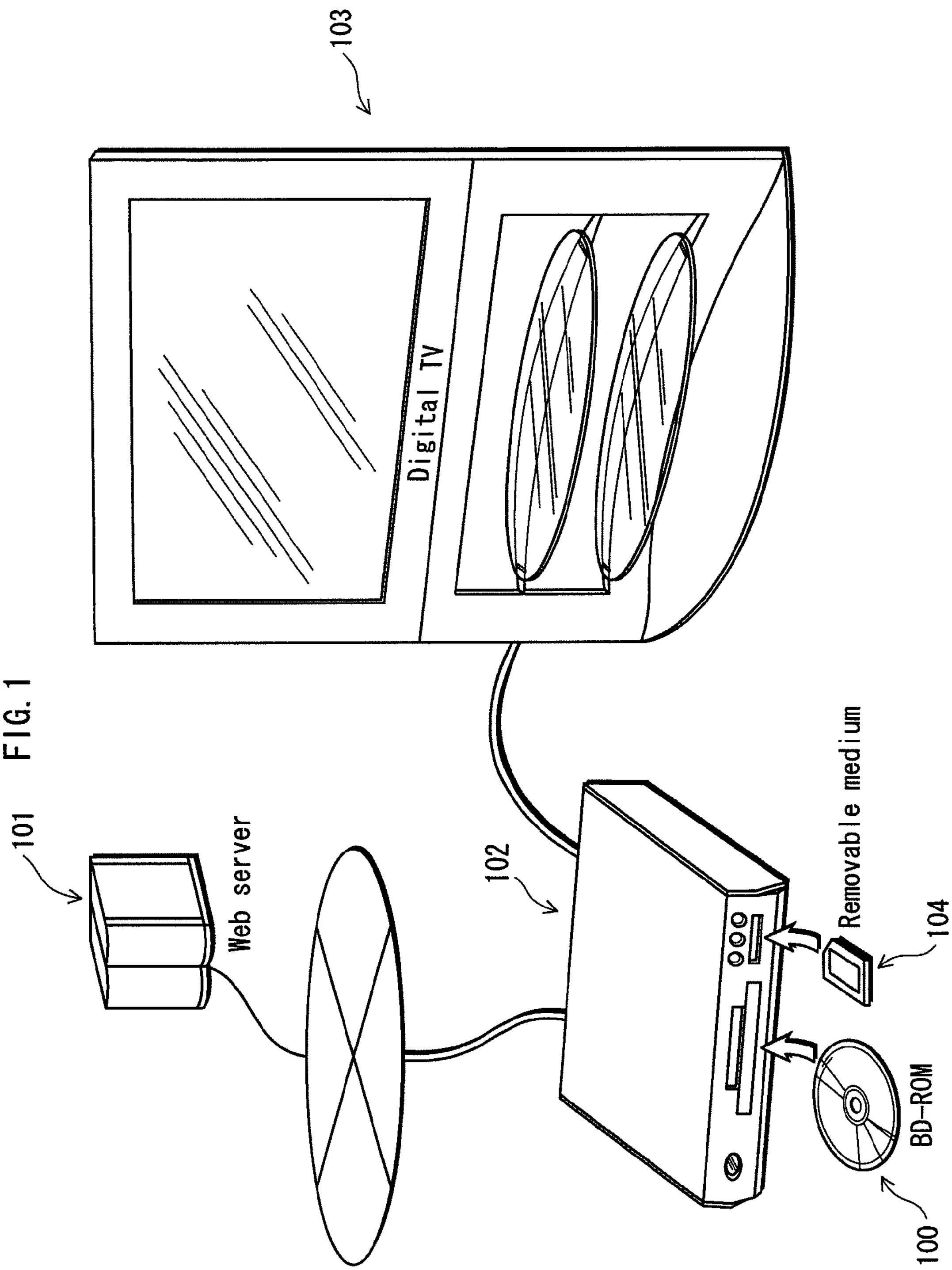
FIG. 1 is a system diagram of Embodiment 1.

100 BD-ROM
101 WWW server

102 playback device
103 television
104 removable medium
21 network interface
22 built-in medium
23 virtual file system
25 AV playback library
26 static scenario memory
27 dynamic scenario memory
28 HDMV module
29 BD-J module
30 UO detection module
31 mode management module
32 medium playback module
34 file I/O module
35 network module
36 application manager
37 Disc ID confirmation module
38 removable medium detection module
39 virtual file system management module

BEST MODE FOR CARRYING OUT THE INVENTION

Embodiment 1

The following describes an embodiment of the present invention with reference to the attached drawings.

In the following, an embodiment of a playback device will be described. First, among implementation forms of the playback device of the present invention, the use form will be described. FIG. 1 shows a use form of a playback device 102. As shown in FIG. 1, the playback device 102 is used by the user together with a BD-ROM 100 that is an example of a first recording medium, a WWW server 101, a television 103, and a removable medium 104 that is an example of a second recording medium.

The BD-ROM 100 is a recording medium on which a movie work is recorded.

The WWW server 101 is a server device that manages an official site of the movie distributor, and distributes a content (additional content) to the user via the Internet, where the content achieves a partial replacement or addition of the movie work recorded on the BD-ROM 100.

The playback device 102 constitutes a home theater together with the television 103 and plays back the BD-ROM 100.

The television 103 provides an interactive operation environment to the user by displaying the playback images of the movie work and displaying the menu or the like.

The removable medium 104 is attached to the playback device to be used as a storage for storing the content distributed from the WWW server 101 of the movie distributor. With this structure, a content that was downloaded into the removable medium 104 via the net can be combined with a content recorded on the BD-ROM 100, and thus the content recorded on the BD-ROM 100 can be expanded/updated. For the purpose of enabling the removable medium 104 to be attached thereto, the playback device 102 is provided with an insertion slot in which the removable medium 104 can be inserted, wherein the removable medium 104 may be an SD memory card, a memory stick, a Compact Flash™, a SmartMedia™, a multimedia card or the like.

Up to now, the use form of the playback device of the present invention has been described. Next, the recording medium, which is the target of playback of the playback device of the present invention will be described. The target of playback of the playback device of the present invention is the BD-ROM 100 which is an optical recording medium.

Figure 2:
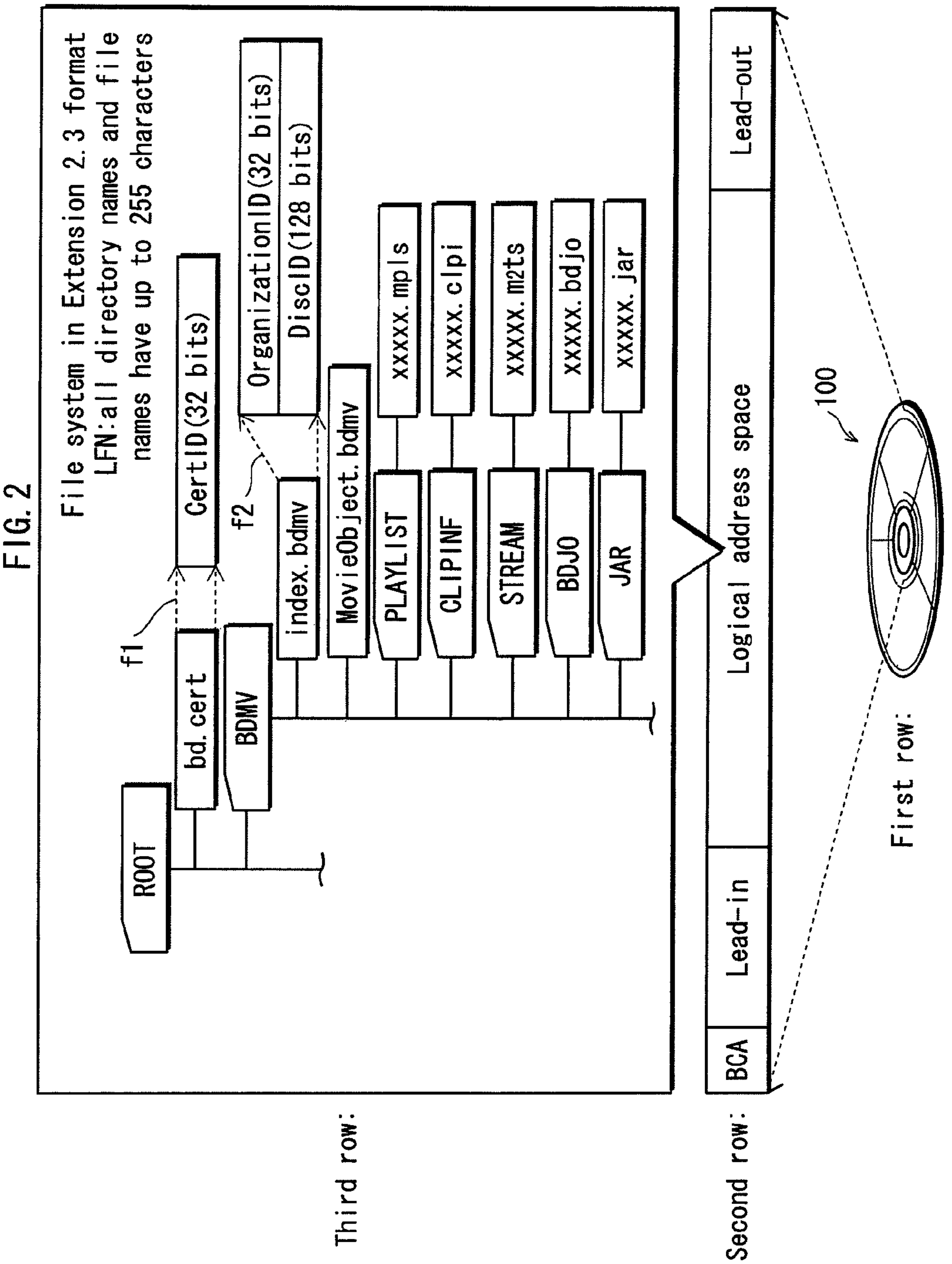
FIG. 2 shows the internal structure of the BD-ROM in Embodiment 1.

FIG. 2 shows the structure of the BD-ROM (hereinafter, also referred to as "BD"). In FIG. 2, the first row from bottom shows the BD-ROM 100, and the second row shows the recording area in a horizontally extended form, where, in the actuality, the recording area is formed spirally from the inner circumference to the outer circumference of the BD-ROM. As shown in the second row, the recording area includes a "lead-in" on the inner circumference side, a "lead-out" on the outer circumference side, and a "logical address space". Also, there is a special area inside the lead-in. The special area is called a BCA (Burst Cutting Area), and can only be read by the drive, but not by applications. Due to this structure, the BCA is often used for copyright protection technologies, for example.

The "logical address space" stores various types of data starting with the area management information for the file system. The "file system" is, for example, UDF or ISO9660. In the present embodiment, it is presumed that a file system in the Extension 2.3 format is adopted. The file system enables data recorded in the logical address space to be read out by the directory file structure. The location of the file in the file system can be identified by the file path information (referred to as "file path") that is composed of a directory name and a file name each of which is composed of 255 or less characters.

The third row of FIG. 2 shows the directory structure and file structure that have been built based on the file system shown in the second row. As shown in FIG. 2, bd.cert file and a BDMV directory are placed directly below a ROOT directory (ROOT) of the BD-ROM.

The bd.cert (fixed file name) is a certificate (hereinafter referred to as a merge certificate) to be used for a signature verification when a content added for a virtual package is merged with data on the BD-ROM. The merge certificate is a certificate that is used for authenticating the file (merge management information file) which stores merge management information of the BD-ROM. The merge certificate includes a public key publicized by the provider. The file format of the merge certificate may be, for example, X.509. The detailed specification of X.509 are recited in CCITT Recommendation X.509 (1988), "The Directory—Authentication Framework" issued from the International Telegraph and Telephone Consultative Committee. The lead line f1 in FIG. 2 indicates the usage of the bd.cert file. As indicated by this lead line, the bd.cert file is used for the purpose of extracting an ID (called "Cert ID") unique to the certificate.

The BDMV directory is a directory in which data that can be stored in the BD-ROM, such as AV contents and management information, are recorded. Under the BDMV directory, five sub directories (a PLAYLIST directory, a CLIPINF directory, a STREAM directory, a BDJA directory, and a JAR directory) exist. Also, two types of files (index.bdmv and MovieObject.bdmv) exist under the BDMV directory.

The STREAM directory stores files forming the main digital stream. Files with the extension "mt2s" (xxxxx.m2ts, where "xxxxx" is variable and extension "mt2s" is fixed) exist under the STREAM directory.

Files with the extension "mpls" (xxxxx.mpls, where "xxxxx" is variable and extension "mpls" is fixed) exist under the PLAYLIST directory.

Files with the extension "clpi" (xxxxx.clpi, where "xxxxx" is variable and extension "clpi" is fixed) exist under the CLIPINF directory.

Files with the extension "jar" (xxxxx.jar, where "xxxxx" is variable and extension "jar" is fixed) exist under the JAR directory.

Files with the extension "bdjo" (xxxxx.jar, where "xxxxx" is variable and extension "bdjo" is fixed) exist under the BDJO directory.

<Files with Extension "mt2s">

The files with the extension "m2ts" are digital AV streams in the MPEG-TS format ("TS" stands for Transport Stream) each of which is obtained by multiplexing a video stream, one or more audio streams and one or more graphics streams. The video stream represents the video part of the movie; the audio stream represents the audio part of the movie; and the graphics stream represents the subtitle of the movie.

The files with the extension "clpi" are management information called Clip information which correspond to the digital AV streams on a one-to-one basis. The Clip information, being management information, contains information such as the encoding format, frame rate, bit rate and resolution of the digital AV stream, and EP_map that indicates starting positions of GOPs.

<Files with Extension "mpls">

The files with the extension "mpls" store therein PlayList (PL) information. The PlayList information includes MainPath information, Subpath information, and PlayListMark information.

1) The MainPath information is information that defines a logical playback section by defining one or more combinations of In_Time and Out_Time which are time points on a playback time axis of an AV stream. The MainPath information includes a stream number table and STN_table, where the stream number table indicates which elementary streams among those multiplexed in the AV stream are validated to be played back, and the STN_table indicates which elementary streams among those multiplexed in the AV stream are permitted to be played back and which elementary streams are not permitted to be played back.

2) The PlayListMark information includes specification of a time point at which a chapter starts, within a part of the AV stream that is specified by a combination of In_Time and Out_Time.

3) The Subpath information includes specification of an elementary stream that is to be played back in synchronization with the AV stream, and one or more combination of In_Time and Out_Time which are time points on a playback time axis of the elementary stream. An AV playback is started when a Java™ application instructs a Java™ virtual machine to generate a JMF player instance for playing back the piece of PlayList information. The JMF player instance is actual data that is generated on a heap memory of the virtual machine based on the JMF player class.

The combination of the AV stream and the PlayList information constitutes a playback unit called "Title". The AV playback in the BD-ROM is performed in the unit of Title.

<Files with Extension "jar">

The files with the extension "jar" are Java™ archive files in which exist class files of Java™ applications for performing dynamic scenario control using the Java™ virtual machine. The Java™ applications defined by the class files are Java™ Xlets that are controlled via an Xlet interface. The Xlet interface provides four states: "loaded", "paused", "active", and "destroyed". The applications mentioned in the present description are instances for class files recorded on a recording medium such as BD-ROM.

<Files with Extension "bdjo">

The files with the extension "bdjo" are files storing BD-J Objects. The BD-J Object is information that defines a Title by a relationship between an AV stream indicated by the PlayList information and an application. The BD-J Object includes "application management table" and a list of PlayLists that can be played back in the Title. The application management table (AMT) is a table that is used to achieve "application signaling", where the application signaling is a control that manages the "Title" in the BD-ROM as a life cycle of the application and takes charge of the start and end of the application. It should be noted here that the life cycle means a cycle during which an application lives on the heap memory of the virtual machine on a time axis of the entire content recorded on the BD-ROM. Here, the term "live" refers to the state where the application has been read out onto the heap memory such that the application can be executed by the virtual machine. The application management table indicates an application whose life cycle is the Title by showing the identifier of the application (application ID) and the IDs of the Java™ archive files that belong to the application. That is to say, one application is constituted by one or more Java™ archive files.

A Java™ application whose sectors are managed by the application management table in the BD-J Object is called a "BD-J application".

<index.bdmv (Fixed File Name)>

The index.bdmv (fixed file name) is management information regarding the BD-ROM as a whole. After a BD-ROM is inserted into the playback device, the index.bdmv is read first so that the disc is recognized uniquely by the playback device. In addition to this, the index.bdmv includes a table that shows relationships between a plurality of playable Titles in the BD-ROM and BD-J Objects respectively defining the playable Titles. The lead line f2 in FIG. 2 indicates the close-up of the internal structure of index.bdmv. As indicated by the lead line f2, the index.bdmv includes information such as: an Organization ID (32 bits) that is an identifier of the provider of the movie work; and a Disc ID (128 bits) that is an identifier uniquely assigned to the BD-ROM provided by the provider.

<MovieObject.bdmv (Fixed File Name)>

The MovieObject.bdmv (fixed file name) includes a scenario program in which a scenario is written, the scenario being used to dynamically change the progress of the playback of each Title when it is played back in the HDMV mode (which will be described later).

<Layer for Playback Control>

Next, the layer model for the playback control based on which the BD-ROM is structured will be described.

Figure 3:
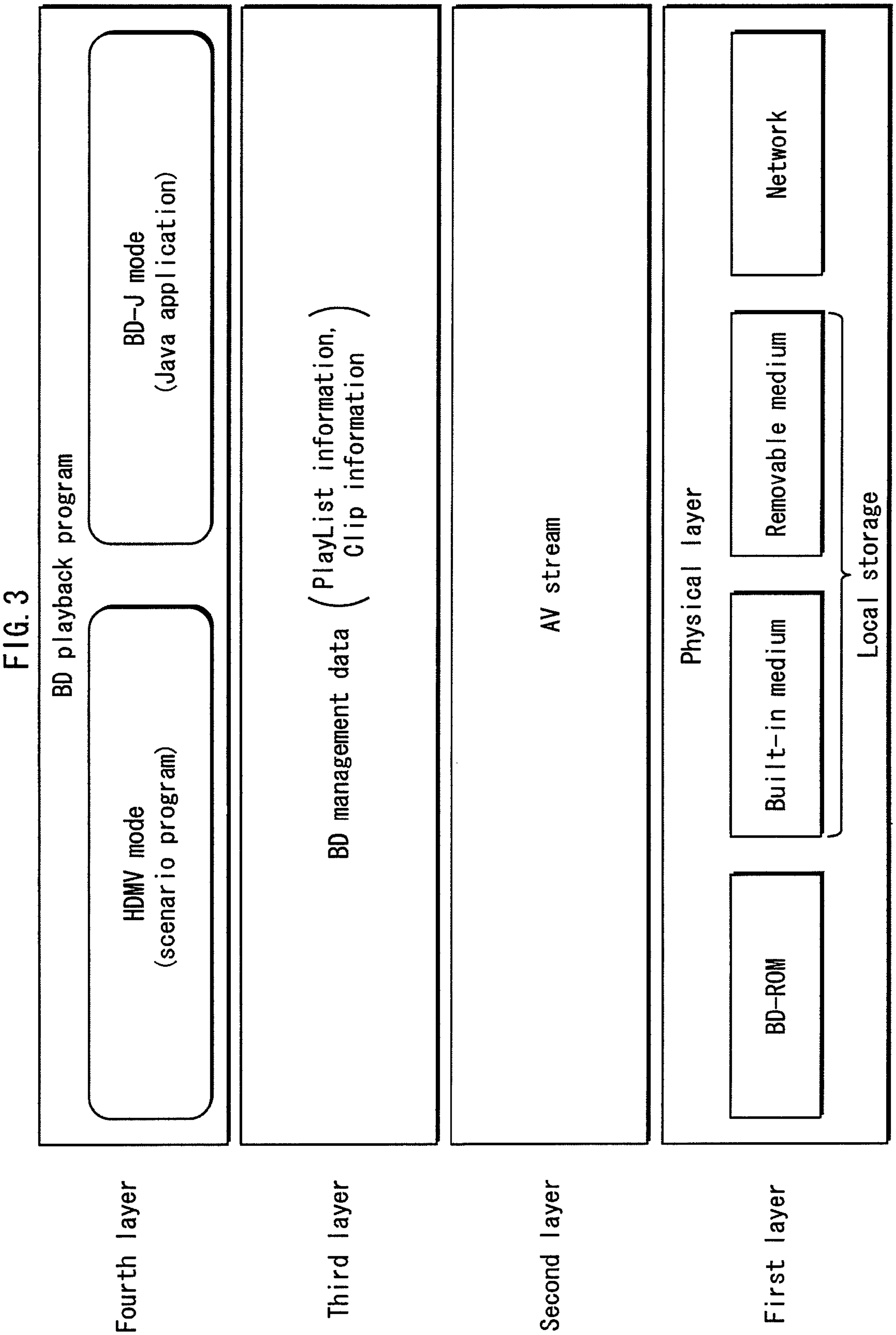
FIG. 3 shows a layer model of the software targeted by the BD-ROM in Embodiment 1.

FIG. 3 shows a layer model for the playback control. The first layer from bottom of FIG. 3 shows a physical layer that controls supply of the substantial body of the stream to be processed. As shown in the first layer, in addition to the BD-ROM, there are various recording mediums and communication mediums such as a built-in medium, a removable medium, and a network that can be the supply sources. Here, the built-in medium means a recording medium that is preliminarily built in the playback device 102, such as HDD (Hard Disk Drive) and EEPROM (non-volatile memory). The removable medium means a portable recording medium such as an SD memory card, a memory stick, a Compact Flash™, a SmartMedia™, and a multimedia card. The built-in mediums and the removable mediums are recording mediums that are used locally by the playback device 102, and are generically called "local storages". The control achieved by the first layer is a control (disk access, card access, network communication) on the supply sources such as the local storages and the network. As described above, a local storage may be a built-in medium or a removable medium. The following description is based on the presumption that the first recording medium is a BD-ROM and the second recording medium is a removable medium.

The second layer is a layer of the AV stream. The second layer defines what decoding method is used to decode the stream supplied by the first layer.

The third layer (BD management data) is a layer that defines a static scenario of the stream. The static scenario includes the PlayList information and the Clip information that are preliminarily defined by the content author. The third layer defines a playback control based these information.

The fourth layer (BD playback program) is a layer that defines a dynamic scenario of the stream. The dynamic scenario is a program that executes at least one of: a playback procedure of the AV stream; and a control procedure regarding the playback. The playback control by the dynamic scenario varies depending on the user operation made onto the device, and has a characteristic of a program. The dynamic playback control here has two modes. One of the modes is an HDMV mode in which the AV stream recorded on the BD-ROM is played back in a command-based operation environment. The other is a BD-J mode in which the AV stream recorded on the BD-ROM is played back in a program-based operation environment, with use of a program written in an object-oriented language. In FIG. 3, the two modes, the HDMV mode and the BD-J mode, are shown in the fourth layer. In the HDMV mode, the playback is performed in a DVD-like playback environment. In the BD-J mode, a Java™ virtual machine, as the main body, performs a playback control from a Java™ application.

Figure 4A:
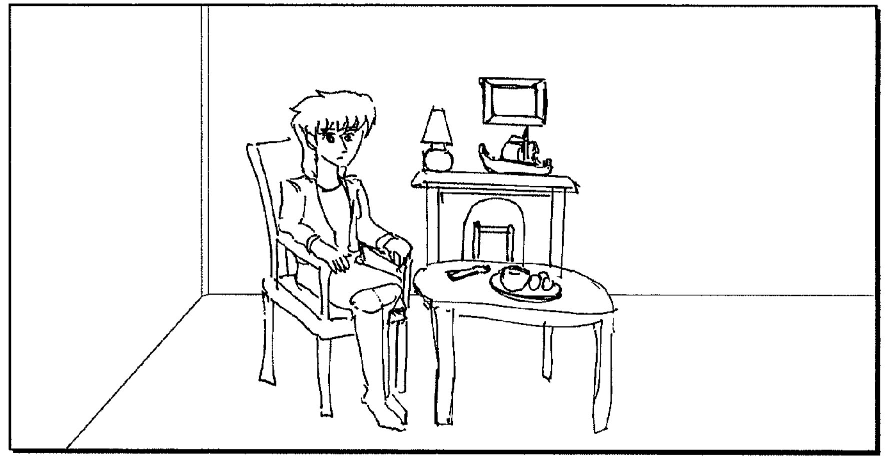
FIGS. 4A and 4B show a movie work created by the dynamic playback control in two modes in Embodiment 1.
Figure 4B:
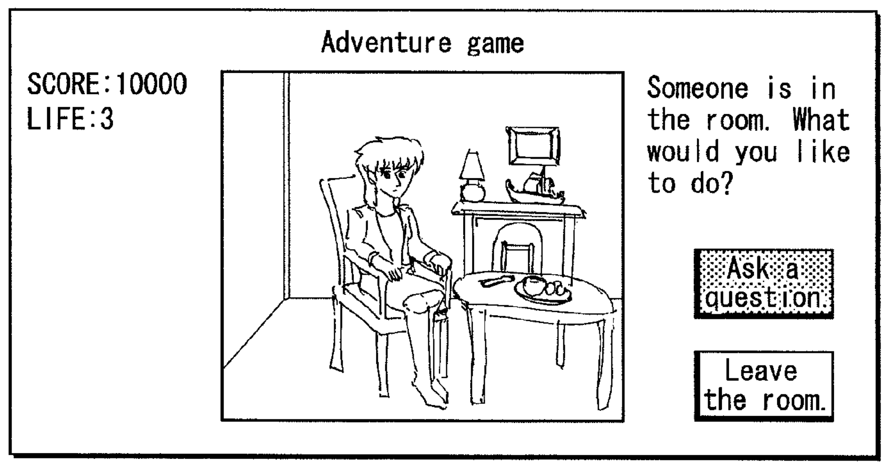

FIGS. 4A and 4B show a movie work created by the dynamic playback control in two modes. FIG. 4A shows a scene of the movie work that is created by defining the dynamic playback control in the HDMV mode. In the HDMV mode, it is possible to write the playback control using commands that resemble the commands that can be interpreted by the DVD playback device, and thus it is possible to define a playback control in which the playback progresses with selections made on the menu.

FIG. 4B shows a scene of the movie work that is created by defining the dynamic playback control in the BD-J mode. In the BD-J mode, it is possible to write the control procedure in a Java™ language that can be interpreted by the Java™ virtual machine. Suppose here that the playback control constitutes a GUI for an adventure game, then, in the BD-J mode, it is possible to present, to the user, a composite image which is composed of, for example, a video image, a score of the game ("SCORE:10000" in the drawing), an indicator ("LIFE:3"), and buttons ("ASK" and "LEAVE").

Up to now, the BD-ROM 100 has been described. In the following, the playback device 102 will be described in detail.

Figure 5:
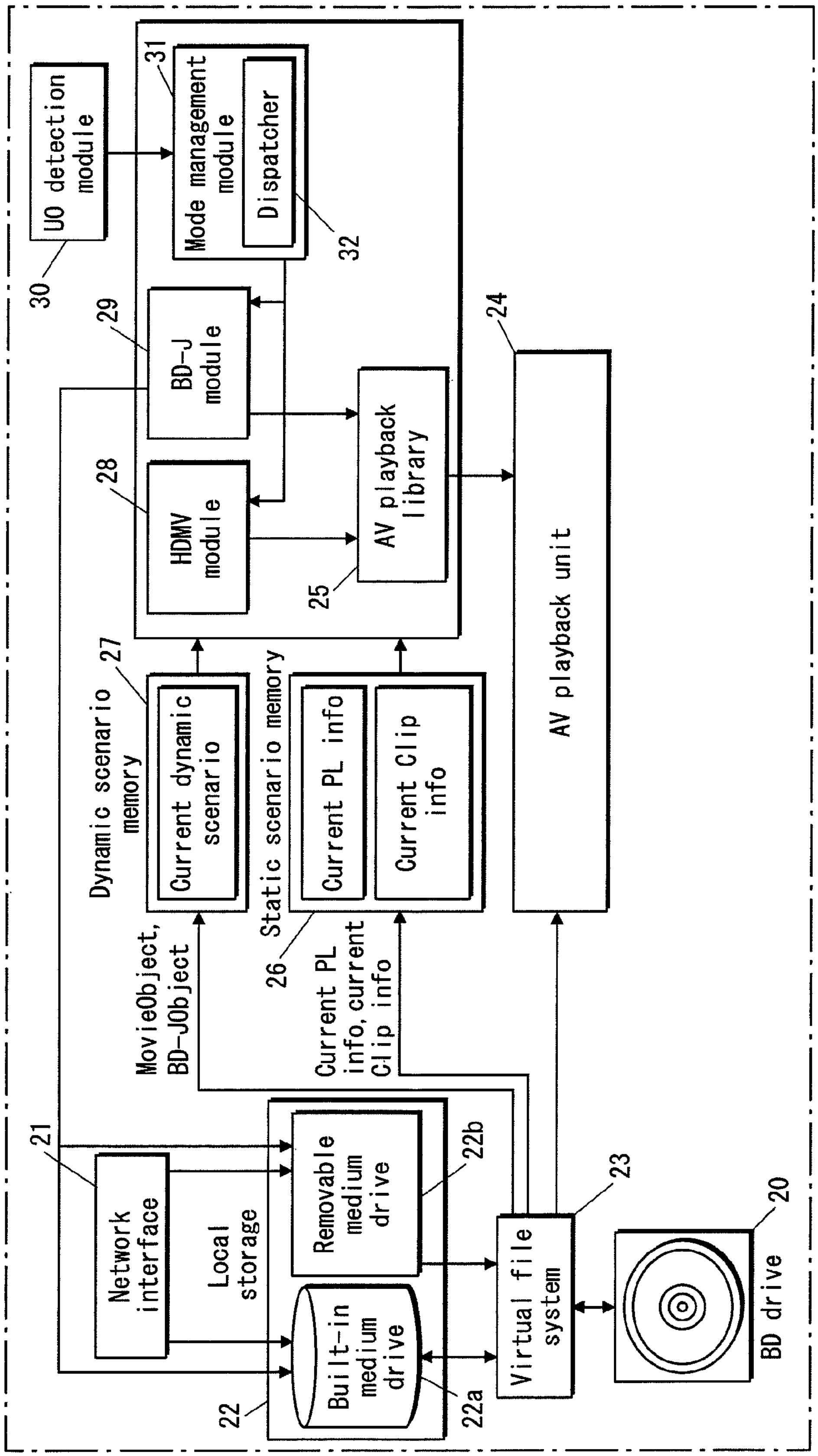
FIG. 5 shows the internal structure of the playback device in Embodiment 1.

FIG. 5 is a block diagram that roughly shows a structure of the playback device. As shown in FIG. 5, the playback device 102 includes a BD drive 20, a network interface 21, a local storage 22, a virtual file system 23, a static scenario memory 26, a dynamic scenario memory 27, an HDMV module 28, a BD-J module 29, a UO detection module 30, a mode management module 31, and a dispatcher 32. Note that in the present playback device, Linux is adopted as the operating system, and the hardware and the software of the playback device are controlled via Linux.

<BD Drive 20>

The BD drive 20 performs loading/ejecting of the BD-ROM onto and from the playback device, and performs accesses to the BD-ROM. Since the operating system of the present BD-ROM playback device is Linux, a command "/mount point BD/BDAV" is issued to assign the BDAV directory to the BD drive 20.

<Network Interface 21>

The network interface 21 executes a protocol stack for the network connection. The network interface 21 causes the playback device to recognize the drive provided in the server computer on the network, as the network drive. The network interface 21 performs downloading and uploading data via the network drive. The network interface 21 is used to download a BD-ROM additional content publicized on the Internet. The BD-ROM additional content means a content that is not present in the original BD-ROM, and is, for example, sub-audio, a subtitle, a special-feature image, or an application. The BD-J module 29 can download an additional content publicized on the Internet onto a built-in medium drive or the removable medium 104 by controlling the network interface 21.

<Local Storage 22>

The local storage 22 is composed of a built-in medium drive 22*a* and a removable medium drive 22*b*, and stores downloaded additional contents, data to be used by the application and the like. The area for storing additional contents is divided for each BD-ROM, and the area for storing data to be used by the application is divided for each application. The local storage 22 also stores merge management information that includes description of rules for merging a downloaded additional content with data on the BD-ROM, the rules referred to as merge rules.

In the present embodiment, the BUDA directory is assigned to the removable medium 104 having been inserted in the removable medium drive, where the BUDA directory is a directory for storing additional content data files. As described before, the operating system of the present BD-ROM playback device is Linux. Accordingly, when the removable medium drive 22*b* is an SD memory card drive, and a drive name "SD" has been assigned to the removable medium drive 22*b*, a command "/mount point SD/BUDA" is issued to assign the BUDA directory to the SD drive corresponding to the removable medium. On the other hand, the built-in medium drive 22*a* is used as a recording area for recording images.

<Virtual File System 23>

The virtual file system 23 constructs a virtual BD-ROM (virtual package) by merging an additional content, which has been stored in the built-in medium or the removable medium, with a content recorded on the BD-ROM, based on the merge management information downloaded into the local storage 22 together with the additional content. The HDMV module 28 and the BD-J module 29 can refer to both the virtual package and the original BD-ROM in the same manner. When the virtual package is played back, the playback device performs a playback control using both of the data on the BD-ROM and the data on the built-in medium or the removable medium. This completes description of the constitutional elements of the playback device.

<AV Playback Unit 24>

The AV playback unit 24 plays back the AV stream recorded on the BD-ROM or the local storage 22, based on the PlayList information and the Clip information.

<AV Playback Library 25>

The AV playback library 25 executes the AV playback function or the PlayList playback function, when it receives a function call from the HDMV module 28 or the BD-J module 29. The AV playback function includes functions succeeded from DVD players and CD players, such as the playback start, playback stop, pause, release of pause, release of still picture function, fast-forward at speed specified by immediate value, rewind at speed specified by immediate value, audio switch, subtitle switch, and angle switch. The PlayList playback function includes some of these AV playback functions, such as the playback start and playback stop, where the PlayList playback functions are performed based on the PlayList information.

<Static Scenario Memory 26>

The static scenario memory 26 is a memory for storing a current PL and current Clip information. The current PL is a piece of PlayList information that is the current target of processing, among a plurality of pieces of PlayList information recorded on the local storage 22. The current Clip information is a piece of Clip information that is the current target of processing, among a plurality of pieces of Clip information recorded on the local storage 22.

<Dynamic Scenario Memory 27>

The dynamic scenario memory 27 is a memory in which the current dynamic scenario is preliminarily stored. The dynamic scenario memory 27 is subjected to processes performed by the HDMV module 28 and the BD-J module 29. The current dynamic scenario is a Movie object or a BD-J object that is the current target of execution, among the Movie objects and BD-J objects recorded on the local storage 22.

<HDMV Module 28>

The HDMV module 28 is a DVD virtual player that mainly executes in the HDMV mode, and executes the current scenario program read onto the dynamic scenario memory 27.

<BD-J Module 29>

The BD-J module 29 is a Java™ platform, and is composed of a Java™ virtual machine, configuration, and profile. The BD-J module 29 generates the current Java™ object by generating a Java™ byte code from a Java™ class file read out onto the dynamic scenario memory 27, and executes the generated current Java™ object. The Java™ virtual machine converts a Java™ object written in the Java™ language, into the native code for the CPU of the playback device.

<UO Detection Module 30>

The UO detection module 30 detect a user operation having been input via an input device such as a remote control or a front panel of the playback device, and notifies the mode management module 31 of the detected user operation. This notification is made as the UO detection module 30 generates a UO (User Operation) in accordance with an interrupt generated by an interrupt handler provided in a device driver corresponding to the input device in concern, and outputs the generated UO to the mode management module 31. The UO is an event (UO event) that occurs when a key included in a key matrix provided on a remote control or a front panel is depressed and the depression of the key is detected. The UO includes a key code corresponding to the depressed key. More specifically, when the interrupt handler provided in the device driver corresponding to the remote control or the front panel detects a depression of a key by a key sense for the key matrix, the interrupt handler generates an interrupt signal based on the key depression. With the generation of the interrupt signal, the UO event is generated.

<Mode Management Module 31>

The mode management module 31 holds the index.bdmv read out from the BD-ROM or the local storage 22, and performs a mode management and a branch control. The mode management by the mode management module 31 is an assignment of a module, namely, an assignment of the HDMV module 28 or the BD-J module 29 that is to execute the dynamic scenario.

<Dispatcher 32>

The dispatcher 32 selects one or more UOs appropriate for the current mode of the playback device, among the plurality of available UOs, and hands out the selected UOs to the module that is executing the current mode. For example, when UOs such as upward, downward, leftward, and rightward, and activate operations are received during the execution of the HDMV mode, the dispatcher 32 outputs these UOs to the module that is executing the HDMV mode.

<Removable Media>

The following describes the removable medium.

In the present embodiment, the SD memory card is adopted as a removable medium for storing additional content data files.

The SD memory card is a card-type recording medium of a stamp size, namely, it is 32.0 mm long, 24.0 mm wide, and 2.1 mm deep. Users can hold the SD memory card with the fingertips. The SD memory card is provided with nine connectors for the connection with the playback device. The SD memory card is also provided with a protect switch at its side, where the operator can set, using the protect switch, whether to permit or prohibit overwriting of the storage contents. The SD memory card includes "nonvolatile memory", "access control unit", and "work memory", where the "nonvolatile memory" is a NAND-type EEPROM, the "access control unit" performs data writing, reading and delete to/from the nonvolatile memory in accordance with commands issued from the playback device, and the "work memory" is used to temporarily store data having been read out from the nonvolatile memory when the data is rewritten.

The SD memory card may adopt FAT16 or FAT32. With the FAT16, an entry length of 16 bits is assigned per cluster, and the access target is a 2 G-byte recording area. With the FAT32, an entry length of 32 bits is assigned per cluster, and the access target is a 32 G-byte recording area. The SD memory card adopting FAT32 is especially called "SDHC memory card".

The following describes the removable medium.

Figure 6:
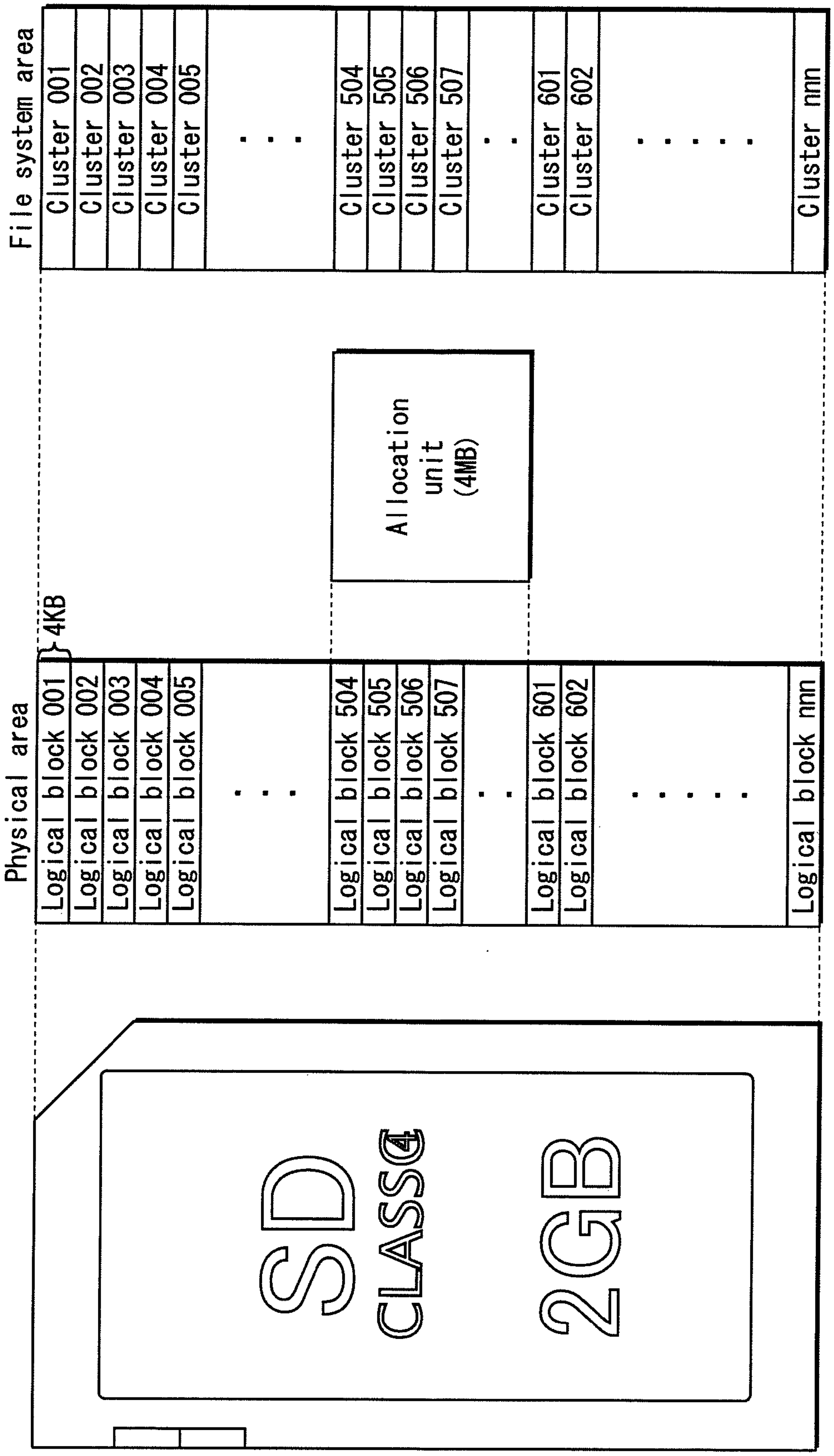
FIG. 6 shows the internal structure of the SD memory card that is a removable medium.

FIG. 6 shows the physical structure of the recording areas in the semiconductor memory.

The left-hand side of FIG. 6 shows an outer appearance of the SD memory card as the removable medium.

The middle part of FIG. 6 shows the physical structure of the SD memory card as the removable medium. Regardless of the built-in medium or the removable medium, the local storage is composed of a plurality of logical blocks. When a file is written in a normal mode, the recording or deletion is performed in units of logical blocks. Due to this structure, a plurality of pieces of file data cannot be stored into a logical block. That is to say, when a logical block is used to store a file whose size is smaller than the size of the logical block, the logical block is dedicated to the file and data of other files cannot be written into the logical block.

The right-hand side of FIG. 6 shows the internal structure of the file system area of the SD memory card. In the file system area of the SD memory card, one logical block is treated as one cluster, and the cluster is used as the minimum unit when recording or deletion of a file is performed.

The middle part of FIG. 6 indicates that 1,000 pieces of physically continuous logical blocks are allocated as one allocation unit. The allocation unit is a unit used to guarantee the speed of writing data onto the SD memory card. In general, the allocation unit in the SD memory card has the size of 4 MB.

<Normal Data Area, Continuous Data Area>

Figure 7:
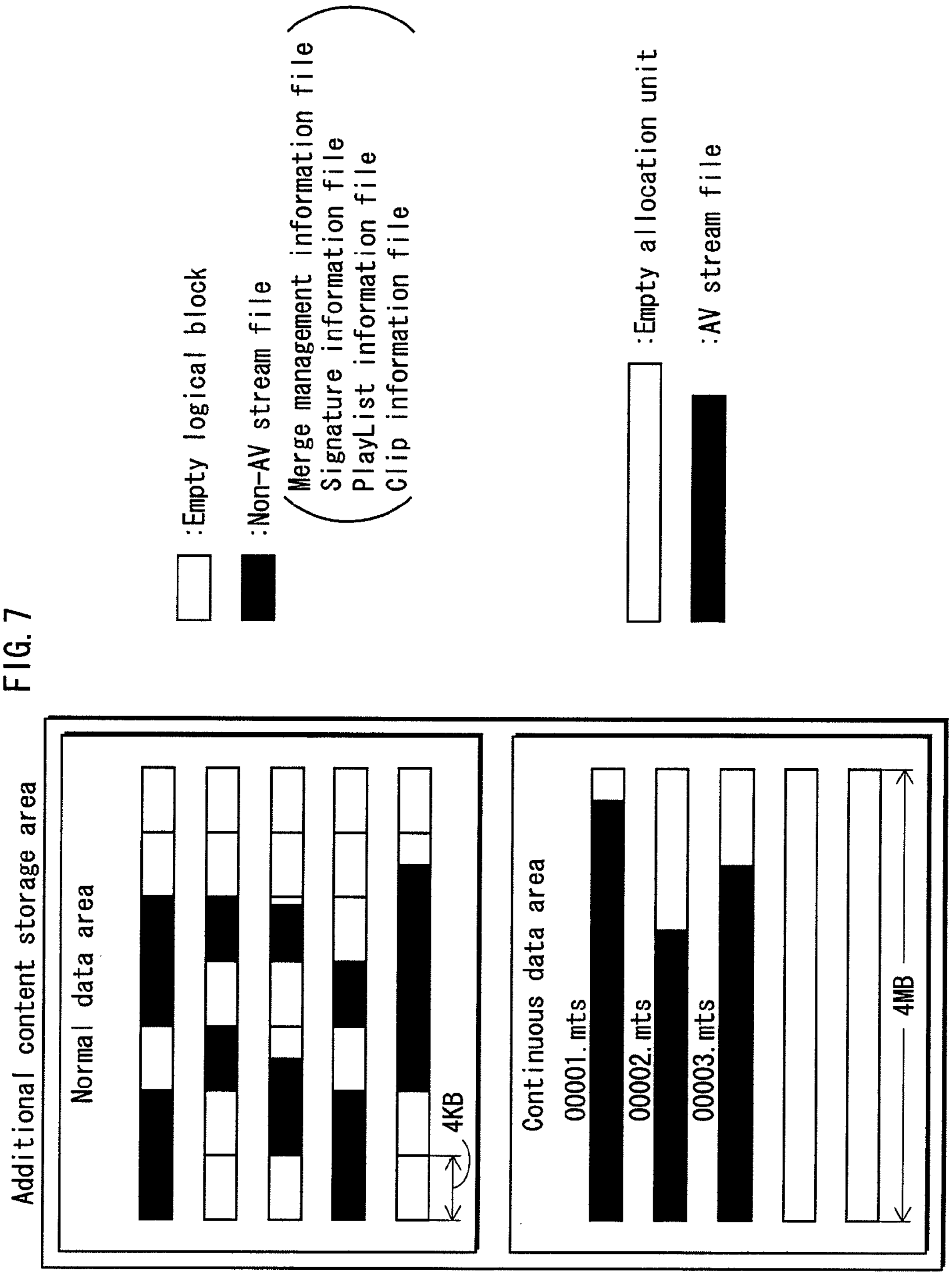
FIG. 7 shows one example of a pair of a normal data area and a continuous data area.

The former recording area in which data is recorded in units of logical blocks is called "normal data area". The latter recording area in which data is recorded in units of allocation units is called "continuous data area". The additional content storage area invariably has a pair of a normal data area and a continuous data area. FIG. 7 shows one example of a pair of a normal data area and a continuous data area. The upper part of FIG. 7 shows the internal structure of the normal data area, and the lower part of FIG. 7 shows the internal structure of the continuous data area.

Each small box included in the normal data area shown in the upper part of the drawing schematically represents a logical block. Of these boxes, outline boxes represent empty logical blocks, and the blacked out boxes represent logical blocks that are recorded with data in part or in whole. The data to be recorded in the logical blocks include "merge management information file", "signature information file", "PlayList information file", and "Clip information file". Since the recording and deletion are performed in small units, as the recording and deletion are repeated, unused logical blocks come to exist in scattered positions such that data of one file are recorded in scattered logical blocks. This phenomenon where data constituting a file are recorded in a scattered manner is called "fragmentation". When reading such data that have been recorded in a scattered manner, the reading performance is deteriorated because a seek for a jump destination block occurs. Especially, when an additional content in the AV stream format, for which real-time reading performance is required, is recorded in this way, a problem of a jerky movement or the like appears in the playback since the additional contents in the AV stream format necessary for the playback cannot be read timely. To read out the additional contents in the AV stream format smoothly, it is preferable that the additional contents in the AV stream format are written into continuous logical blocks. However, in the normal data area, since the fragmentation occurs over a wide area, it is difficult to secure continuous logical blocks which are suitable for recording the additional contents in the AV stream format.

When there are a lot of small-size files, there would be a lot of wasteful empty areas. However, each logical block is sufficiently smaller than a general file size. Thus, when the small-size files are recorded in the normal data area, the storage capacity can be consumed efficiently.

Each long box included in the continuous data area shown in the lower part of FIG. 7 schematically represents an allocation unit. Of these boxes, outline boxes represent empty allocation units, and boxes having been partially blacked out represent recorded allocation units. When the blacked out portion is a part of an allocation unit, it indicates that the allocation unit includes an unrecorded part. However, when an allocation unit has been recorded with certain data, even in a part thereof, no other data can be recorded in the allocation unit. That is to say, when a partial area of an allocation unit has been recorded with data, the allocation unit is treated as a recorded allocation unit. The three allocation units shown in FIG. 7 have been recorded with additional contents in the AV stream format: 00001.mts; 00002.mts; and 00003.mts, respectively. The three allocation units are used exclusively by the additional contents in the AV stream format. Accordingly, even if there is an unrecorded portion in the allocation units, the allocation units cannot be recorded with other files. When an allocation unit is selected as a writing destination, the recording or deletion is performed in a unit of a plurality of continuous logical blocks. Thus a merit of recording data in an allocation unit is that a fragmentation is difficult to occur, because the recording or deletion is performed in a unit of a physically continuous area having a relatively large size.

The continuous data area is accessed in a unit of an allocation unit, namely recording or deletion is performed in a large-size unit. Therefore, when a small-size file is written, a wastefully large area is occupied. This produces a demerit that the storage capacity cannot be used efficiently. However, a file containing an additional content in the AV stream format has sufficiently a large size. In addition, the additional content in the AV stream format needs to be read in real time. All these taken into consideration, it is preferable that the file containing the additional content in the AV stream format is written in the continuous data area.

Now, characteristics of the arrangement of the additional contents shown in FIG. 7 will be described. The area for storing the additional contents includes the normal data area and the continuous data area. In the normal data area, writing or deletion of additional contents in the non-AV stream format is performed in units of 4 KB logical blocks. This is the case where a recording area is efficiently used.

On the other hand, in the continuous data area, the additional contents in the AV stream format are written in a unit of a 4 MB allocation unit. The writing of the additional contents in the AV stream format in this manner generates reduction in the recording efficiency. However, the reduction occurs locally in an additional content storage area, and the influence of it on the recording efficiency of the whole SD card memory, which is a removable medium, is small.

With the above-described structure, it is possible to ensure the stability of the AV playback with respect to the additional contents in the AV stream format, while prioritizing the maintenance of the recording efficiency with respect to the additional contents in the non-AV stream format which are frequently subjected to update such as writing and deletion.

<Internal Structure of File System Area>

Figure 8:
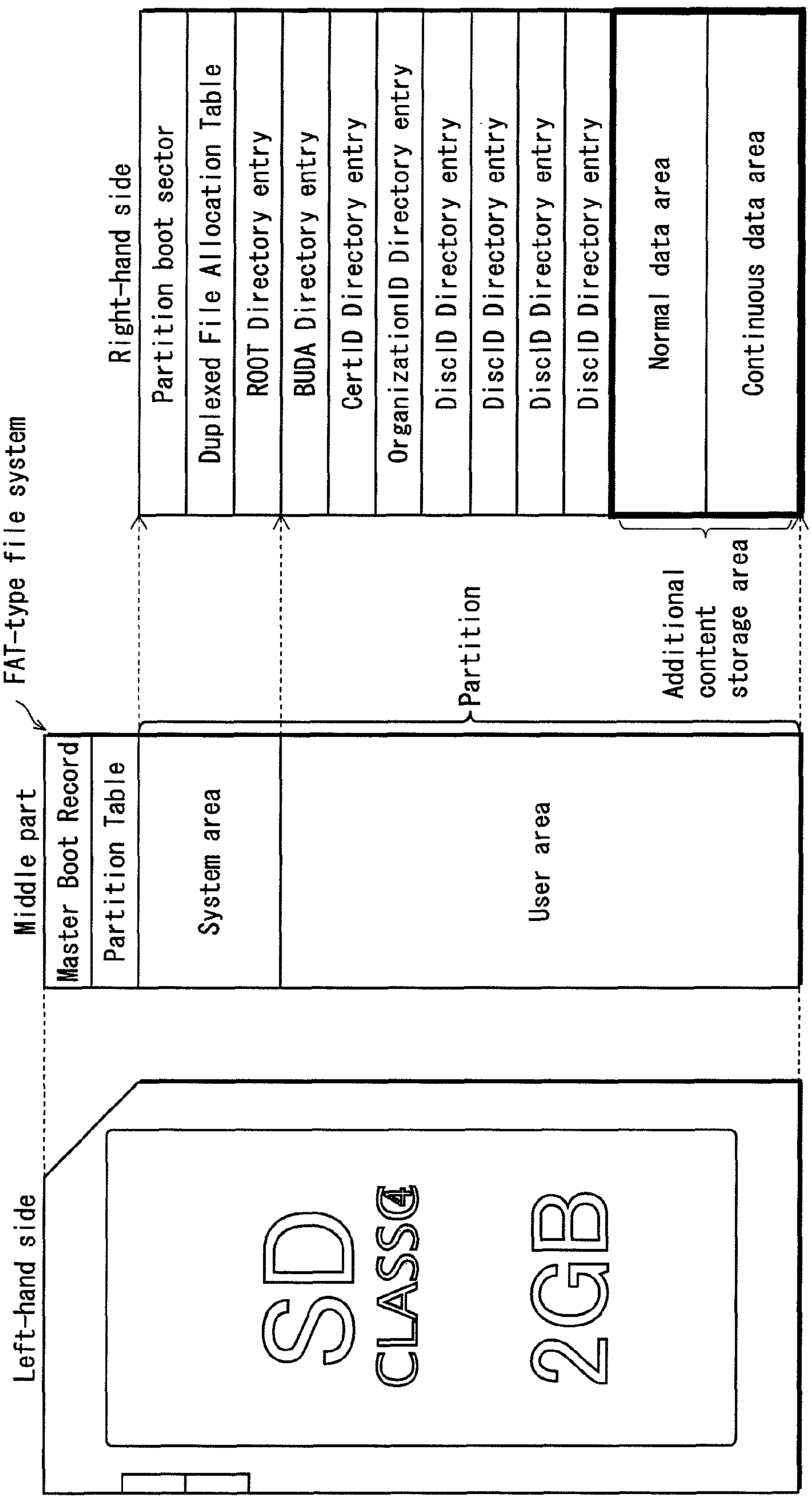
FIG. 8 shows the internal structure of the file system area in the SD memory card which is a removable medium.

FIG. 8 shows the internal structure of the file system area in the SD memory card which is a removable medium. The left-hand side of FIG. 8 shows the SD memory card being a removable medium. The middle part of FIG. 8 shows the internal structure of the file system area that conforms to the FAT-type file system. The recording area of the FAT-type file system is recorded with "Mater Boot Record" and "Partition Table". Following these recording areas, "system area" and "user area" are provided.

The "Mater Boot Record" is an indicator that causes the playback device to recognize that the areas following the "Mater Boot Record" are "one physical medium". In the example shown in FIG. 8, there is provided only one Mater Boot Record in the recording area, thus one physical medium is recognized by the playback device. However, for example, when two Mater Boot Records are provided in the recording area, two physical mediums are recognized by the playback device.

The "Partition Table" is a table in which information relating to the partition is written.

The "system area" is recorded with "partition boot sector", "duplexed File Allocation Table (FAT)", and "root directory entry".

The "user area" stores files in units of clusters, where the cluster is used as the minimum unit. The "user area" is recorded with "BUDA directory entry", "CertID directory entry", "Organization ID directory entry", and "Disc ID directory entry", which is followed by the additional content storage area. The additional content storage area is recorded with "merge management information file", "signature information file", and "additional content data file".

The following describes the duplexed FAT.

Figure 9A:
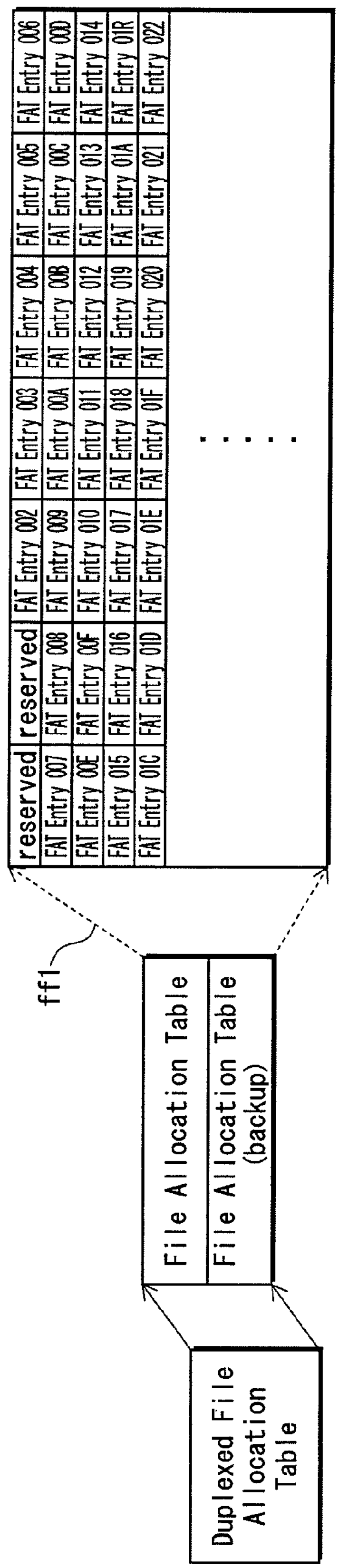
FIG. 9A shows the internal structure of the duplexed FAT.

The "duplexed File Allocation Table (FAT)" is composed of two FATs conforming to the ISO/IEC 9293 Standard. FIG. 9A shows the internal structure of the duplexed FAT. Each FAT is composed of a plurality of FAT entries that are associated with a plurality of clusters on a one-to-one basis. Each FAT entry indicates whether a corresponding cluster is in use or is not in use. When a cluster is not in use, "0" is set in the corresponding FAT entry, and when a cluster is in use, its cluster number is set in the corresponding FAT entry. The cluster number indicates a linkage relationship between clusters which identifies a cluster to be read next when the corresponding cluster is read out. The lead line ff1 of a dotted line shown in FIG. 9A indicates a plurality of FAT entries 002, 003, 004, 005, . . . that are included in the FAT. The numerals "002, 003, 004, 005, . . . " attached to the FAT entries identify the clusters with which the FAT entries are associated, respectively. That is to say, the numerals indicate the cluster numbers of the clusters with which the FAT entries are associated, respectively.

Figure 9B:
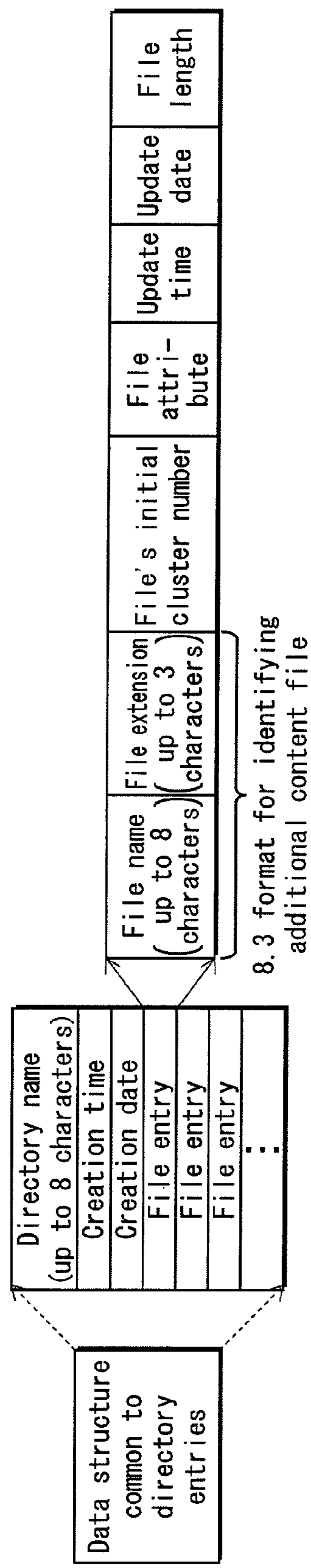
FIG. 9B shows the data structure that is common with the directory entries.

Next, the directory entries will be described. The directory entries are classified into "root directory entry" that exists in the system area, "BUDA directory entry" that exists in the user area, "CertID directory entry", "Organization ID directory entry", "Disc ID directory entry" and the like. These directory entries have in common the data structure shown in FIG. 9B. FIG. 9B shows the data structure that is common with the directory entries. As shown in FIG. 9B, the "directory entry" includes "directory name" composed of eight or less ASCII characters, "creation time", "creation date", and "file entries" concerning the files that exist under the directory. Each file entry includes "file name" composed of eight or less ASCII characters, "file extension" composed of three or less ASCII characters, "file's initial cluster number" storing the starting part of the file, "file attribute" indicating the attribute of the file, "update time" at which the file was updated, and "file length" indicating the data length of the file.

In the SD memory card, the directory names and the file names are written to these directory entries. Among the directory entries, the Root directory entry needs to be arranged in one cluster, together with the duplexed FAT so as to be managed together. For this reason, it is not realistic to allow a long name with respect to the directory name and the file name. More specifically, the directory name and the file name are restricted to eight or less ASCII characters, and the extension is restricted to three or less ASCII characters. The file system in which the directory name and the file name are restricted in length is called "8.3 format".

Here will be described how the FAT and directory entries are set when an additional content is stored in the DiscID directory. The additional content used for the sake of explanation here is a file "00001.mts" storing an AV stream.

Figure 10:
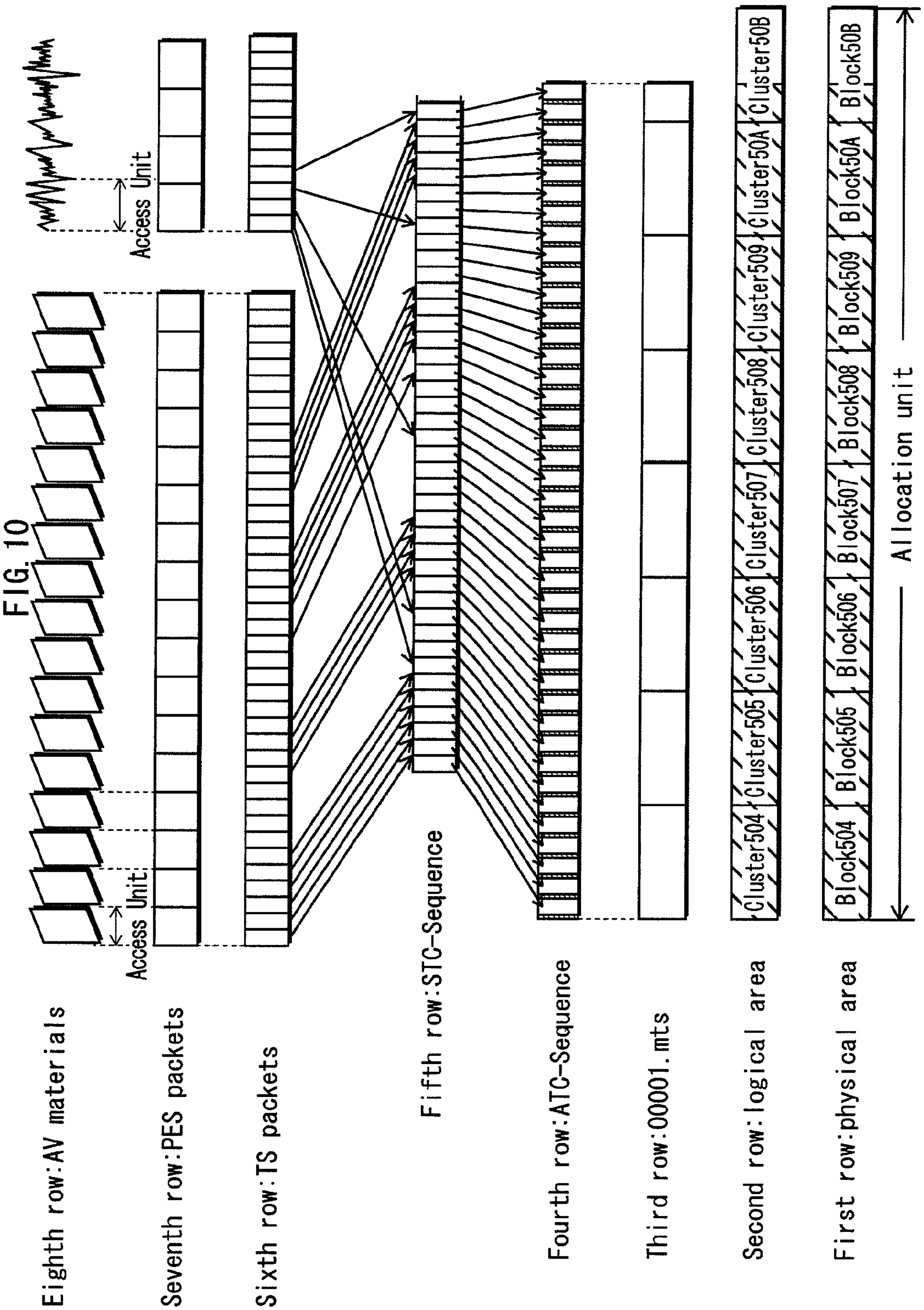
FIG. 10 shows an assumed state where the file "00001.mts" is divided into five parts based on the cluster size, and the divided parts are stored into the clusters 504 through 50B, respectively.

FIG. 10 shows an assumed state where the file "00001.mts" is divided into five parts based on the cluster size, and the divided parts are stored into the clusters 504 through 50B, respectively.

The third through eighth rows from bottom of FIG. 10 schematically show how elementary streams, which represent the video and audio, are multiplexed in the AV stream. converts TS packets constituting the source packets into PES packets. The AV stream is generated by converting the digitized video and audio (the eighth row) into elementary streams composed of PES packets (the seventh row), and further converting them into TS packets (the sixth row), and multiplexing the TS packets (the fifth row).

Here, the video stream is composed of a plurality of pictures as shown in the eighth row of FIG. 10. The relationship between the pictures and the access units is represented as "1 access unit=1 picture". The audio stream is composed of a plurality of audio frames, and the relationship between the audio frames and the access units is represented as "1 access unit=1 audio frame". In BD-ROM, the relationship is restricted to "1 PES packet=1 picture". That is to say, when the video has a frame structure, the relationship is represented as "1 PES packet=1 picture", and when the video has a field structure, the relationship is represented as "1 PES packet=2 pictures". In view of these matters, the PES packets shown in the seventh row of FIG. 10 store pictures and audio frames shown in the eighth row in one-to-one ratio.

In the fifth row, the sequences of the multiplexed TS packets are arranged into an "STC Sequence". It should be noted here that each "STC Sequence" is a section that does not include a system time-base discontinuity, which is based on the STC (System Time Clock) that is a time axis defined in the MPEG2-TS as for indicating the decode time and the display time, and indicates the system standard time for the AV streams. The presence of the system time-base discontinuity is indicated by a "discontinuity_indicator" being ON, where the discontinuity_indicator is contained in a PCR packet carrying a PCR (Program Clock Reference) that is referred to by the decoder to obtain an STC.

The fourth through first rows show how the additional contents in the AV stream format are recorded onto the removable medium.

As shown in the fourth row, a 4-byte TS_extra_header (shaded portions in the drawing) is attached to each 188-byte TS packet to generate each 192-byte Source packet. The TS_extra_header includes Arrival_Time_Stamp that is information indicating the time at which the TS packet is input to the decoder.

The Source packet includes one or more "ATC_Sequences" shown in the fourth row. The "ATC_Sequence" is a sequence of Source packets, where Arrival_Time_Clocks referred to by the Arrival_Time_Stamps included in the ATC_Sequence do not include "arrival time-base discontinuity". In other words, the "ATC_Sequence" is a sequence of Source packets, where Arrival_Time_Clocks referred to by the Arrival_Time_Stamps included in the ATC_Sequence are continuous. The ATS is attached to the head of the TS packet and indicates the time to transfer to the decoder, as follows.

The above-described ATC_Sequence becomes an AV stream and is stored into the data file "00001.mts" as shown in the third row. The additional contents in the AV stream format are recorded into the continuous clusters 504, 505, 506, . . . 50B which constitute the file system area as shown in the second row. The continuous clusters correspond to the plurality of logical blocks 504, 505, 506, . . . 50B that constitute the allocation unit shown in the first row. Therefore, the additional contents in the AV stream format are stored in one allocation unit in a completed manner.

Figure 11:
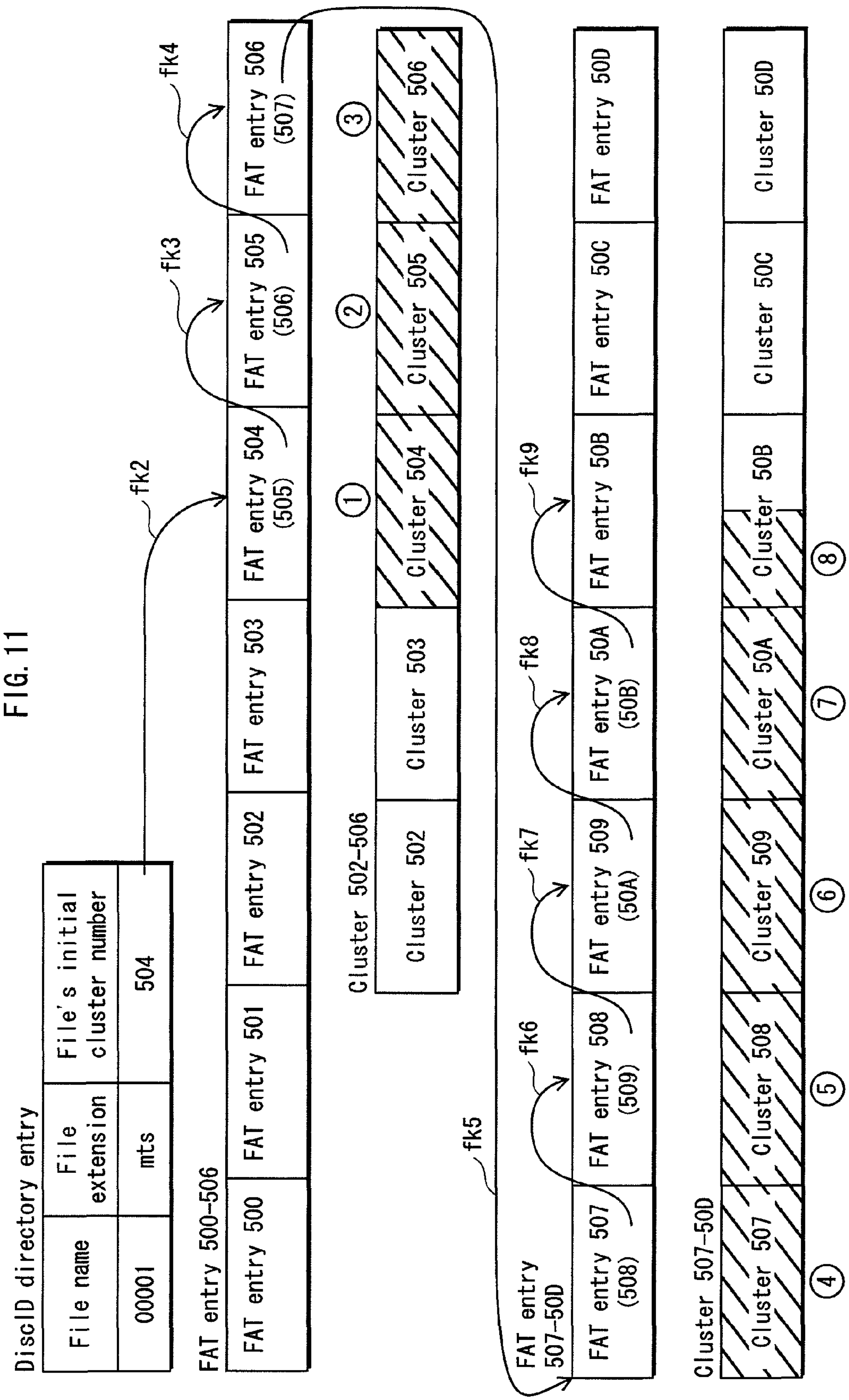
FIG. 11 shows how the directory entries and FAT are set when the file 00001.mts are recorded in a plurality of clusters.

When the file 00001.mts is recorded into the allocation unit, the directory entries and FAT should be set as shown in FIG. 11.

FIG. 11 shows how the directory entries and FAT are set when the file 00001.mts are recorded in a plurality of clusters. When the starting portion of the file 00001.mts is recorded in the cluster 504, the cluster number "504" of the cluster is written in the "file's initial cluster number" of the directory entry "Disc ID directory entry". It is recognized from this that other portions of the file 00001.mts following the starting portion are recorded in the clusters 505 and 506. The cluster 504 storing the starting portion of the file 00001.mts corresponds to the FAT entry 504. The FAT entry 504 indicates the cluster 505 storing the portion following the starting portion of the file 00001.mts. Similarly, the clusters 505 and 506, storing the portions following the portion of the file 00001.mts, correspond to the FAT entries 505 (506) and 506 (507), which indicate the clusters 506 and 507 storing the portions following this portion of the file 00001.mts, respectively. In this way, by tracking the cluster numbers and the corresponding FAT entries, starting with the initial cluster number in the directory entry "Disc ID directory entry", the AV streams stored in the removable medium 104 are read out and played back.

The following describes the directories constructed based on the above-described file system.

Figure 12:
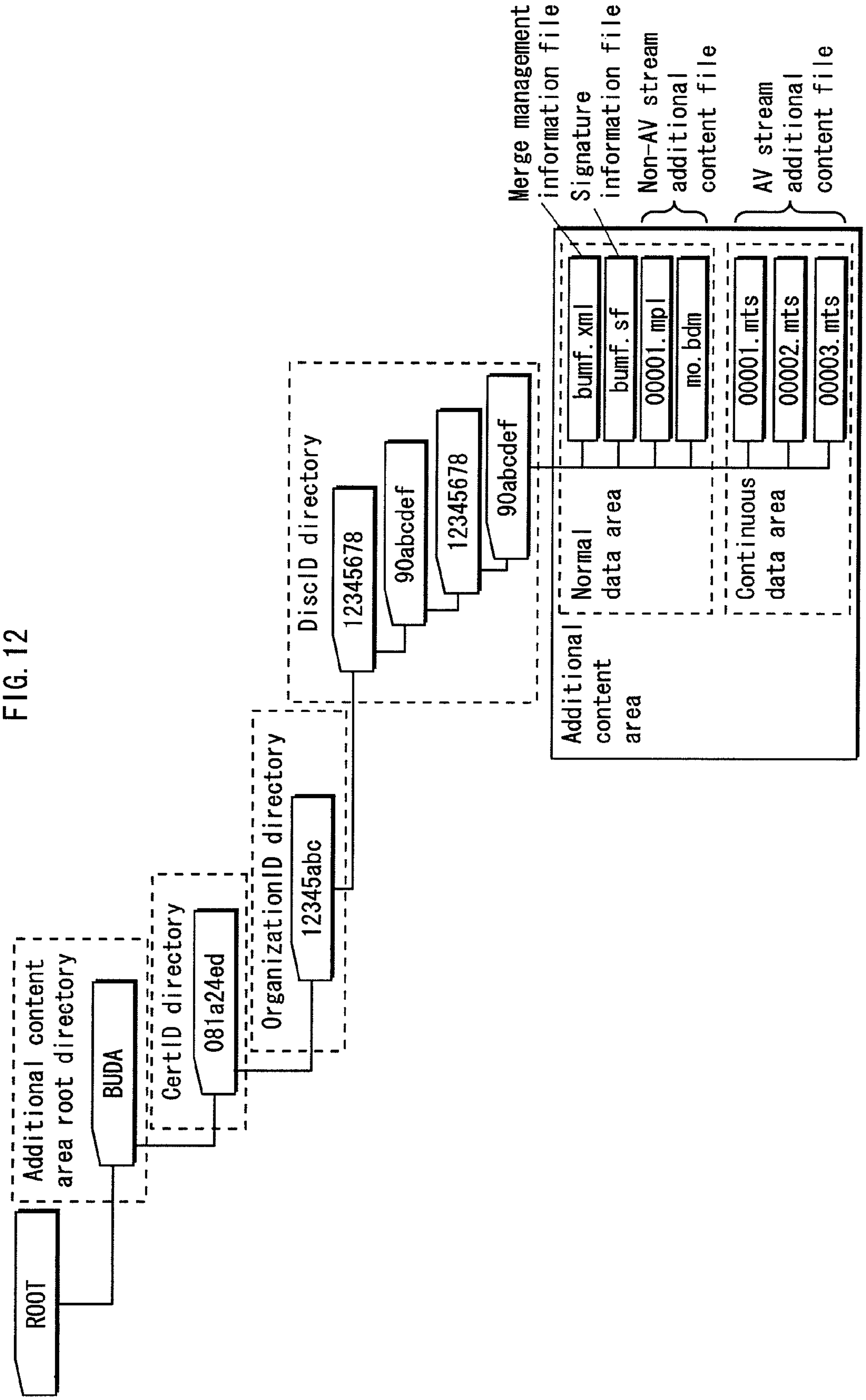
FIG. 12 shows the directory structure on the removable medium in Embodiment 1.

FIG. 12 shows the directory structure on the removable medium. On the removable medium, there are the BUDA directory being the root directory of the additional content storage area, CertID directory. Organization ID directory, and Disc ID directory. The Disc ID directory includes a merge management information file "bumf.xml", a signature information file "bumf.sf", and additional contents "00001.mpl", "mo.bdm", and "00001.mts".

The root directory of the additional content storage area (BUDA directory) is immediately under the root directory of the removable medium, is a directory indicating the root of the additional content storage area, and its directory name is a fixed value (BD_BUDA) composed of eight or less characters.

The CertID directory is a directory that has, as its name, an ID obtained from the merge certificate (bd.cert) on the BD-ROM, and is a directory whose name is composed of eight characters in hexadecimal notation represented by the first 32 bits of 160 bits which represent the SHA-1 digest value of the merge certificate.

The Organization ID directory is a directory whose name is composed of eight characters in hexadecimal notation represented by a 32-bit identifier (Organization ID) identifying the provider of the movie work, the Organization ID being written in the BD management information (index.bdmv) on the BD-ROM.

The Disc ID directory is composed of four layers of sub-directories. Each of the four layers of sub-directories is assigned with a directory name composed of eight or less characters. Each sub-directory has an eight-character name in hexadecimal notation represented by a set of 32 bits, which is a quarter of 128 bits constituting the Disc ID being the identifier of the BD-ROM. The Disc ID is written in the BD management information (index.bdmv) on the BD-ROM, and thus can be obtained by opening the index.bdmv. In an example case provided in the present embodiment, four directory names "12345678", "90abcdef", "12345678", and "90abcdef" are obtained by dividing the 32-character (128-bit) Disc ID "1234567890abcdef1234567890 abcdef", by 8 characters (32 bits) starting with the least significant bit. This arrangement enables the Disc ID to correspond to the 8.3 format without omitting meaningful characters among the characters constituting the Disc ID. This renders the four layers of sub-directories strictly associated with the Disc ID.

Under the Disc ID directory, there is the additional content storage area used for creating the virtual package. The additional content storage area is specified by the file entry contained in the Disc ID directory entry which is the lowest one among the four Disc ID directory entries. The additional content storage area is thus allocated to a logical block after the lowest Disc ID directory entry. The additional content storage area is composed of the normal data area and the continuous data area. The normal data area stores the "merge management information file", "signature information file", and "additional content" that is a non-AV stream additional content. These files form the core of generating the virtual package. The contents of the files will be described in detail in the following.

The "merge management information file" is information that indicates the correspondence between a file path of an additional content on the removable disc and a file path for an "alias access" on the virtual package. The merge management information file is stored in the Disc ID directory, with a file name "bumf.xml". The merge management information file is characterized in that the directory name and the file name on the removable disc conform to the 8.3 format since it is based on the file path on the removable disc, namely, the FAT-type file system. In this way, the file path conforming to the 8.3 format is associated with the file path of the LFN on the virtual package. The file path of the virtual package conforms to the directory structure of the BD-ROM because the virtual package should treat the files recorded on the removable medium as if they are recorded on the BD-ROM. The file system format of the BD-ROM corresponds to the LFN. As a result, the additional contents recorded on the removable medium, although they are recorded in the 8.3 format, can be accessed by aliases using file names of 255 characters or less characters by referring to the merge management information file. In this way, the merge management information file achieves the "alias access" to various files recorded in the 8.3 format, with use of file names of 255 characters or less.

Figures 13A, 13B:
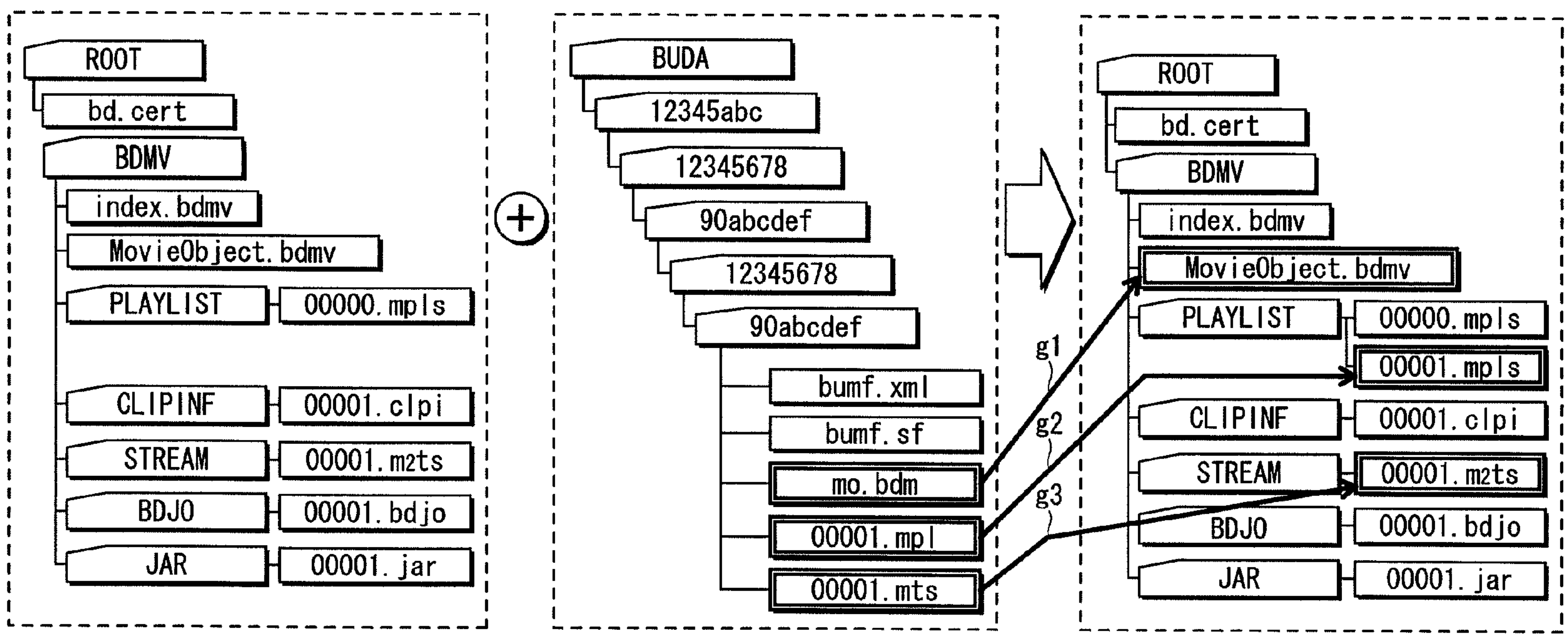
FIGS. 13A and 13B show the virtual package in Embodiment 1.

FIG. 13A shows the internal structure of the merge management information. The merge management information shown in FIG. 13A indicates correspondence between the file paths on the removable medium and the file paths on the virtual package, with respect to the three additional contents: 00001.mpl, mo.bdm, and 00001.mts. The file paths on the removable medium conform to the 8.3 format.

The description of the file paths in FIG. 13A will be explained in more detail. The 8.3-format file path "12345abc/12345678/90abcdef/12345678/90abcdef/00001.mpl" on the removable disc corresponds to an LFN-format file path "BDMV/PLAYLIST/00001.mpls" on the virtual package. This example is based on FIG. 12 such that the path from the CertID directory to the additional content is described.

The 8.3-format file path "12345abc/12345678/90abcdef/12345678/90abcdef/mo.bdm" on the removable disc corresponds to an LFN-format file path "BDMV/PLAYLIST/00001.bdmv" on the virtual package.

The 8.3-format file path "12345abc/12345678/90abcdef/12345678/90abcdef/00001.mts" on the removable disc corresponds to an LFN-format file path "BDMV/PLAYLIST/00001.m2ts" on the virtual package.

FIG. 13B shows the process where the contents recorded on the BD-ROM are merged with the additional contents recorded on the removable medium based on the merge management information.

The left-hand side of FIG. 13B shows the data stored in the BD-ROM, the middle part of FIG. 13B shows the data stored in the removable medium, and the right-hand side of FIG. 13B shows the data stored in the virtual package. It is presumed here that the merge management information has been set as shown in FIG. 13A. Under these conditions, among the data stored in the removable disc, the three additional contents (mo.bdm, 00001.mpl, and 00001.mts) that are present with "12345abc/12345678/90abcdef/12345678/90abcdef" under the BUDA directory are respectively combined with the directory structure of the virtual package written in the merge management information file, as indicated by the arrows g1, g2, and g3. Such combining of a file in the removable disc with the directory structure written in the merge management information file is called "merge (merging)".

The above-described merge enables mo.bdm to be accessed with an alias file name "MovieObject.bdmv" that is present in the BDMV directory.

The above-described merge also enables 00001.mpl to be accessed with an alias file name "00001.mpls" that is present in the PLAYLIST directory under the BDMV directory.

The above-described merge also enables 00001.mts to be accessed with an alias file name "00001.m2ts" that is present in the STREAM directory under the BDMV directory.

As described above, the alias access becomes possible. Thus, mo.bdm, 00001.mpl, and 00001.mts can be treated as being present in BDMV/MovieObject.bdmv, BDMV/PLAYLIST/00001.mpls, and BDMV/STREAM/00001.m2ts, respectively.

The signature information file is a file indicating an electronic signature applied by the provider to the merge management information file, and is stored in the DiscID directory with a file name "bumf.sf". In general, an encrypted hash value is used as the electronic signature, where the encrypted hash value is generated by calculating a hash value for the information that needs to be protected from tampering, and encrypting the hash value using a predetermined private key. Examples of the information that needs to be protected from tampering include a file name of an additional content, and a file path to be used for recording an additional content onto the built-in medium. The file path is recorded in the LFN format, and is written in the merge management information file. Thus, a hash value is calculated for a file path written in the merge management information file. Note that in this signature information file, the hash value for the merge management information file is encrypted using a private key corresponding to a public key contained in the merge certificate recorded on the BD-ROM.

The "additional contents in the non-AV stream format" are files that are added to or update the original contents recorded on the BD-ROM, and are recorded on the removable medium with file names in the 8.3 format (in which a file name is eight or less characters and an extension is three or less characters). The DiscID directory is converted without omitting any characters such that all the characters are included in the directory name of the DiscID directory. On the other hand, with respect to the additional contents, a part of the characters is used as the file name in the removable medium so that the file names can be reduced. This is possible because file names for the additional contents are originally file names on the BD-ROM, and are restricted to a predetermined number of patterns represented as: "five-digit value+several types of extensions", and thus there is hardly a possibility that an error such as a mix-up occurs even if a part of characters constituting a file name is omitted.

Of the two additional contents shown in FIG. 12, "00001.mpl" stores PlayList information, and "mo.bdm" stores a Movie object. Other than these, any file to be recorded on the BD-ROM can be selected as a target of the additional content, in so far as the file can be supplied to the user. Also, a file (with extension "clpi") storing index.bdmv or Clip information, a Java archive file (with extension "Jar"), or a file (with extension "bdjo") storing a BD-J object can be selected as a target of the additional content. This completes the explanation of the normal data area.

Next, the continuous data area will be described in detail. The continuous data area stores the additional contents in the AV stream format. The additional contents in the AV stream format include "00001.mts", "00002.mts", and "00003.mts". These are 8.3-format files storing AV streams.

Figure 14:
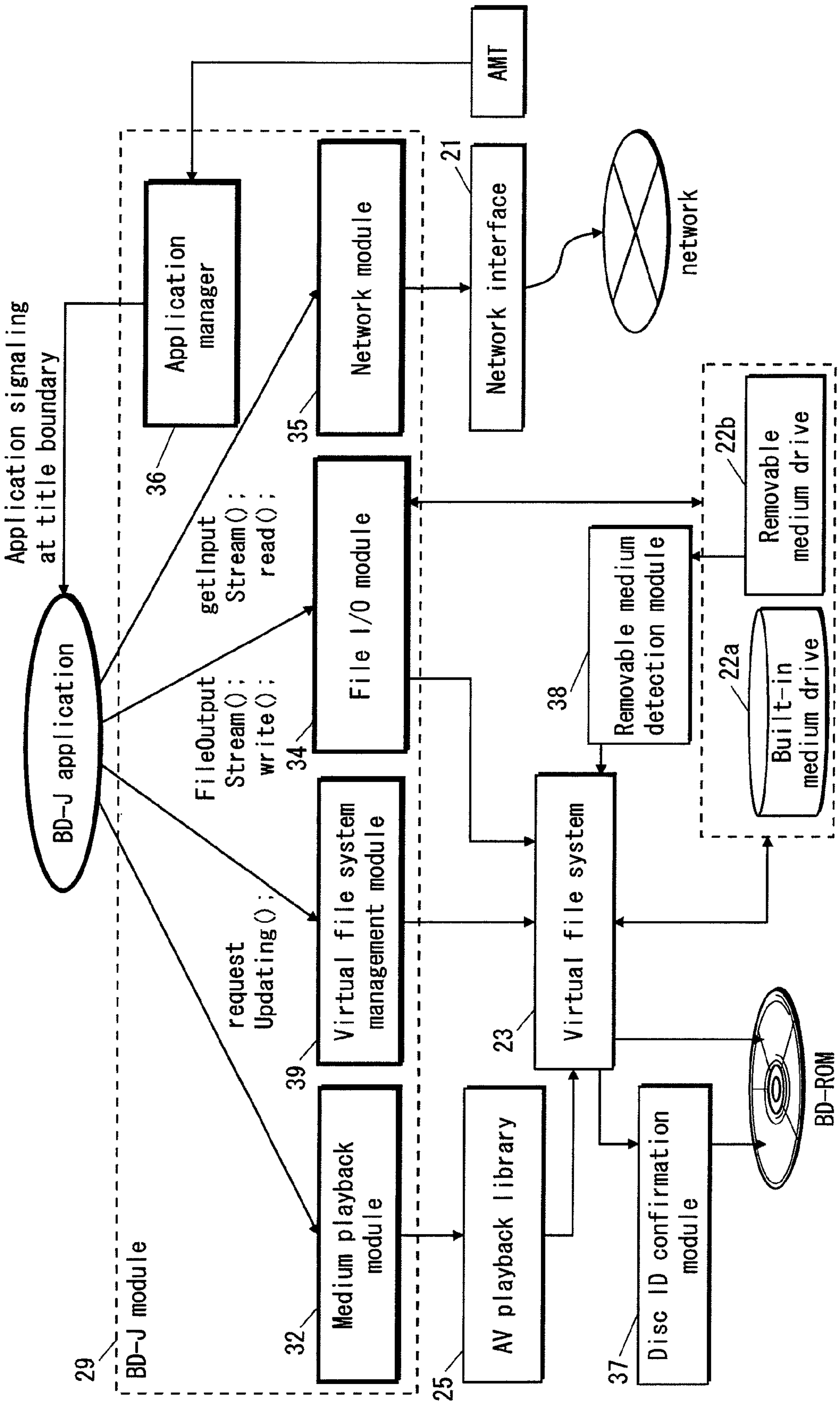
FIG. 14 shows a detailed structure of the BD-J module in Embodiment 1.

FIG. 14 shows a detailed structure of the BD-J module 29 shown in FIG. 5, and also shows how the BD-J module downloads additional contents from the network onto the built-in medium or the removable medium. The BD-J module 29 includes a medium playback module 32, a file I/O module 34, a network module 35, an application manager 36, and a virtual file system management module 39. Note that the AV playback library 25, the network interface 21, the built-in medium drive 22*a*, the removable medium drive 22*b*, and the virtual file system 23 shown in FIG. 14 are the same as those shown in FIG. 5, and are provided for the sake of explanation of the medium playback module 32 through the virtual file system management module 39.

<Medium Playback Module 32>

The medium playback module 32 provide the BD-J application with the API for the medium playback control. When the BD-J application calls the medium playback control API, the medium playback module 32 calls a function of the AV playback library 25 corresponding thereto, and performs the AV playback control.

<File I/O Module 34>

The file I/O module 34 processes an access request from the BD-J application requesting an access to the built-in medium or the removable medium.

When the access request is a request to write an additional content, the BD-J application can arrange the additional content in an appropriate position on the built-in medium or the removable medium by using the file I/O module 34. It is also possible to delete an unnecessary additional content, or directly edit an additional content. Accesses to the virtual package can also be performed via the file I/O module 34. However, the accesses to the virtual package are read-only, and writing from the file I/O module 34 thereto is not available.

When the access request is a request to read out an additional content, a file path in the LFN format for the BD-ROM is handed out from the BD-J application, and a search is made to check whether the removable medium is recorded with a file that can be accessed using the file path in the LFN format.

The search is made by judging whether or not the file path in the LFN format is described as "alias path" in the merge management information file.

When the search confirms that the removable medium is recorded with an additional content that can be accessed with an alias using the file path in the LFN format, the additional content is read out from the removable medium in accordance with the 8.3-format file path written in the merge management information file.

When it is confirmed that the removable medium is not recorded with an additional content that can be accessed with an alias using the file path in the LFN format, an additional content that can be accessed using the file path in the LFN format is read out from the BD-ROM. When such an additional content that can be accessed using the file path in the LFN format is not present in the BD-ROM, an error process is performed.

<Network Module 35>

The network module 35 provides the BD-J application with the API for the network control. A network connection process is performed using the network interface 21, in accordance with a network control request from the BD-J application. The BD-J application can search for a published additional content using the network module 35, and can download an additional content onto the built-in medium or the removable medium.

Since the network module 35 achieves such obtainment of an additional content via a network, the obtaining unit described in "Means to Solve the Problems" section corresponds to the network module 35.

<Application Manager 36>

The application manager 36 manages the system application, and executes application signaling. The application signaling is a control for booting and executing an application by regarding "service" as the life cycle, in the MHP (Multimedia Home Platform) defined in the GEM 1.0.2 standard. The application manager in the BD-ROM playback device achieves the control for booting and executing an application by regarding, as the life cycle, "Title" in the BD-ROM, instead of the "service". Note that the "Title" is a playback unit in playing back video and/or audio data recorded on the BD-ROM, and is uniquely assigned with an application management table (AMT).

The application signaling at title boundary is a signaling that is executed using an application management table (AMT) corresponding to a previous title and an application management table (AMT) corresponding to a current title, when a title is selected based on the file "index.bdmv". This signaling is a control for ending an operation of an application that is written in the AMT corresponding to a previous title, but not in the AMT corresponding to a current title, and starting an operation of an application that is not written in the AMT corresponding to a previous title, but is written in the AMT corresponding to a current title.

Figure 15:
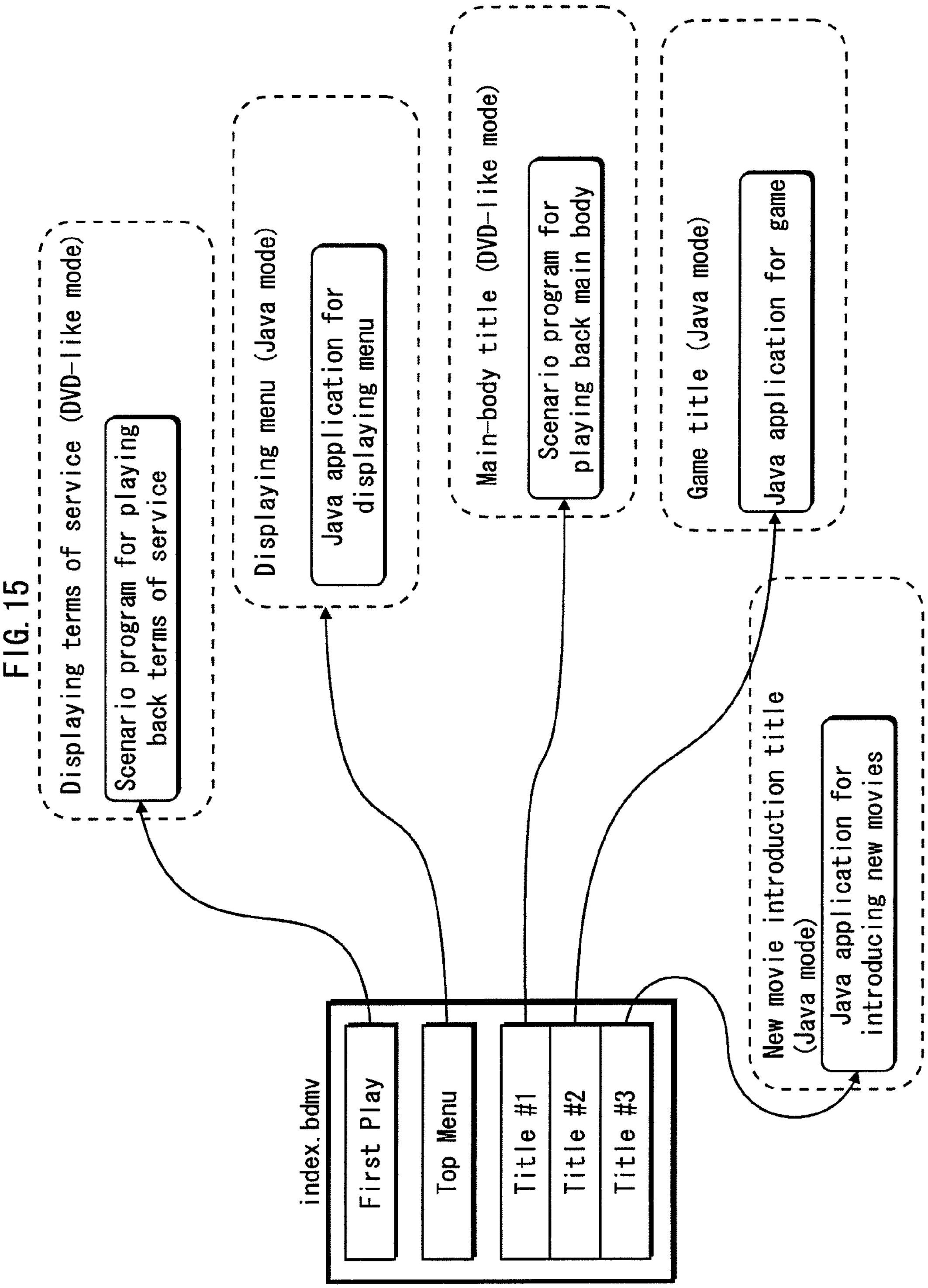
FIG. 15 shows a relationship between the file "index.bdmv" and the Titles in Embodiment 1.

The file "index.bdmv" is a file in which the title structure on the disc is written, and manages the reference relationship between each title on the disc and a corresponding application (which is a Java™ application when it is a BD-J mode title, and is a scenario program when it is an HDMV mode title). FIG. 15 shows a relationship between the file "index.bdmv" and the titles. Here, the title is a playback unit composed of a pair of an application and an AV stream. There are special titles: "First Play"; and "Top Menu". The "First Play" is a title that is automatically played back when the BD is booted, and mainly displays the terms of service of the BD. The "Top Menu" is played back when the menu key on the remote control is pressed, or when a playback of a title has ended, and is mainly used for the selection of a title or the selection of a language for the subtitle and/or the audio. When the contents of the file "index.bdmv" change due to an update of the virtual package, the title structures before and after the update of the virtual package are different from each other.

<Disc ID Confirmation Module 37>

The Disc ID confirmation module 37 confirms the Disc ID of the inserted BD-ROM. The value of the Disc ID obtained by the Disc ID confirmation module 37 is used when the virtual file system 23 creates the virtual package.

<Removable Medium Detection Module 38>

The removable medium detection module 38 monitors the insertion and ejection of the removable medium. After the removable medium is inserted or ejected, the removable medium detection module 38 notifies the virtual file system 23 of the insertion or the ejection.

<Virtual File System Management Module 39>

The virtual file system management module 39 receives a virtual package creation/update request from the BD-J application, and transfers the contents of the request to the virtual file system 23. When creating/updating a virtual package, the Java™ application issues a creation/update request specifying a new merge management information file and a new signature information file. Upon receiving the virtual package creation/update request via the virtual file system management module 39, the virtual file system 23 verifies the signature of the new merge management information file using the specified new signature information file, and then re-creates a virtual package by replacing the old merge management information file and signature information file with the new merge management information file and signature information file, respectively. The replacement of the merge management information file and signature information file is performed when titles are switched. Next, the titles will be explained in the following.

<Notes for Writing Additional Content>

In the following, notes for writing an additional content in the AV stream format into the normal data area will be described.

The content author should attach an extension "mts" to the additional contents in the AV stream format so that the playback device can recognize that their file type is the AV stream format. More specifically, since the additional contents in the AV stream format are downloaded by the BD-J application, the additional contents in the AV stream format should have the extension "mts" when they are downloaded and written into a local storage by the BD-J application. The playback device should write the additional contents in the AV stream format into the continuous data area in the local storage. To write the additional contents in the AV stream format according to the request from the application, the file I/O module 34 should allocate the continuous data area, namely, an allocation unit so that the additional contents in the AV stream format are written therein.

<Description of Download Procedure by BD-J Application>

To achieve the download by the BD-J application, it is necessary to cause the network module 35 to create a URL connection using a predetermined API, and cause the file I/O module 34 to write onto the removable medium. The following explain APIs that are used in the description of the download procedure.

URLConnection(URL url): It instructs to establish the URL connection for a URL specified by an argument.

getInputStream( ): When this API is called, an input stream that receives input from the URL connection is returned to the application as a return value.

The following method is used for getInputStream( ).

read(byte[ ] b): It reads "byte[ ]" indicating the number of bytes specified by an argument, from an the input stream, and stores it into a byte alignment.

FileOutputStream(String name): The "String name" is the argument and means an absolute file path. When this API is called by the BD-J application, an output file stream j, which is used for writing into a file object specified by the absolute file path, is created. Also, when an append argument is used, additional data can be written into an existing file.

The following method is used for FileOutputStream( ).

write(byte[ ] b): It writes "b.length" bytes in a specified byte alignment into the output file stream j.

Figure 16:
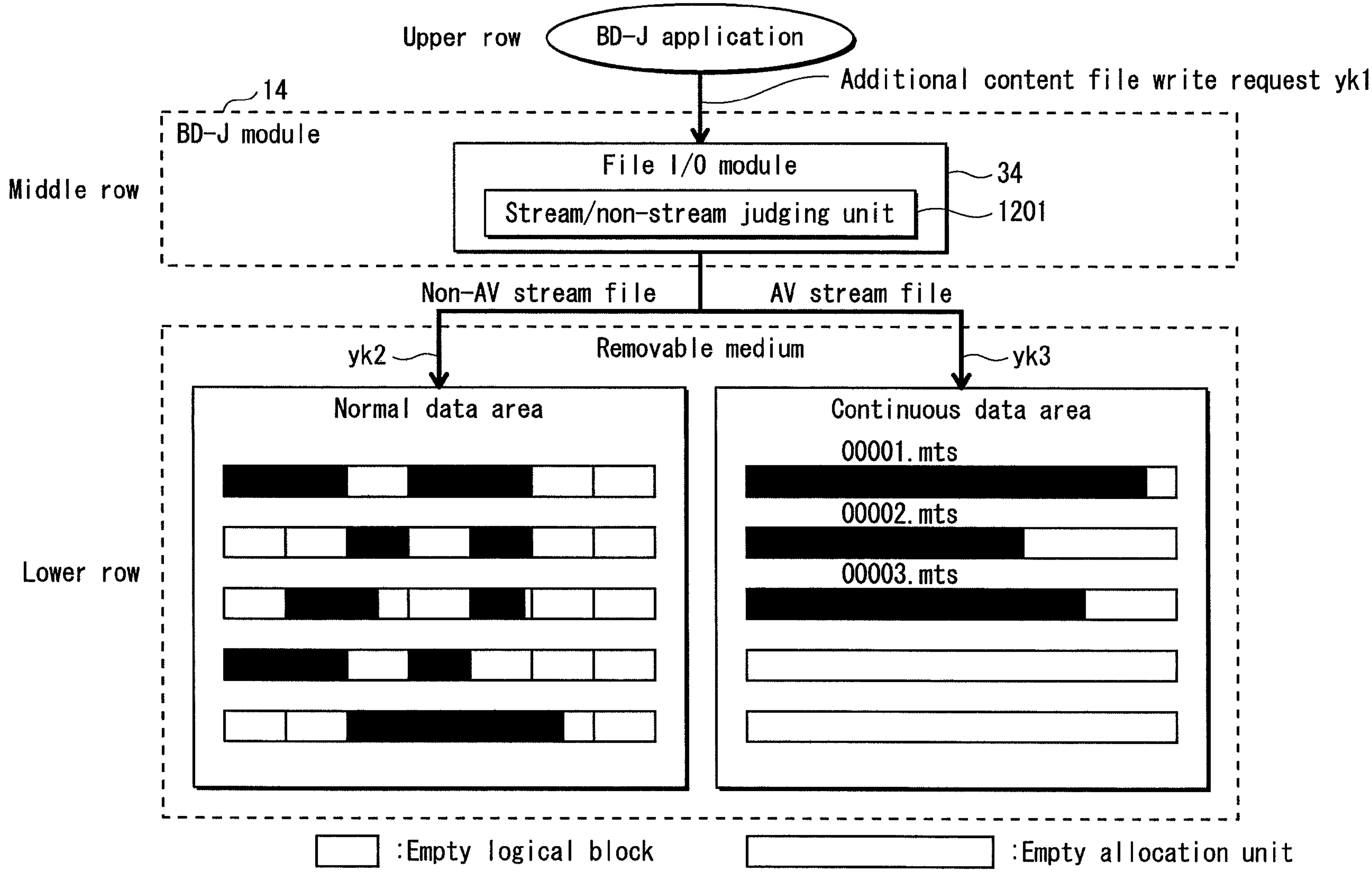
FIG. 16 schematically shows a data writing into the normal data area or the continuous data area via the file I/O module 34.

FIG. 16 schematically shows a data writing into the normal data area or the continuous data area via the file I/O module 34. The lower row shows a pair of the normal data area or the continuous data area in the removable medium. The middle row shows the BD-J module 29 and the file I/O module 34 provided therein. The upper row shows the BD-J application. The arrow yk1 indicates a write request, and the arrows yk2 and yk3 schematically show a series of data flows where an additional content in the AV stream format or the non-AV stream format is written in accordance with the write request. As the data flows indicate, when a request to write an additional content is made, a stream/non-stream judging unit 1201 judges whether or not the requested additional content is in the AV stream format. When it judges that the requested additional content is in the AV stream format, an additional content in the AV stream format is written into the continuous data area, and when it judges that the requested additional content is not in the AV stream format, an additional content in the non-AV stream format is written into the normal data area.

Figure 17:
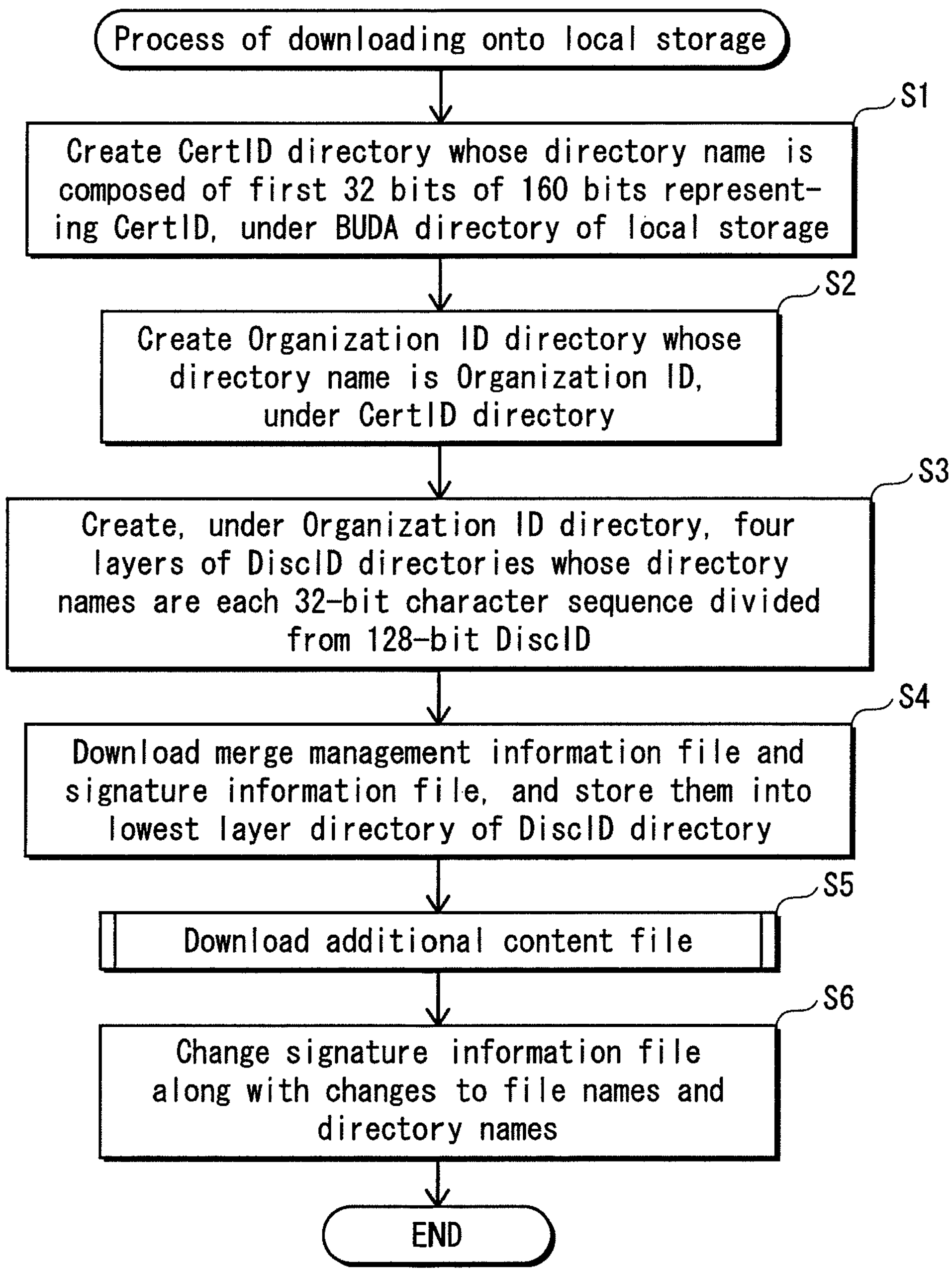
FIG. 17 is a flowchart showing the procedure of downloading onto the removable medium.

FIG. 17 is a flowchart showing the procedure of downloading onto the removable medium. A CertID directory whose directory name is composed of the first 32 bits of 160 bits representing the CertID is created under the BUDA directory of the removable medium (step S1). An Organization ID directory whose directory name is the Organization ID is created under the CertID directory created in step S1 (step S2). Four layers of sub-directories are then created under the Organization ID directory (step S3), where each of the sub-directories is assigned with a directory name composed of a character sequence represented by a set of 32 bits, which is a quarter of 128 bits representing the Disc ID.

After the directory structure for the removable medium is built by the above-described steps, the merge management information file and the signature information file are downloaded and stored into the lowest layer of the DiscID directory (step S4). The additional content is then downloaded (step S5). After the additional content is downloaded in this way, the signature information file is changed with the changes made to the file names and directory names in the merge management information file (step S6). The step S6 is performed for the following reasons. That is to say, the provider side, for the purpose of protection from tampering, calculates a hash value with respect to a file path that supports the LFN format in the built-in medium before the file path is changed, and writes the calculated hash value in the signature information file. The playback device changes the file path for which the hash value has been calculated, from the LFN format to the 8.3 format. With this format change of the file path, the hash value in the signature information file needs to be re-calculated. The re-calculation of the hash value following the change of file path is performed in the step S6.

Figure 18:
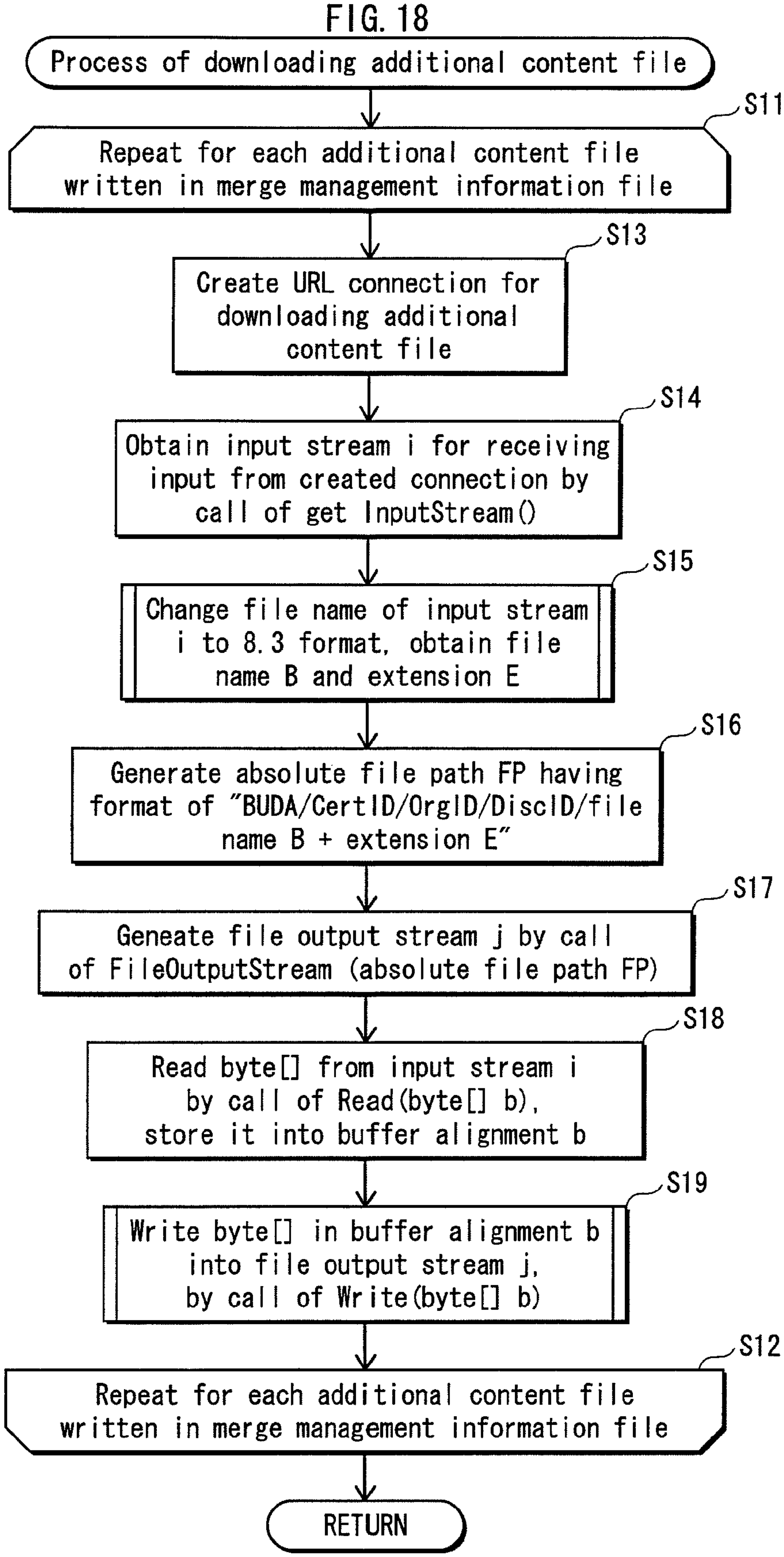
FIG. 18 is a flowchart showing the procedure of downloading an additional content.

FIG. 18 is a flowchart showing the procedure of downloading the additional content. This flowchart has a loop structure where steps S13 through S19 are repeated for each additional content written in the merge management information file (steps S11 and S12). The additional content processed in the loop is referred to as additional content i. The steps S13 through S19 are performed as follows. First, the URL connection for downloading the additional content is created (steps S13). An input stream i for receiving input from the created connection is obtained (steps S14). The file name of the input stream is changed to the 8.3 format, and a file name B and an extension E are obtained (steps S15). After this, an absolute file path FP having a format of "BUDA/CertID/organizationID/DiscID/file name B+extension E" is generated (steps S16). An output file stream j is generated by the call of FileOutputStream (absolute file path FP) using the generated absolute file path (steps S17). By the call of Read (byte[ ] b), byte[ ] is read out from the input stream i and is stored into a buffer alignment b (steps S18). Lastly, by the call of Write(byte[ ] b), byte[ ] in the buffer alignment b is written into the file output stream j (steps S19).

Figure 19:
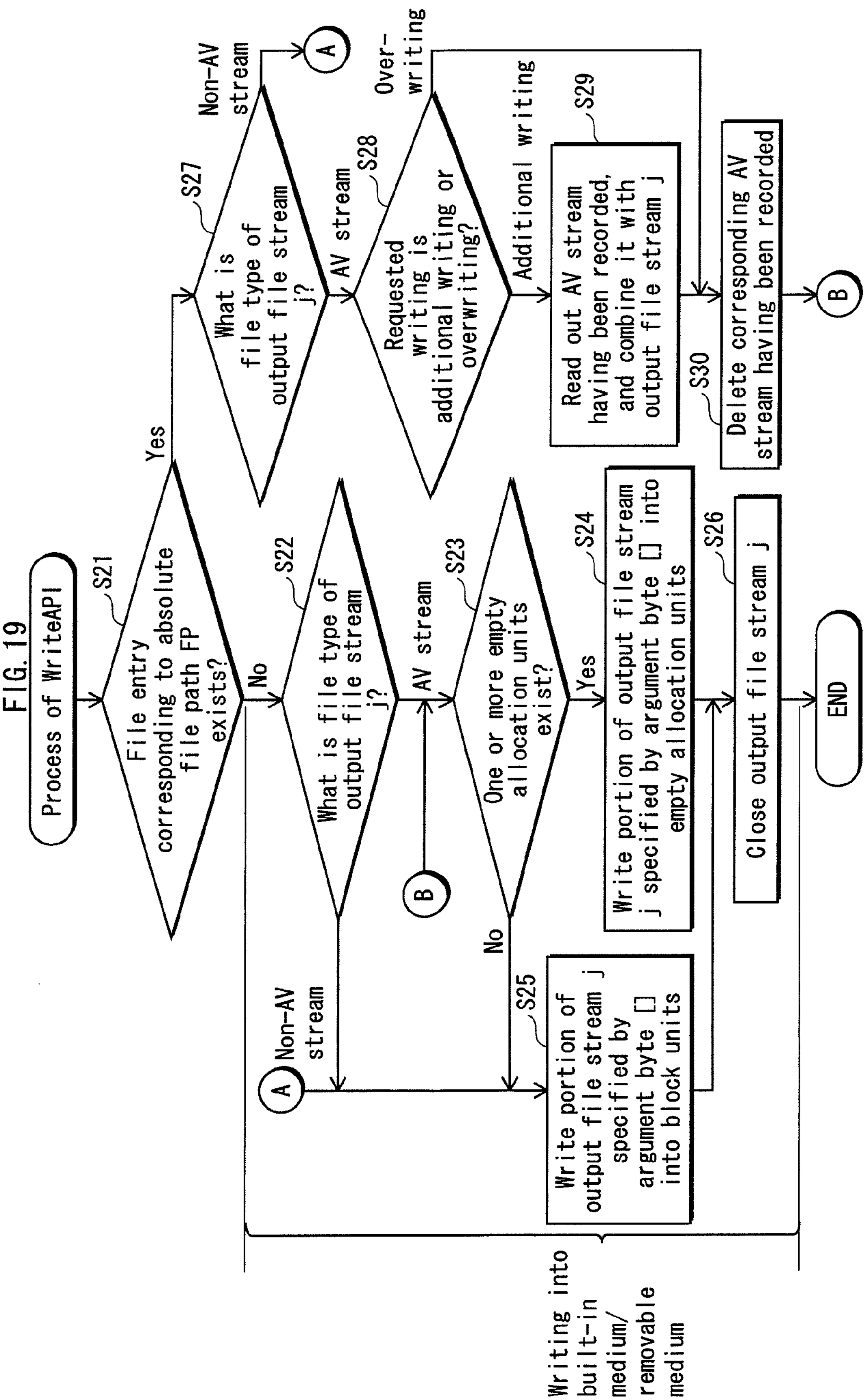
FIG. 19 is a flowchart showing the processing procedure of WriteAPI.

FIG. 19 is a flowchart showing the processing procedure of WriteAPI. This flowchart has the following judgment steps and performs further steps depending on the results of the judgment steps. It is judged whether or not a file entry corresponding to the absolute file path FP exists in the removable medium (step S21). It is judged what is the file type of the output file stream j (step S22). It is judged whether or not one or more empty allocation units exist (step S23). It is judged what is the file type of the output file stream j (step S27). It is judged whether the requested writing is additional writing or overwriting (step S28).

The judgment performed in step S21 is a judgment on whether or not the output file stream j has been recorded, and when it is judged that it has not been recorded, the control moves to the process of steps S22 through S26. The judgment performed in step S22 is a judgment on whether the additional content is in the AV stream format or in the non-AV stream format, and when it is judged that it is in the AV stream format, it is judged whether or not one or more empty allocation units exist (step S23). When it is judged that one or more empty allocation units exist, the output file stream j is written into the empty allocation units (step S24), and the output file stream j is closed (step S26).

In step S23, it is judged whether or not the additional content in the AV stream format to be written is smaller than the allocation unit in size. When it is judged that the additional content is smaller, it is judged whether or not an allocation unit exists. When it is judged that the additional content is not smaller than the allocation unit, it is judged whether or not two or more allocation units having a sufficient size for storing the additional content in the AV stream format exist.

In the writing in step S24, the additional content in the AV stream format is written into one allocation unit when the additional content to be written is smaller than the allocation unit in size; and the additional content in the AV stream format is divided into parts each having the size of the allocation unit, and the divided parts are written into the allocated two or more allocation units when the additional content to be written is larger than the allocation unit in size. When the written additional content in the AV stream format or the divided part is smaller than the size of the allocation unit, a part of the plurality of blocks constituting the allocation unit is empty.

When there is no empty allocation unit, a portion of the output file stream j that is specified by the buffer alignment b is written into empty logical blocks, and then the output file stream j is closed (step S26).

When a file entry corresponding to the absolute file path FP exists and the output file stream j has been recorded, the judgment results in Yes in step S21, and the control moves to step S27. In step S27, it is judged what is the file type of the output file stream j. When it is judged that the output file stream j is an additional content in the AV stream format, it is judged in step S28 whether the requested writing is additional writing or overwriting. When it is judged that the requested writing is additional writing, an additional content in the AV stream format having been recorded is read out and is combined with the output file stream j (step S29), and then the additional content in the AV stream format having been recorded is deleted (step S30). After this, the control moves to step S23, in which one or more empty allocation units are searched for, and then the output file stream j is written into the empty allocation units (steps S23 and S24).

Figure 20:
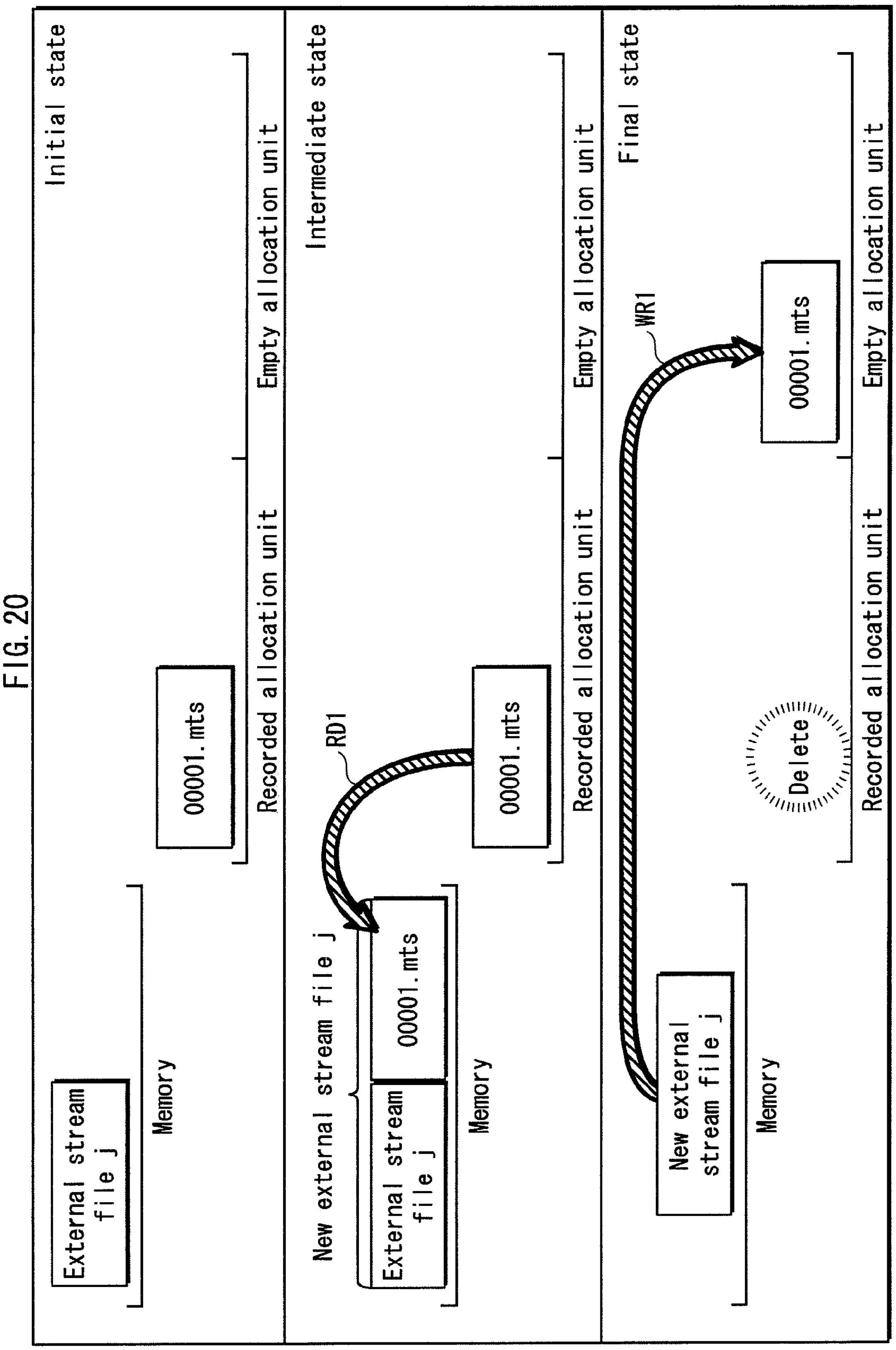
FIG. 20 shows an additional writing process to allocation units in a sequential photographic manner.

FIG. 20 shows an additional writing process to allocation units in a sequential photographic manner, which is composed of the initial state, intermediate state, and final state. In the initial state, the output file stream j exists in the memory, and 00001.mts exists in a recorded allocation unit. In the intermediate state, the process of step S29 is performed, and more specifically, 00001.mts is read out into the memory as indicated by the arrow RD1, and is combined with the output file stream j. In the final state, the process of steps S30 and S24 is performed, and more specifically, the output file stream j having been combined with 00001.mts is written into the empty allocation unit as indicated by the arrow WR1, and 00001.mts is deleted from the recorded allocation unit.

Figure 21:
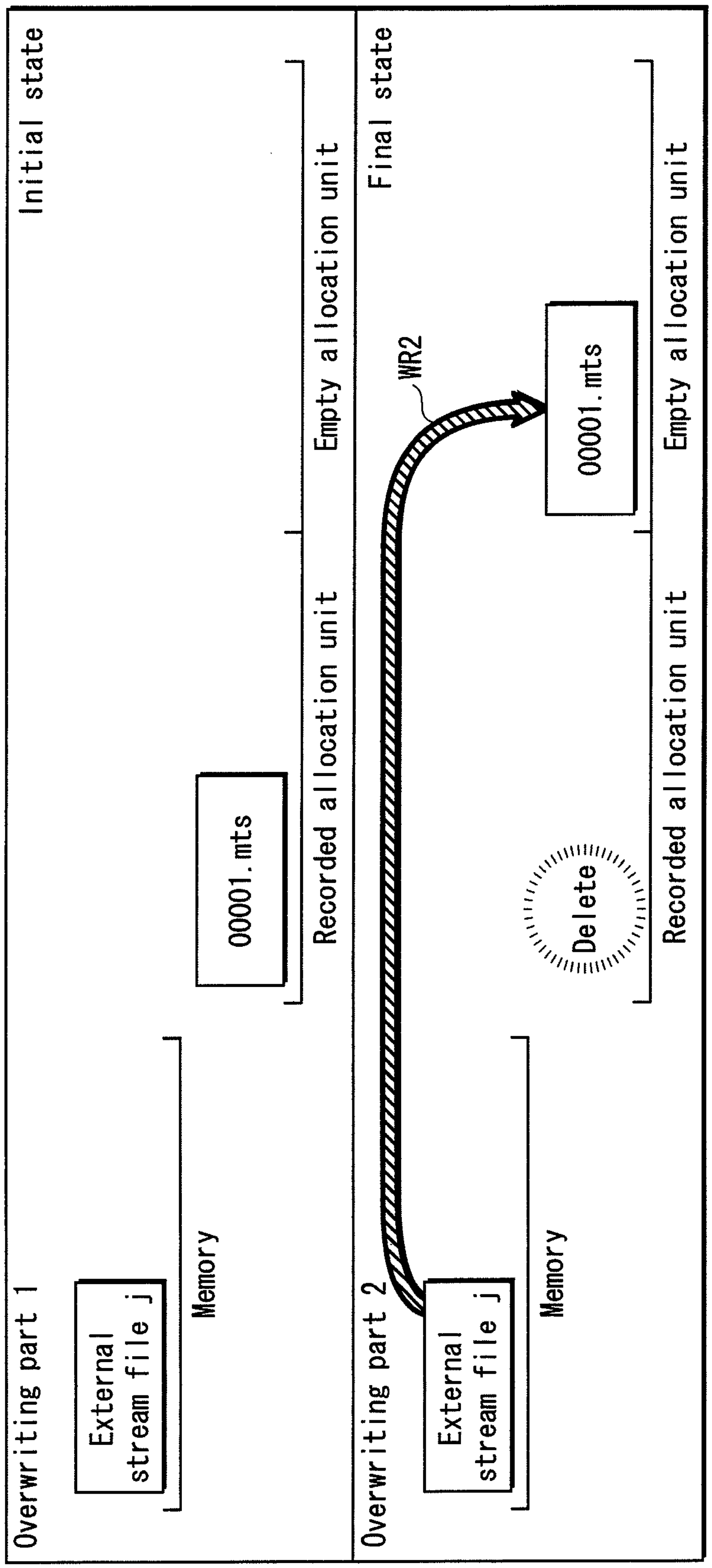
FIG. 21 shows an overwriting process to allocation units in a sequential photographic manner.

FIG. 21 shows an overwriting process to allocation units in a sequential photographic manner, which is composed of the initial state and final state. In the initial state, the output file stream j exists in the memory, and 00001.mts exists in a recorded allocation unit. In the final state, the process of steps S30 and S24 is performed, and more specifically, the output file stream j having been combined with 00001.mts is written into the empty allocation unit as indicated by the arrow WR2, and 00001.mts is deleted from the recorded allocation unit.

Figure 22:
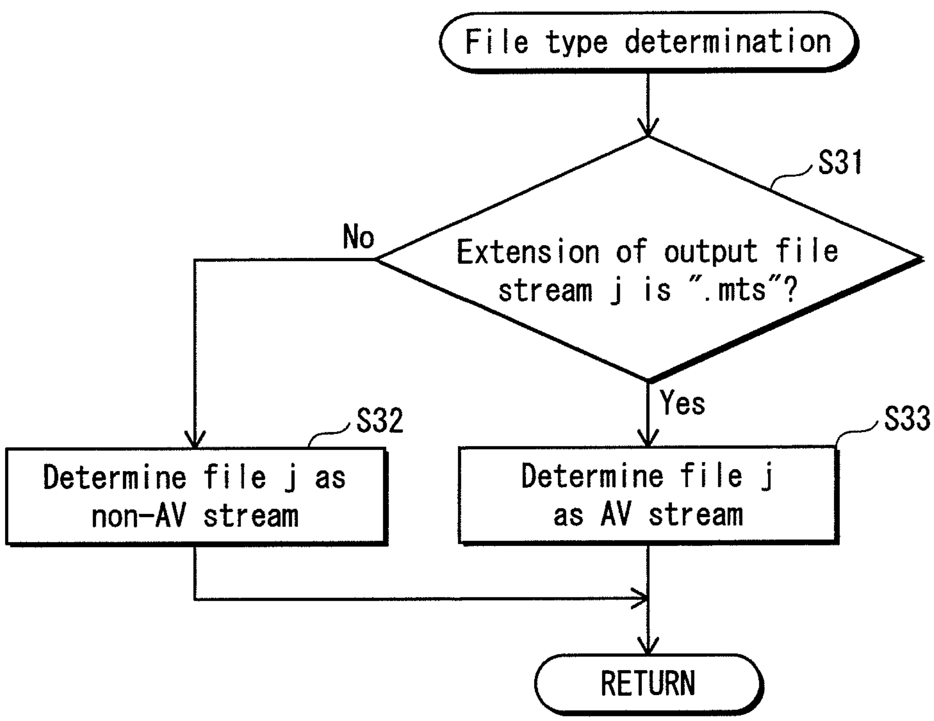
FIG. 22 is a flowchart showing the procedure of determining the file type.

FIG. 22 is a flowchart showing the procedure of determining the file type. In step S31, it is judged whether or not the extension of the output file stream j is ".mts". When it is judged that the extension of the output file stream j is ".mts", it is determined that the output file stream j is an additional content in the AV stream format (step S33). When it is judged that the extension of the output file stream j is not ".mts", it is determined that the output file stream j is an additional content in the non-AV stream format (step S32).

Figure 23:
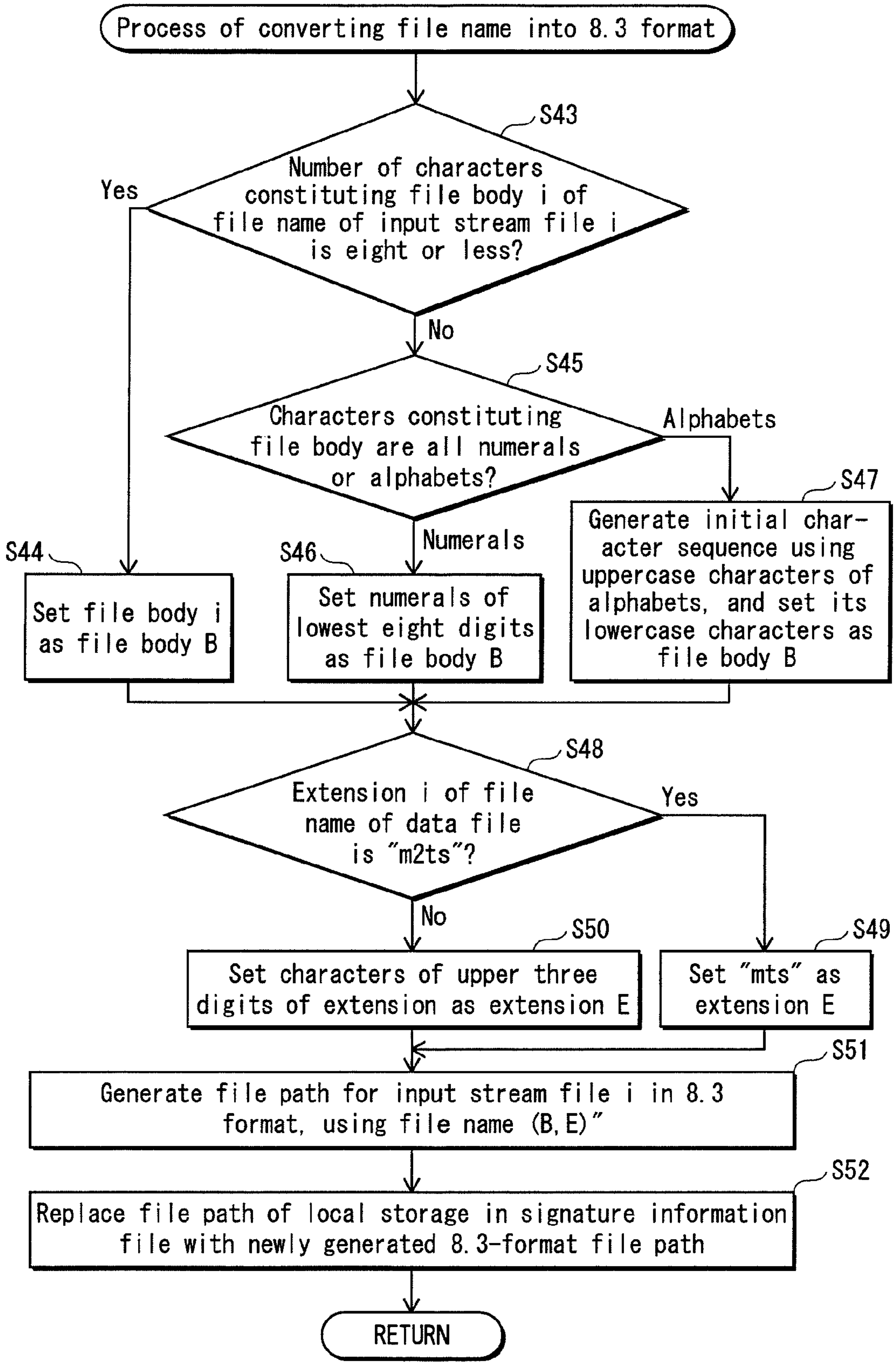
FIG. 23 is a flowchart showing the procedure of converting the file name of the additional content into the 8.3 format.

FIG. 23 is a flowchart showing the procedure of converting the file name of the additional content into the 8.3 format.

In step S43, it is judged whether or not the number of characters constituting a file body i of the file name of the additional content i is eight or less. When it is judged that the number of characters constituting the file body i is eight or less, the file body i is set as a file body B. When it is judged that the number of characters constituting the file body i is not eight or less, the control goes to step S45 in which it is judged whether the characters constituting the file body i are all numerals or alphabets.

When it is judged that the characters are all numerals, the control goes to step S46 in which the numerals of the lowest eight digits of the file body of the additional content i are set as the file body B. When it is judged that the characters are all alphabets, the control goes to step S47 in which an initial character sequence is generated by using the uppercase characters of the alphabets, and a character sequence composed of lowercase characters of the uppercase characters is set as the file body B.

In step S48, it is judged whether or not the extension i of the file name of the additional content i is ".m2ts". When it is judged that the extension i is ".m2ts", ".mts" is set as an extension E of the additional content i (step S49). When it is judged that the extension i is not ".m2ts", characters of the upper three digits of the extension are set as the extension E (step S50). After these steps, a file path for the additional content on the removable medium is generated using a combination of the file body B and the extension E (in the flowchart, it is recited as "file name (B,E)") (step S51), and the file path of the local storage in the merge management information file is replaced with the newly generated 8.3-format file name (step S52).

Figure 24:
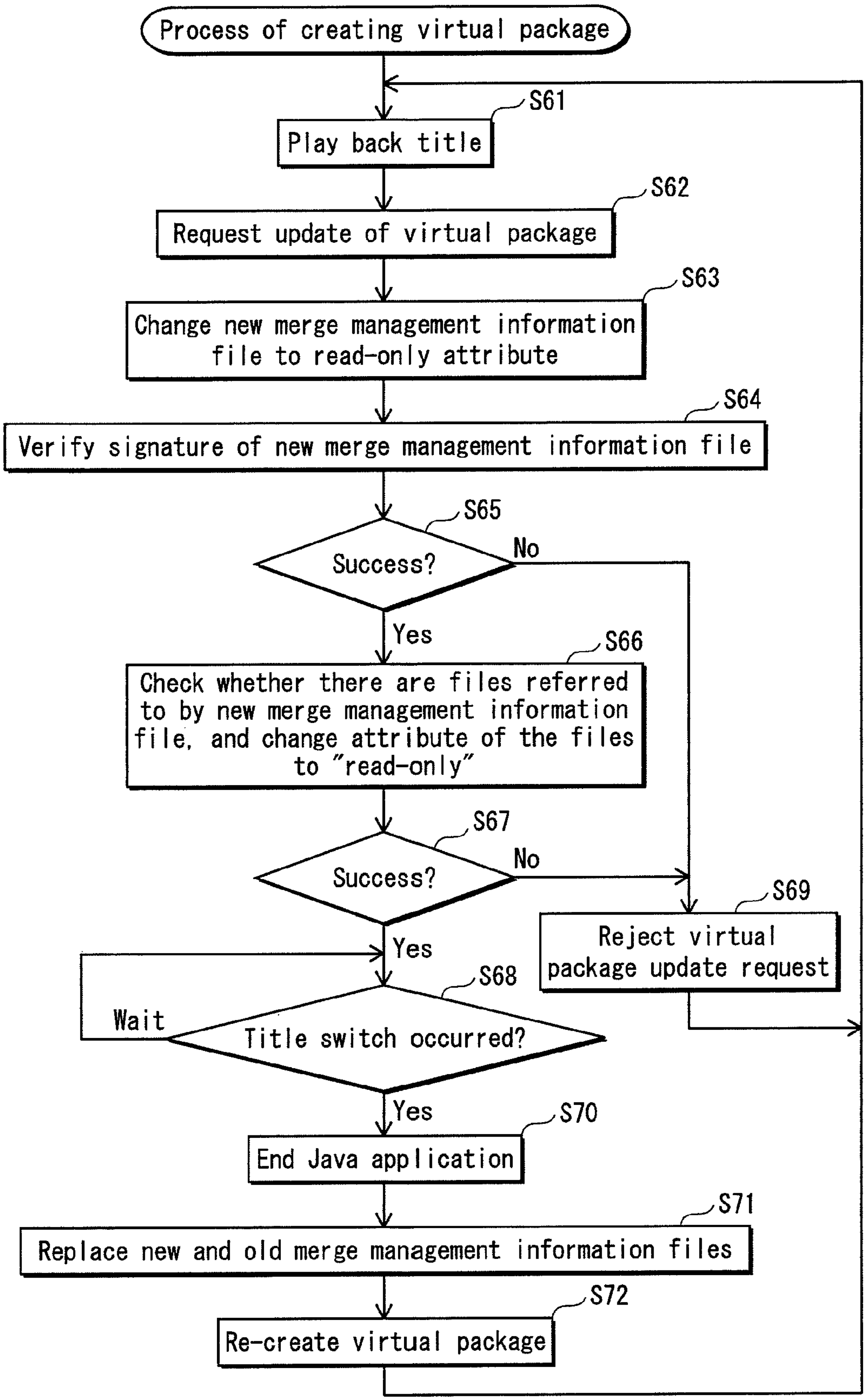
FIG. 24 is a flowchart showing the procedure of creating a virtual package in Embodiment 1.

FIG. 24 is a flowchart showing the procedure of replacing new and old merge management information files and re-creating a virtual package, when titles are switched. A title is played back in the BD-J mode (step S61). During the playback of the title, the Java™ application requests an update of the virtual package (step S62).

The value of the argument that is given when an update of the virtual package is requested is composed of a file path indicating the position of a new merge management information file and a file path indicating the position of a signature information file corresponding to the new merge management information file.

When the virtual file system 23 receives a virtual package update request, the state of the virtual file system 23 is set to "update in preparation" and the specified new merge management information file is changed to a read-only attribute so as not to be rewritten (step S63). Then the signature of the new merge management information file is verified using the signature information file having been specified when the virtual package update request was issued (step S64).

When the verification in step S64 results in the failure (No in step S65), the virtual file system 23 stops the virtual package update process, returns the attribute of the new merge management information file from "read-only" to the previous one before the reception of the virtual package update request, and throws a virtual package update request rejection notification event (step S69).

When the verification in step S64 results in the success (Yes in step S65), the virtual file system 23 checks whether or not there are files on the built-in medium/removable medium referred to by the new merge management information file, and when there are such files, changes the attribute of the files from "Java™ application" to "read-only" (step S66).

When there are not, on the built-in medium/removable medium, such files that are required for the creation of the virtual package and are referred to by the new merge management information file (No in step S67), the virtual file system 23 stops the virtual package update process, returns the attribute of the files, that was changed in steps S63 and S66, to the previous one before the reception of the virtual package update request, and throws a virtual package update request rejection notification event to the Java™ application (step S69).

After it is confirmed that all the files that are required for the creation of the virtual package and are referred to by the new merge management information file exist on the built-in medium/removable medium, and the process of changing the attribute of the files from "Java™ application" to "read-only" is completed (Yes in step S67), the virtual file system 23 sets the state of the virtual file system to "update preparation completed" and throws an update preparation completion notification event to the Java™ application.

After the state of the virtual file system is set to "update preparation completed", an occurrence of a title switch is waited (step S68). When a title switch occurs, the Java™ application that had been booted in the title before the title switch is ended (step S70). After this, when there is an old merge management information file, it is overwritten with the new merge management information file and the new and old merge management information files are replaced (step S71). When the original BD-ROM had been played back before the update of the virtual package, and there is no old merge management information file, the overwriting of the old merge management information file is not performed, and the new merge management information file is moved to a position under the DiscID directory which corresponds to the DiscID of the inserted BD-ROM, and is given the authentic merge management information file name. Similarly, replacement of new and old files and move thereof are performed with respect to the signature information file.

After the replacement of the new and old merge management information files and the replacement of the signature information files, or the move thereof are completed, the virtual package is re-created based on the new merge management information file (step S72).

After the re-creation of the virtual package, the "read-only" attribute is removed from the files on the built-in medium/removable medium that are referred to by the old merge management information file, but not by the new merge management information file such that they can be read and written by the Java™ application. Meanwhile the new merge management information file and the files on the built-in medium/removable medium that are referred to by the new merge management information file continue to have the "read-only" attribute.

After the re-creation of the virtual package, the title switched from before is played back using the title recorded on the newly created virtual package (step S61). The merge management information file corresponding to the virtual package being played back, and the files on the built-in medium/removable medium that are referred to by this merge management information file always have the "read-only" attribute while the virtual package is played back, and cannot be edited or deleted by the Java™ application.

Figure 25:
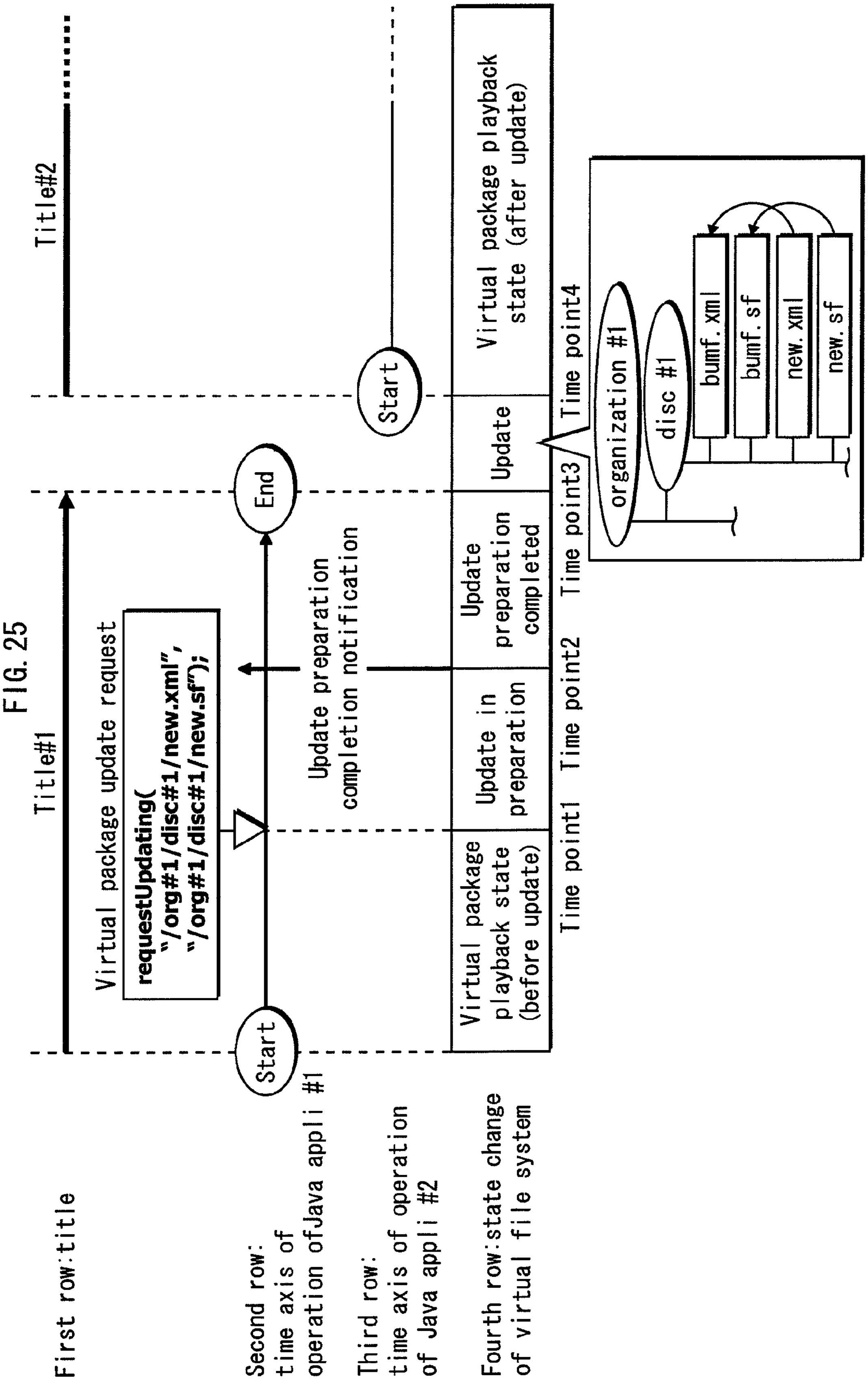
FIG. 25 shows a temporal process flow on a time axis from the issuance of a virtual package creation/update request by the Java™ application to an update of the virtual package.

FIG. 25 shows a temporal process flow on a time axis from the issuance of a virtual package creation/update request by the Java™ application to an update of the virtual package.

The first row of FIG. 25 indicates the time axis of title playback. The second row indicates the time axis of the operation of application #1. The third row indicates the time axis of the operation of application #2. The fourth row indicates the time axis of the state change of the virtual file system.

It is presumed that in the initial state shown in FIG. 25, storing of a new merge management information file and a new signature information file has completed. That is to say, it is presumed that in the initial state shown in FIG. 25, in addition to additional contents, a new merge management information file and a new signature information file, other than the merge management information file and signature information file that are used in creating the current virtual package, have been downloaded from a server on the Internet and stored on the built-in medium/removable medium.

At time point t1 while title #1 is played back, the BD-J application requests a virtual package creation/update from the virtual file system 23 via the API provided by the virtual file system management module 39. The recitation 'requestUpdating("/org#1/disc#1/new.xml", "/org#1/disc#1/new.sf")' in FIG. 25 is an API call that is the virtual package update request. The arguments "/org#1/disc#1/new.xml" and "/org#1/disc#1/new.sf" of the virtual package update request are file paths specifying the positions of the new merge management information file and signature information file on the built-in medium/removable medium. The time point t1 is a time point when this update request is issued.

At time point t1, the virtual package creation/update request is received from the BD-J application and the state is changed to "update in preparation".

Note that the "update in preparation" includes a process of changing the attribute of the specified new merge management information file and the files on the built-in medium/removable medium that are referred to by the new merge management information file, to the "read-only" attribute.

Other than this process, the signature of the new merge management information file is verified using the signature information file having been specified by the BD-J application when the virtual package update request was issued. Furthermore, it is checked whether or not all of the files recited in the file storage position information of the new merge management information file exist at the specified positions.

At time point t2, after the check on whether the files exist, the state of the virtual file system is changed to "update preparation completed". After the state transition, the update preparation completion notification event is thrown to the Java™ application. When the verification of the signature of the new merge management information file results in the failure, or when the check on whether the files recited in the file storage position information exist results in the failure, the virtual file system 23 rejects the update request and throws the update request rejection notification event to the BD-J application via the virtual file system management module 39, returning the state of the virtual file system 23 to the one ("virtual package playback state" or "BD-ROM playback state") before the "update in preparation" state. Note that the "virtual package playback state" indicates a state where the BD-ROM has been loaded in the playback device and is being played back as a virtual package by the virtual file system 23, and there is no virtual package update request that is being suspended. Note also that the "BD-ROM playback state" indicates a state where the BD-ROM has been loaded in the playback device and is being played back as an original BD-ROM, and there is no virtual package update request that is being suspended.

At time point t3, the state of the virtual file system 23 has been changed to "update preparation completed". When a title switch occurs, the virtual file system 23 replaces the old merge management information file with the new merge management information file by overwriting the old merge management information file (the merge management information file that is used in creating the current virtual package) with the new merge management information file having been specified when the virtual package update request was issued.

When the original BD-ROM had been played back before the update of the virtual package, and there is no old merge management information file, the overwriting of the old merge management information file is not performed, and the new merge management information file is moved to a position under the DiscID directory which corresponds to the DiscID of the inserted BD-ROM. With this operation, the new merge management information file is given the authentic merge management information file name (bumf.xml). Similarly, replacement of new and old files and move thereof are performed with respect to the signature information file. After the replacement of the new and old merge management information files and the replacement of the signature information files, or the move thereof are completed, the virtual file system 23 re-creates the virtual package based on the new merge management information file stored under the DiscID directory which corresponds to the DiscID of the inserted BD-ROM, and updates the file structure of the virtual package.

At time point t4, the above-described update has been completed, and the local storage 22 (the built-in medium drive 22*a* and the removable medium drive 22*b*) enters the "virtual package playback state". Even after the virtual package is updated, while it is in the "virtual package playback state", the new merge management information file and the files recorded on the built-in medium/removable medium at the positions indicated by the file storage position information of the new merge management information file continue to have the "read-only" attribute. However, the "read-only" attribute is removed from the files that are referred to by the old merge management information file, but not by the new merge management information file such that they can be read and written by the Java™ application.

Embodiment 2

When an additional content is to be written into an additional content storage area, there may be a case where the normal data area or the continuous data area does not have sufficient empty logical blocks. The present embodiment describes an error handling in case of a shortage of empty logical blocks.

Figure 26:
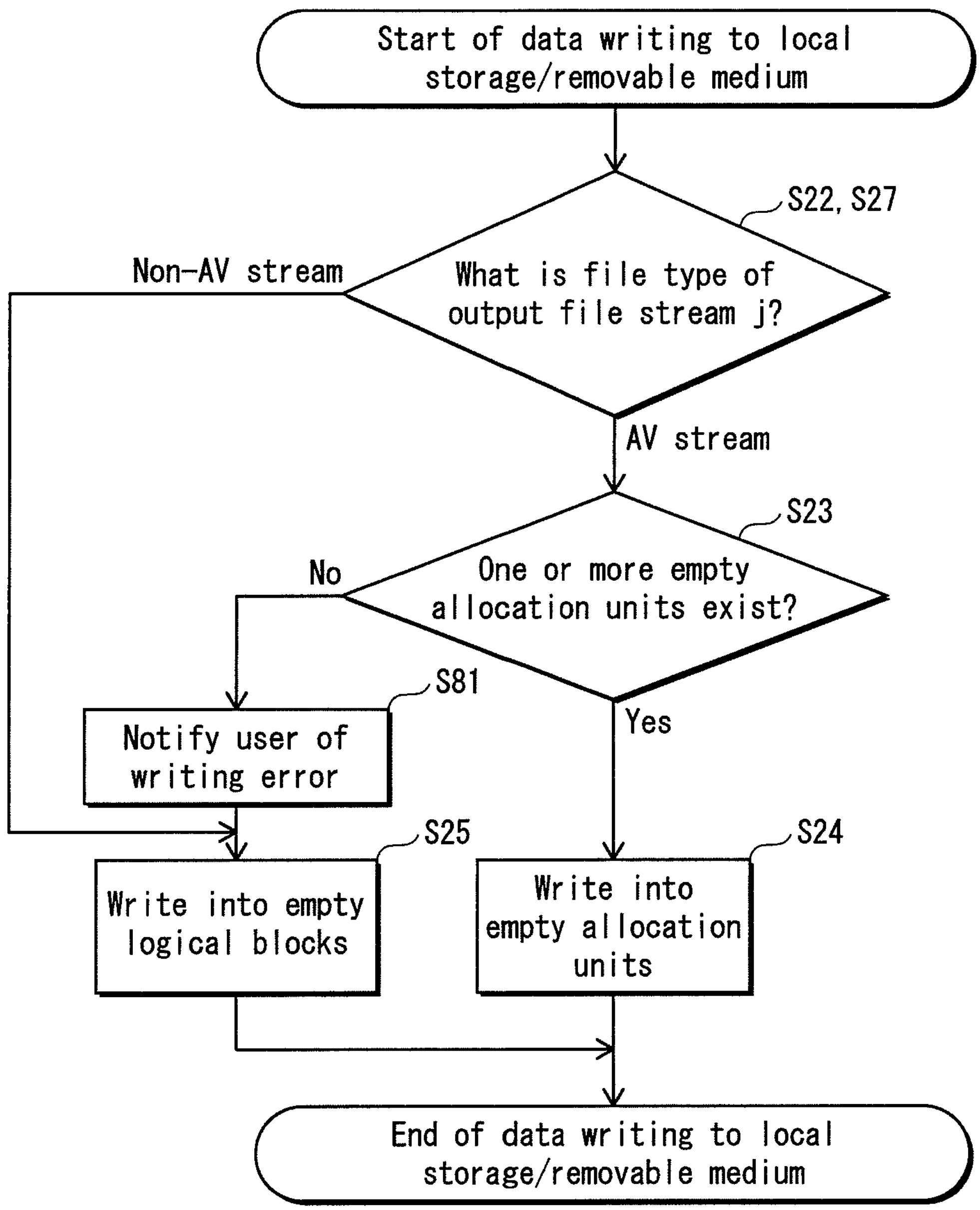
FIG. 26 is a flowchart showing the process of handling the case of a shortage of empty space in the continuous data area.

FIG. 26 is a flowchart showing the procedure of writing to a local storage, where an error handling in case of a shortage of empty logical blocks is taken into consideration. The flowchart of FIG. 26 is based on the flowchart of FIG. 19, with improvements made in steps S22 (S27), S23, S24, and S25.

When it is judged that the target file is an additional content in the AV stream format in step S22 or S27, it is judged whether or not there are one or more empty allocation units with continuous data areas in which the AV stream can be written (step S23). When it is judged that there are empty allocation units with continuous data areas, the AV stream is written into the empty allocation units of the continuous data areas (step S24).

Figure 27:
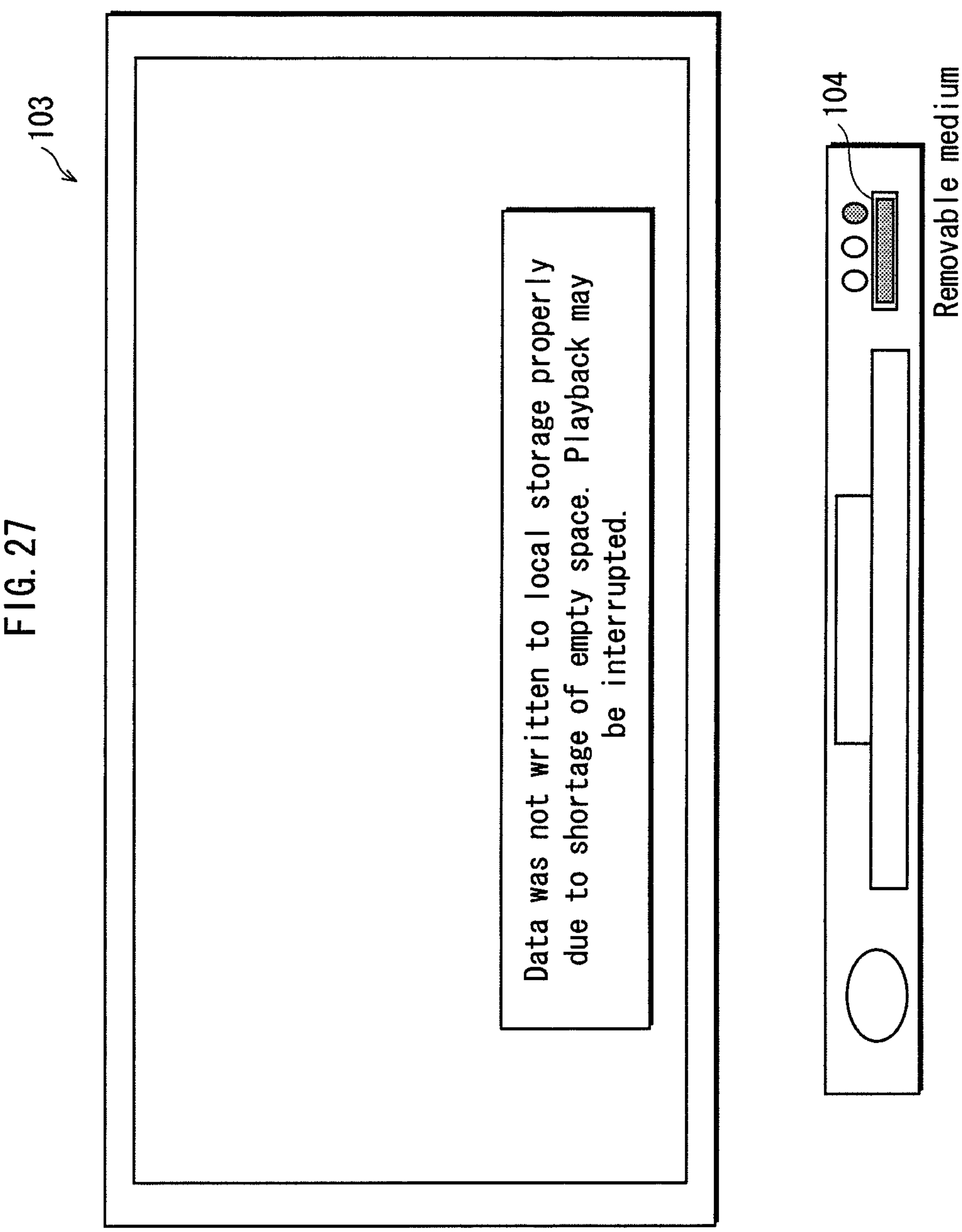
FIG. 27 shows an example of the notification to be displayed to the user when the data fails to be written into the continuous data area.

When it is judged that there are not empty allocation units due to shortage of continuous data areas in amount, there is a possibility that the real-time reading performance is not ensured due to the fragmentation. Therefore, in this case, the user is notified that the playback may be interrupted (step S81), and the control goes to step S25. FIG. 27 shows an example of the notification to be displayed to the user when the data fails to be written into the continuous data area. The example shown in FIG. 27 is a message displayed on the screen to notify the user that the playback may be interrupted since the data was not written to the local storage properly due to the shortage of empty space.

Figure 28:
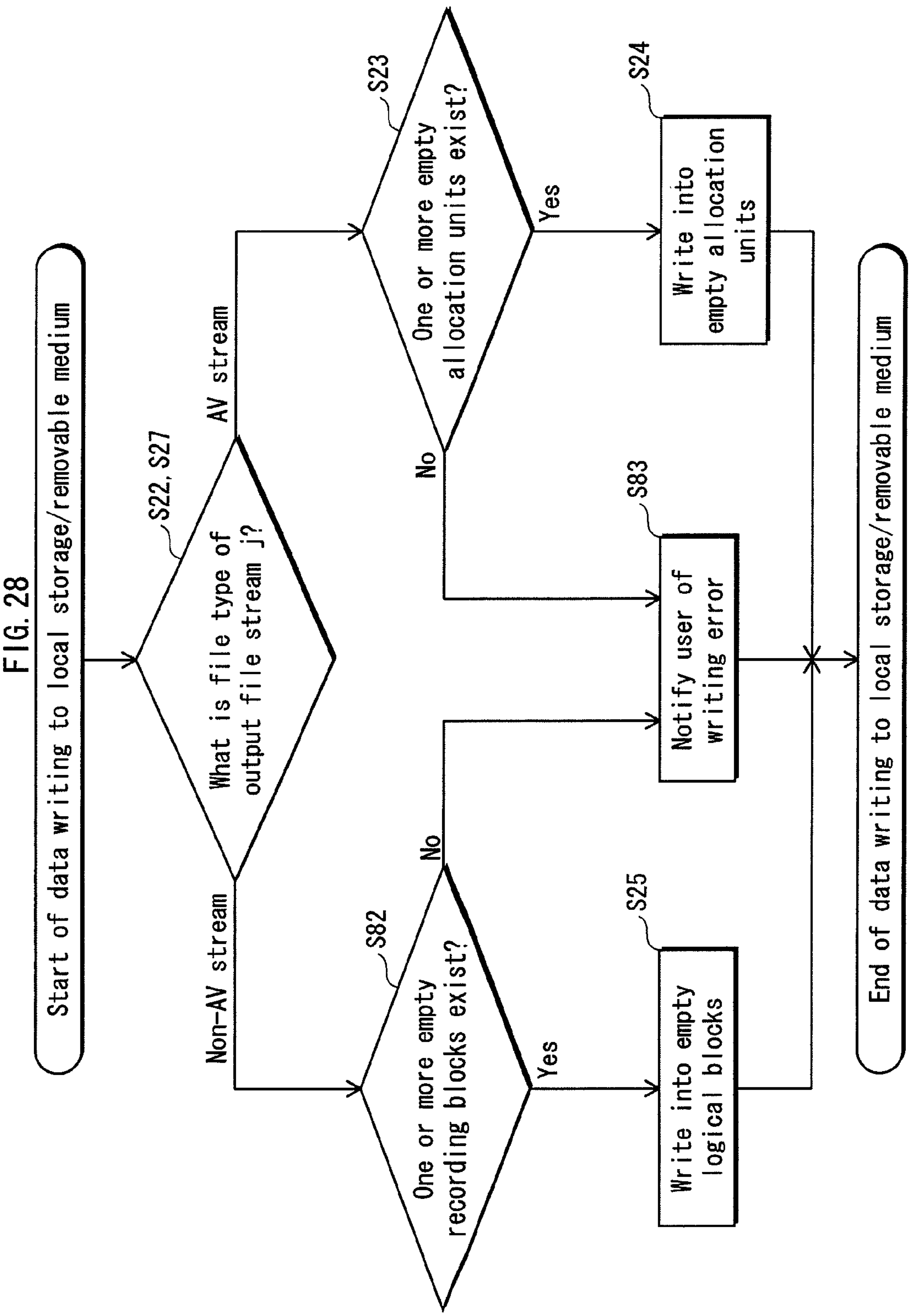
FIG. 28 is a flowchart taking into consideration the case where an AV stream writing error occurs.

FIG. 28 is a flowchart showing the procedure of writing to a local storage, where handling an AV stream writing error is taken into consideration. The flowchart of FIG. 28 features improvements made in steps S22 (S27), S23, S24, and S25.

According to the flowchart of FIG. 26, when there is no empty space in the continuous data area but there is in the normal data area, the AV stream is written to the normal data area. However, in that case, there is a possibility that the playback is interrupted. The flowchart of FIG. 28 gives priority to the playback quality, and even if there is empty space in the normal data area, the AV stream is not written to the normal data area when there is no empty space in the continuous data area (No in step S23). And then the process notifies the user that the writing of the AV stream has failed (step S83).

On the other hand, when there is no empty space in the normal data area, the writing is not performed, and the control moves to step S83 in which the process notifies the user that the writing of the AV stream has failed.

Figure 29:
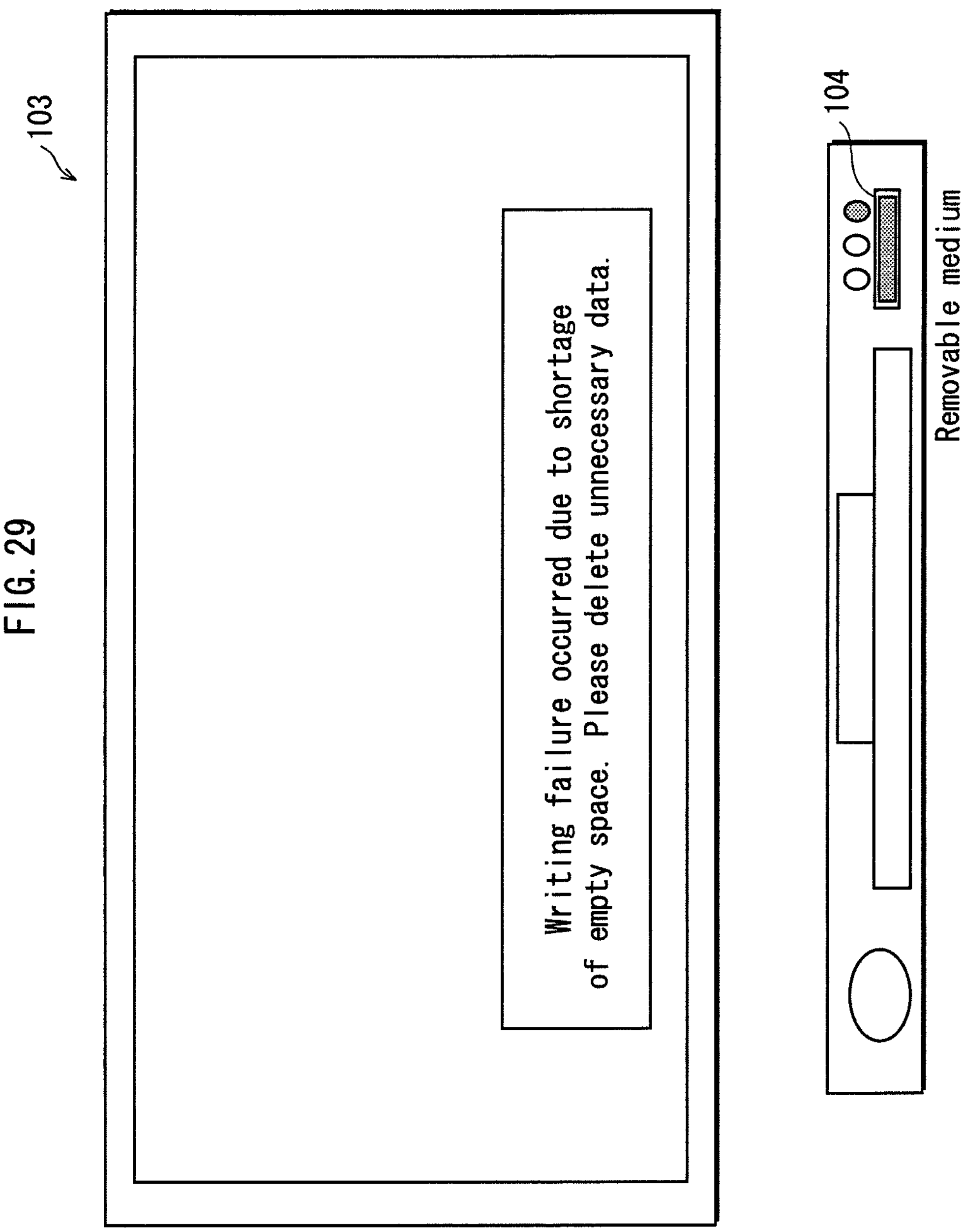
FIG. 29 shows an example of a screen display for notifying the user that the writing process has failed.

FIG. 29 shows an example of a screen display for notifying the user that the writing process has failed. The example shown in FIG. 29 is a message displayed on the screen to notify the user that the writing process has failed due to the shortage of empty space in the storage and that the user is requested to delete unnecessary data.

As described above, according to the present embodiment, even if it is requested by the Java™ application to write an additional content that includes various types of files for the virtual package, an efficient use of the storage capacity can be achieved, while ensuring the real-time performance of the added stream.

Embodiment 3

The present embodiment relates to an improvement where the allocation of the additional contents to the normal data area/continuous data area is completed by a method in which the additional contents are preliminarily written to either the normal data area or the continuous data area, and then at the timing when a virtual package creation request is received, the additional contents are moved. The allocations of the present embodiment include the allocations shown in FIGS. 30A and 30B, FIGS. 31A and 31B, and FIG. 32.

Figure 30A:
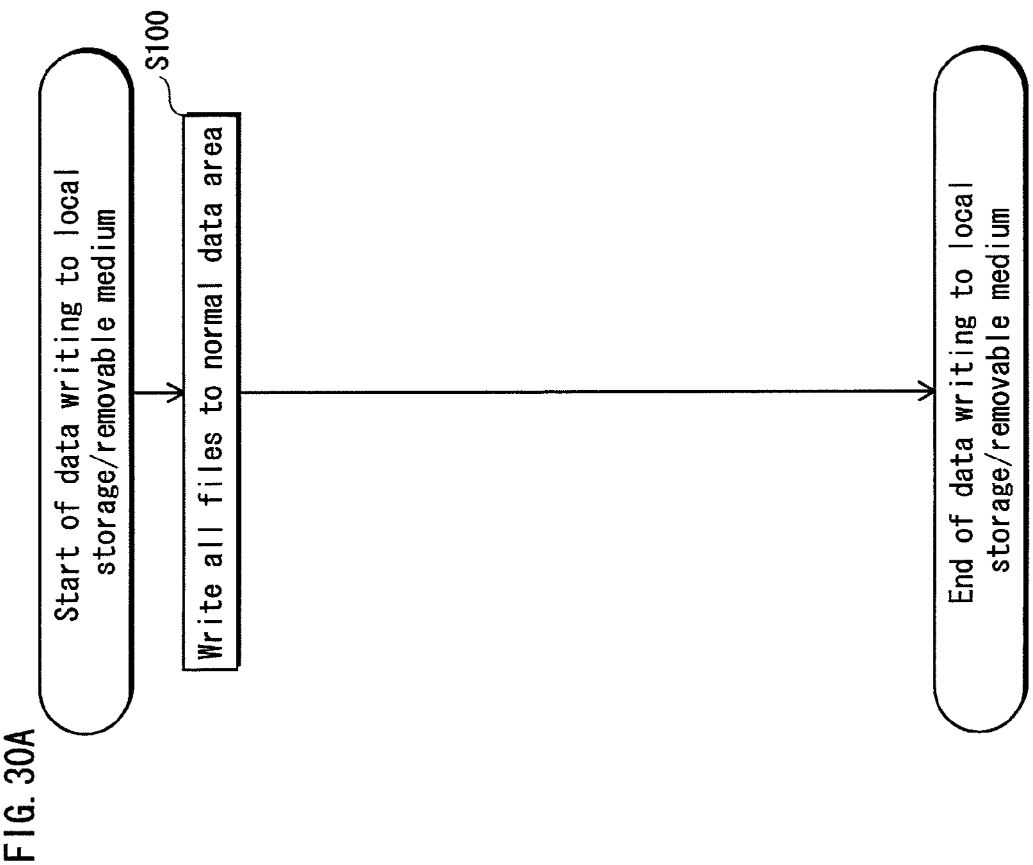
FIGS. 30A and 30B are flowcharts of the process of writing to the normal data area in batch.

FIG. 30A is a flowchart of the writing process to a local storage in Embodiment 3. In the present flowchart, the judgment on the file type of the file to be written is not performed, but all files are written to the normal data area (step S100).

Figure 30B:
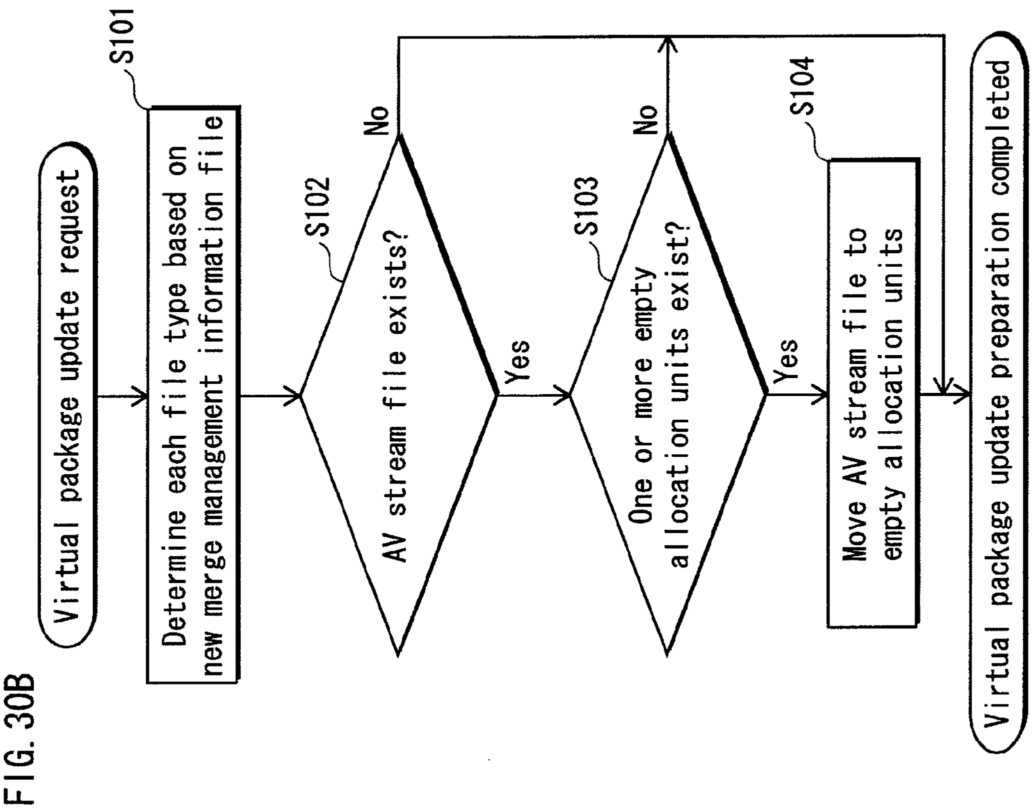

FIG. 30B is a flowchart of judging the file type in Embodiment 3. According to the present flowchart, all files are temporarily written to the normal data area, and then at the timing when a virtual package update request is received from the Java™ application, the file types are determined based on the new merge management information file specified by the Java™ application (step S101). In determining the file types, files that are indicated in the new merge management information file as being mapped as additional content files in the AV stream format on the virtual package, namely, files with file name "BDMV/STREAM/xxxxx.m2ts" on the virtual package, are judged to be additional contents in the AV stream format.

When it is judged that there is an additional content in the AV stream format (Yes in step S102), it is judged whether or not one or more empty allocation units exist (step S103). When it is judged that empty allocation units exist, the additional content in the AV stream format is moved to any of the empty allocation units (step S104). With this operation, the additional content in the AV stream format is reallocated to the continuous data area.

Figure 31A:
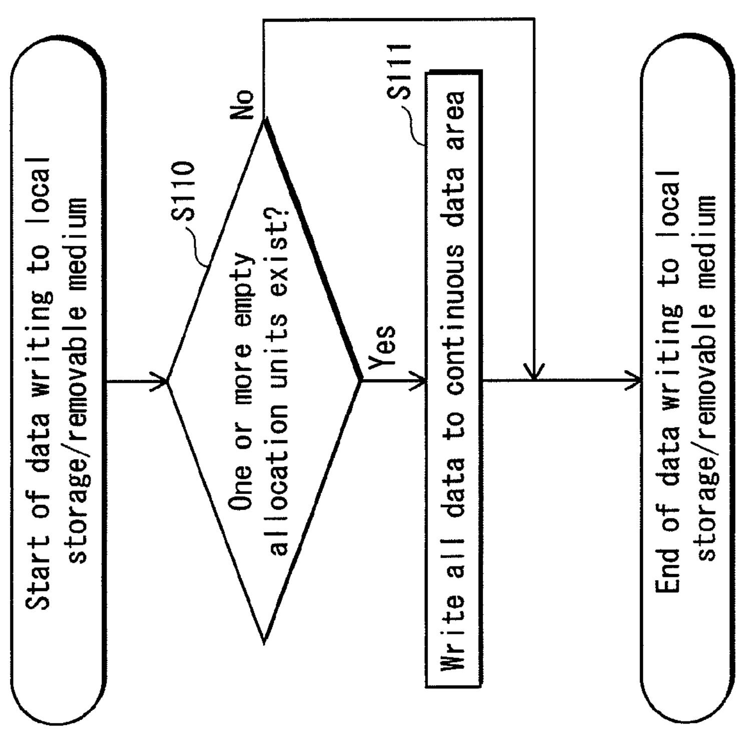
FIGS. 31A and 31B are flowcharts of the process of writing to the continuous data area in batch.

According to the flowchart shown in FIG. 31A, it is judged whether or not one or more empty allocation units exist (step S110). When it is judged that empty allocation units exist, all the additional contents having been requested to be written are temporarily written to the continuous data area (step S111).

Figure 31B:
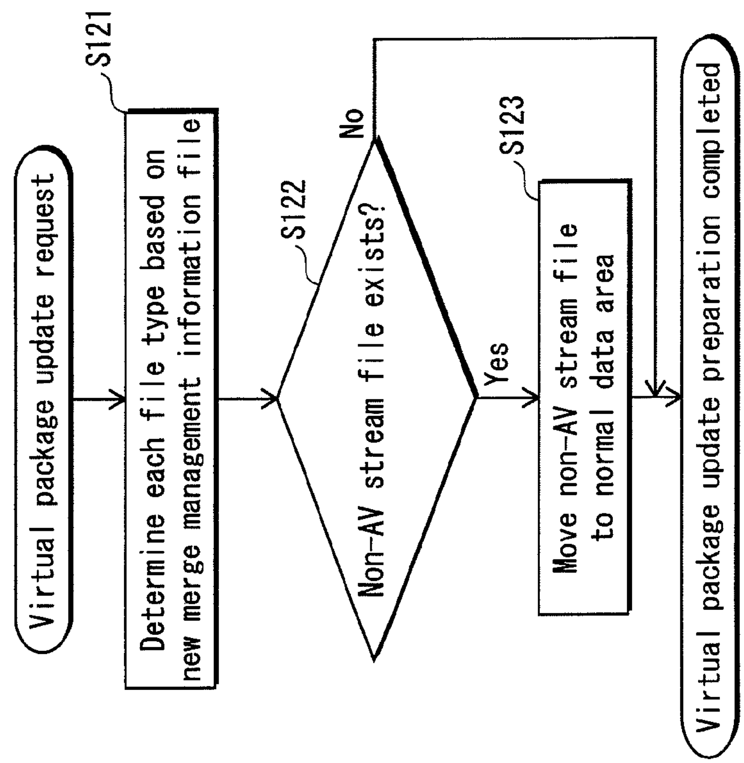

FIG. 31B is a flowchart showing the procedure of processing a virtual package update request from the Java™ application. The file type of each additional content is determined by extracting non-stream files on the virtual package from the new merge management information file (step S121). It is judged whether or not there is an additional content in the non-AV stream format (step S122), and when it is judged that there is an additional content in the non-AV stream format, the additional content is moved and reallocated to the normal data area (step S123).

Figure 32:
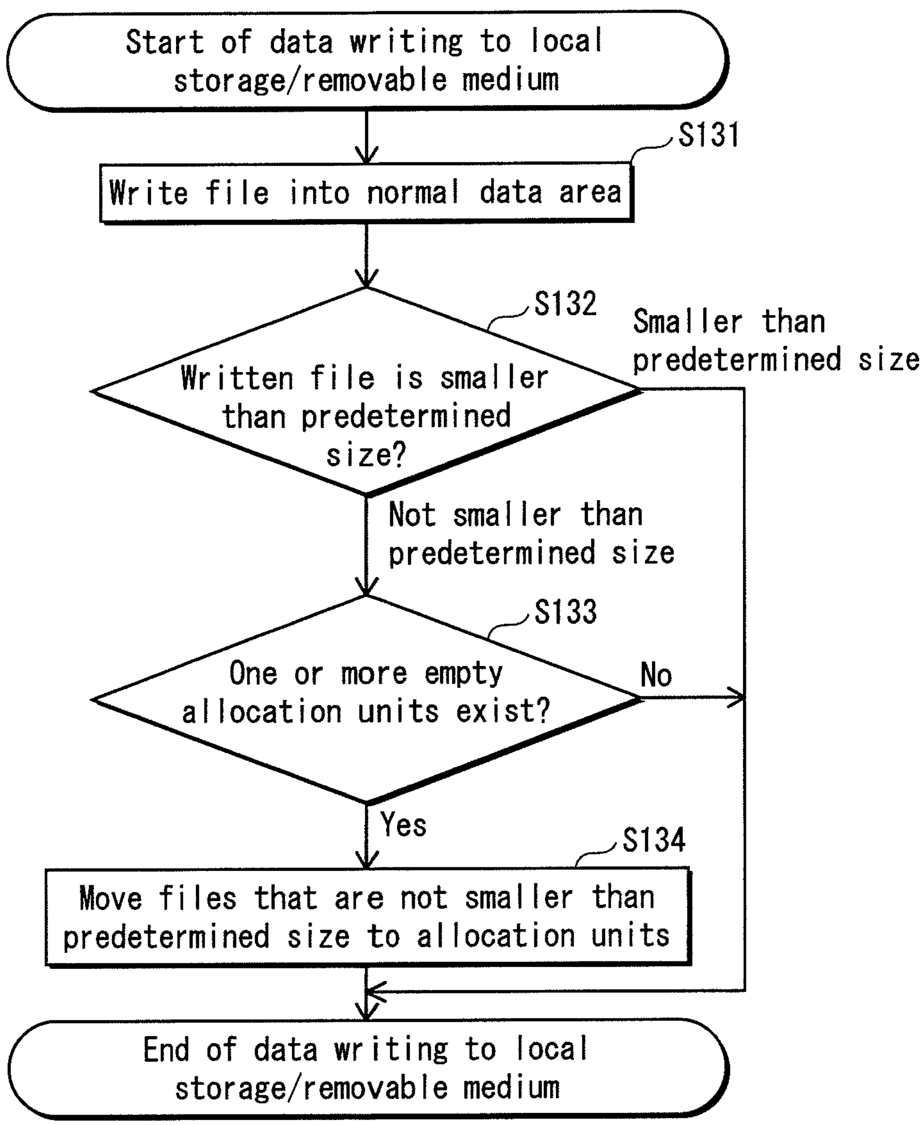
FIG. 32 is a flowchart of the process of writing to the normal data area in batch.

FIG. 32 is a flowchart showing the procedure of temporarily writing an additional content, which has been requested to be written, into the normal data area temporarily. An additional content, which has been requested to be written, is written into the normal data area temporarily (step S131). After this, the judgments are performed in steps S132 and S133. In step S132, it is judged whether or not the written additional content is smaller than a predetermined size. In step S133, it is judged whether or not one or more empty allocation units exist. When both judgments in steps S132 and S133 result in Yes, the control moves to step S134 in which additional contents that are not smaller than the predetermined size are moved to the allocation units. When any of judgments in steps S132 and S133 results in no, the process ends.

As described above, according to the present embodiment, it is not necessary to determine the file type preliminarily when a file is written, and it is possible to reallocate stream/non-stream files to the normal data area/continuous data area when the necessity arises.

Embodiment 4

In Embodiment 1, the extension is used in the judgment on whether or not an additional content, as a target to be written to the removable medium, is an AV stream. Meanwhile in the present embodiment, the judgment on whether or not an additional content is an AV stream is made based on the first byte sequence of the AV stream that has been requested by the Java™ application to be written.

Figure 33:
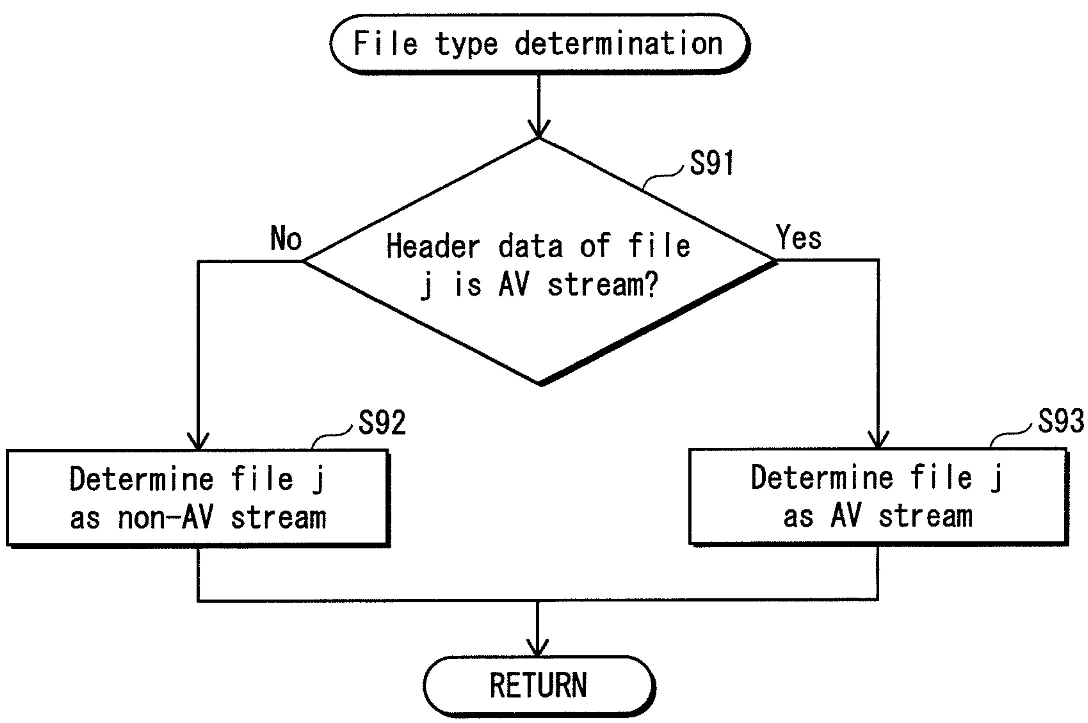
FIG. 33 is a flowchart showing the procedure of judging whether an additional content is an AV stream or a non-AV stream by checking the header data.

FIG. 33 is a flowchart showing the procedure of judging whether an additional content is an AV stream by checking the first byte sequence of the AV stream requested to be written.

In step S91, it is judged whether or not the header data of the output stream file j is an AV stream. When it is judged that the header data is an AV stream, the control moves to step S93 in which it is determined that the output stream file j is an AV stream. When it is judged that the header data is not an AV stream, the control moves to step S92 in which it is determined that the output stream file j is a non-AV stream.

As described above, in the present embodiment, it is possible to deal with the case where the extension has been disguised, and the case where the extension of the stream is undefined.

Embodiment 5

In the present embodiment, when the playback device 102 is not connected with a network and is used standalone, a personal computer of the user is used as a recording device. The recording device mentioned here is achieved by installing a software kit, which is attached to the playback device 102, into the personal computer.

The software kit causes the MPU to execute the control procedure shown in the flowcharts of FIGS. 17 through 19.

As described in the embodiments above, the removable medium includes the BUDA directory entry, CertID directory entry, Organization ID directory entry, and Disc ID directory entry, and an additional content storage area in the removable medium is identified by a file path using any of the BUDA directory name, CertID directory name, Organization ID directory name, and Disc ID directory name. Accordingly, by referring to the file paths, the recording device can recognize which BD-ROM contents can be recorded, as additional contents, onto the removable medium even if the recording device itself cannot play back the BD-ROM.

Thus the recording device monitors whether there is an additional content that can be downloaded, by referring to the file paths identifying additional content storage areas, namely the file paths using any of the BUDA directory name, CertID directory name, Organization ID directory name, and Disc ID directory name. Such monitoring is achieved by accessing the WWW site of the WWW server operated by the provider of the content, based on the organization name indicated by the Organization ID directory name, namely, by accessing the official WWW site of the content provider, to monitor the latest update state of the data recorded on the BD-ROM corresponding to the Disc ID directory of the removable medium. When the recording device is connected to the network, the recording device always monitors the latest update state, and if it finds a notice of an additional content for a BD-ROM content, the recording device downloads and writes the new additional content onto the removable medium. After the removable medium with the additional content recorded thereon is loaded into the playback device 102, the playback device 102 can create the virtual package.

The writing of the additional content by the recording medium is performed in accordance with the flowcharts of FIGS. 17 through 19. Therefore, the AV content is written into the additional content storage area.

As described above, according to the present embodiment, even when an additional content is written into the additional content storage area by the recording device that cannot play back the BD-ROM, if it is an additional content in the AV stream format, it is written into the continuous data area. With this structure, it is possible to maintain the stability of AV playback with respect to additional contents in the AV stream format.

Embodiment 6

The present embodiment explains about the AV streams to be recorded into the continuous data area. The AV streams to be recorded onto the BD-ROM are also explained for the sake of comparison.

Figure 34:
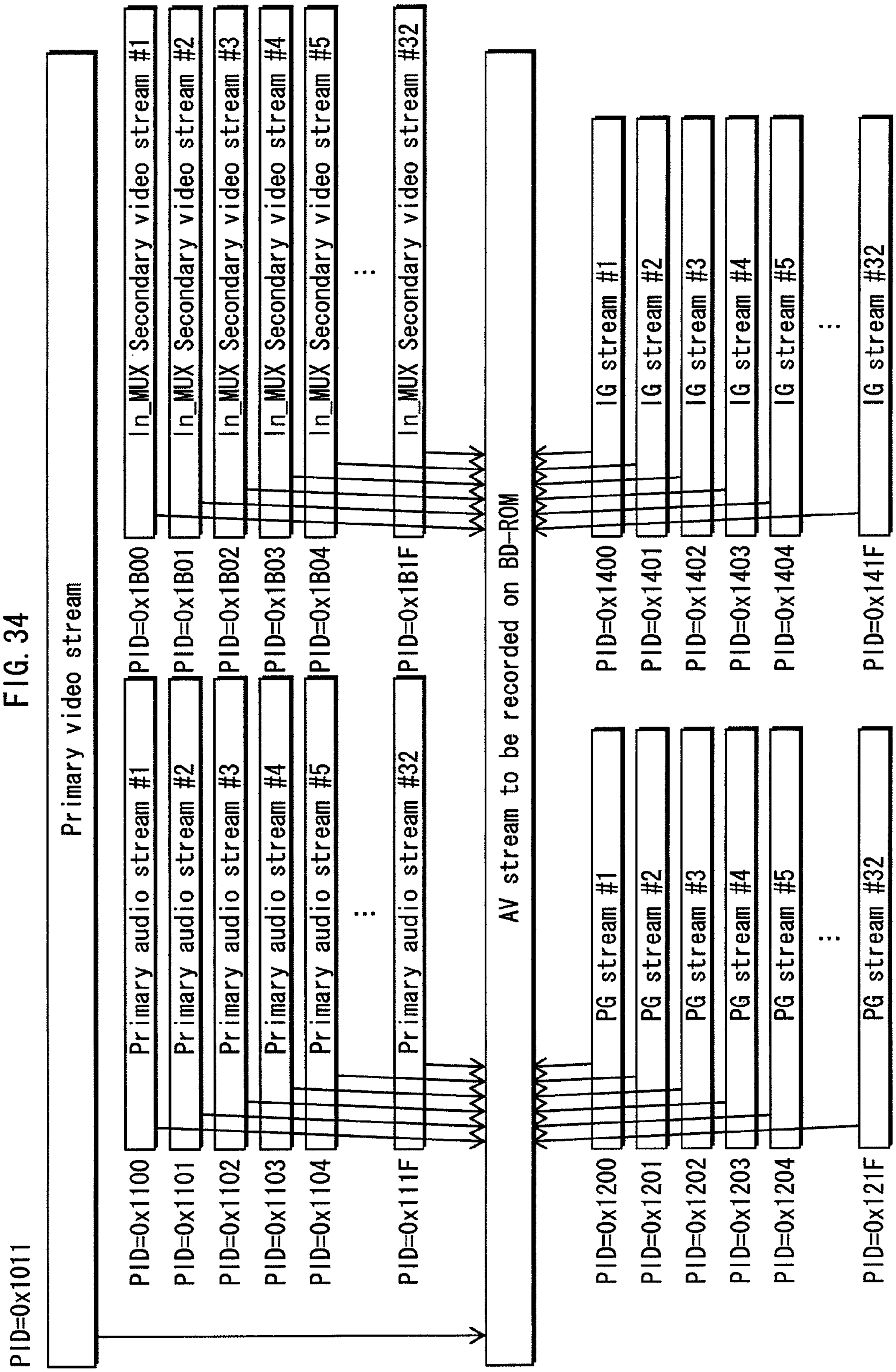
FIG. 34 shows elementary streams that are multiplexed into an AV stream in the BD-ROM.

FIG. 34 shows elementary streams that are multiplexed into an AV stream in the BD-ROM. The elementary streams that are multiplexed into the STC-Sequence of an AV stream in the BD-ROM are: a Primary video stream with PID “0x1011”; Primary audio streams with PIDs from “0x1100” to “0x111F”; 32 PG streams with PIDs from “0x1200” to “0x121F”; 32 IG streams with PIDs from “0x1400” to “0x141F”; and 32 Secondary video streams with PIDs from “0x1B00” to “0x1B1F”.

FIG. 35 shows a PID assignment map to the elementary streams recorded on the BD-ROM. The left-hand column of the PID assignment map indicates a plurality of ranges in which the PID values fall. The right-hand column of the PID assignment map indicates the elementary streams that are assigned to the ranges, respectively. From the PID assignment map shown in FIG. 35, the following will be understood: the range of PID value “0x0100” is assigned to program.map; the range of PID value “0x1001” is assigned to PCR; the range of PID value “0x1011” is assigned to Primary video stream; the range of PID values “0x1100” to “0x111F” is assigned to Primary audio stream; the range of PID values “0x1200” to “0x121F” is assigned to PG stream; the range of PID values “0x1400” to “0x141F” is assigned to IG stream; and the range of PID values “0x1B00” to “0x1B1F” is assigned to In_MUX_Secondary video stream.

The AV streams to be recorded onto the BD-ROM have been explained up to now. The following will explain in detail the AV streams to be recorded into the additional content storage area.

Figure 36:
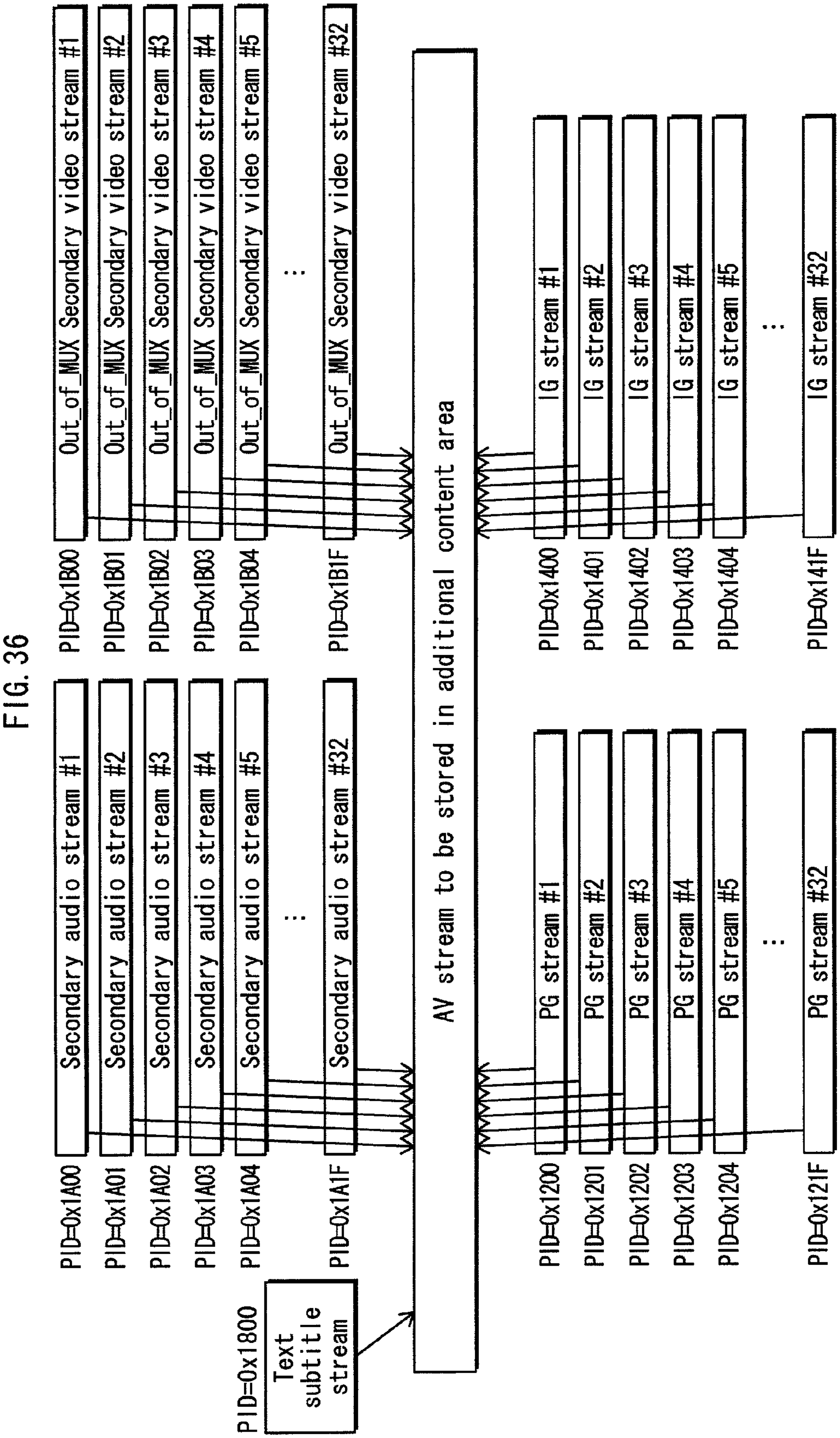
FIG. 36 shows elementary streams that are multiplexed into an AV stream to be recorded into the additional content storage area.

FIG. 36 shows elementary streams that are multiplexed into an AV stream to be recorded into the additional content storage area. The elementary streams that are multiplexed into an AV stream to be recorded into the additional content storage area are: a text ST stream with PID “0x1800”; Secondary audio streams with PIDs from “0x1A00” to “0x1A1F”; 32 Out_of_MUX Secondary video streams with PIDs from “0x1B00” to “0x1B1F”; 32 PG streams with PIDs from “0x1200” to “0x121F”; and 32 IG streams with PIDs from “0x1400” to “0x141F”. As in the Secondary video stream shown in FIG. 36, a Secondary video stream that is multiplexed with an AV stream other than the Primary video stream is called “Out_of_MUX Secondary video stream”. Not limited to the Secondary video streams, in general, an elementary stream to be multiplexed with an AV stream other than the Primary video stream is called “Out_of_MUX stream”.

FIG. 37 shows a PID assignment map to the elementary streams multiplexed in an AV stream to be recorded into the additional content storage area. The left-hand column of the PID assignment map indicates a plurality of ranges in which the PID values fall. The right-hand column of the PID assignment map indicates the elementary streams that are assigned to the ranges, respectively. From the PID assignment map shown in FIG. 35, the following will be understood: the range of PID value “0x0100” is assigned to program.map; the range of PID value “0x1001” is assigned to PCR; the range of PID values “0x1200” to “0x121F” is assigned to PG stream; the range of PID values “0x1400” to “0x141F” is assigned to IG stream; the range of PID value “0x1800” is assigned to text ST stream; the range of PID values “0x1A00” to “0x1A1F” is assigned to Secondary audio stream; and the range of PID values "0x1B00" to "0x1B1F" is assigned to Secondary video stream.

<Primary Video Stream>

The Primary video stream is a stream that constitutes a main body of a movie work, and is composed of picture data of SD images and HD images. The available formats of the video streams include VC-1, MPEG4-AVC, and MPEG2-Video. In the MPEG4-AVC video streams, time stamps PTS and DTS are attached to the IDR-Pictures, I-Pictures, P-Pictures, and B-Pictures, and the playback control is performed in units of the Pictures. One unit of video stream that has the PTS and DTS and is used as a unit in the playback control is called "video presentation unit".

<Secondary Video Stream>

The Secondary video stream is a stream that constitutes a commentary or the like of a movie work. The Picture in Picture can be executed by combining the playback image of the Secondary video stream with the playback image of the Primary video stream. The available formats of the video streams include VC-1, MPEG4-AVC, and MPEG2-Video which provide the video presentation unit. The available formats of the Secondary video streams include a "525/60" video format, a "625/50" video format, a "1920×1080" format, and a "1280×720" format.

<Primary Audio Stream>

The Primary audio stream is a stream that represents the main sounds/voices of the movie work. The available formats of the Primary audio stream include LPCM, DTS-HD, DD/DD+, and DD/MLP. Time stamps are attached to the audio frames constituting the audio streams, and the playback control is performed in units of the audio frames. One unit of audio stream that has the time stamp and is used as a unit in the playback control is called "audio presentation unit".

<Secondary Audio Stream>

The Secondary audio stream is an audio stream that represents the sub sounds/voices of the movie work, and is not recorded on the BD-ROM.

<PG Stream>

The PG stream is a graphics stream representing the subtitle for each language. There are as many streams as languages provided for the movie work, such as English, Japanese, and French. The PG stream is composed of functional segments: PCS (Presentation Control Segment); PDS (Pallet Define Segment); WDS (Window Define Segment); and ODS (Object Define Segment). The ODS is a functional segment for defining a graphics object representing the subtitle.

The WDS is a functional segment for defining the bit amount of a graphics object on the screen. The PDS is a functional segment for defining the colors of a graphics object in the drawing. The PCS is a functional segment for defining the page control in displaying the subtitle. The page control includes Cut-In/Out, Fade-In/Out, Color Change, Scroll, and Wipe-In/Out. With use of these, it is possible to achieve various display effects. For example, a subtitle can be faded out while another subtitle is displayed.

<Text Subtitle (ST) Stream>

The text ST stream is a stream that represents the contents of a subtitle by the character codes. The text ST stream represents the subtitle, although it is not multiplexed into the same AV stream as the Primary video stream. The pair of the PG (Presentation Graphics) and the text ST stream is called "PGTextST stream" in the BD-ROM standard.

<IG Stream>

The IG stream is a graphics stream for achieving an interactive control. The interactive control achieved by the IG stream is an interactive control that is compatible with an interactive control on the DVD playback device. The IG stream is composed of functional segments: ICS (Interactive Composition Segment); PDS (Palette Definition Segment); and ODS (Object Definition Segment). The ODS is a functional segment for defining a graphics object. A plurality of graphics objects draw buttons on an interactive screen. The PDS is a functional segment for defining the colors of a graphics object in the drawing. The ICS is a functional segment for achieving a state change by changing the state of a button in accordance with a user operation. The ICS includes a button command that is to be executed when the confirmation operation is performed onto a button.

Up to now, the AV streams to be recorded onto the additional content storage area have been explained. In the following, a playback control engine 24 will be described in detail.

Figure 38:
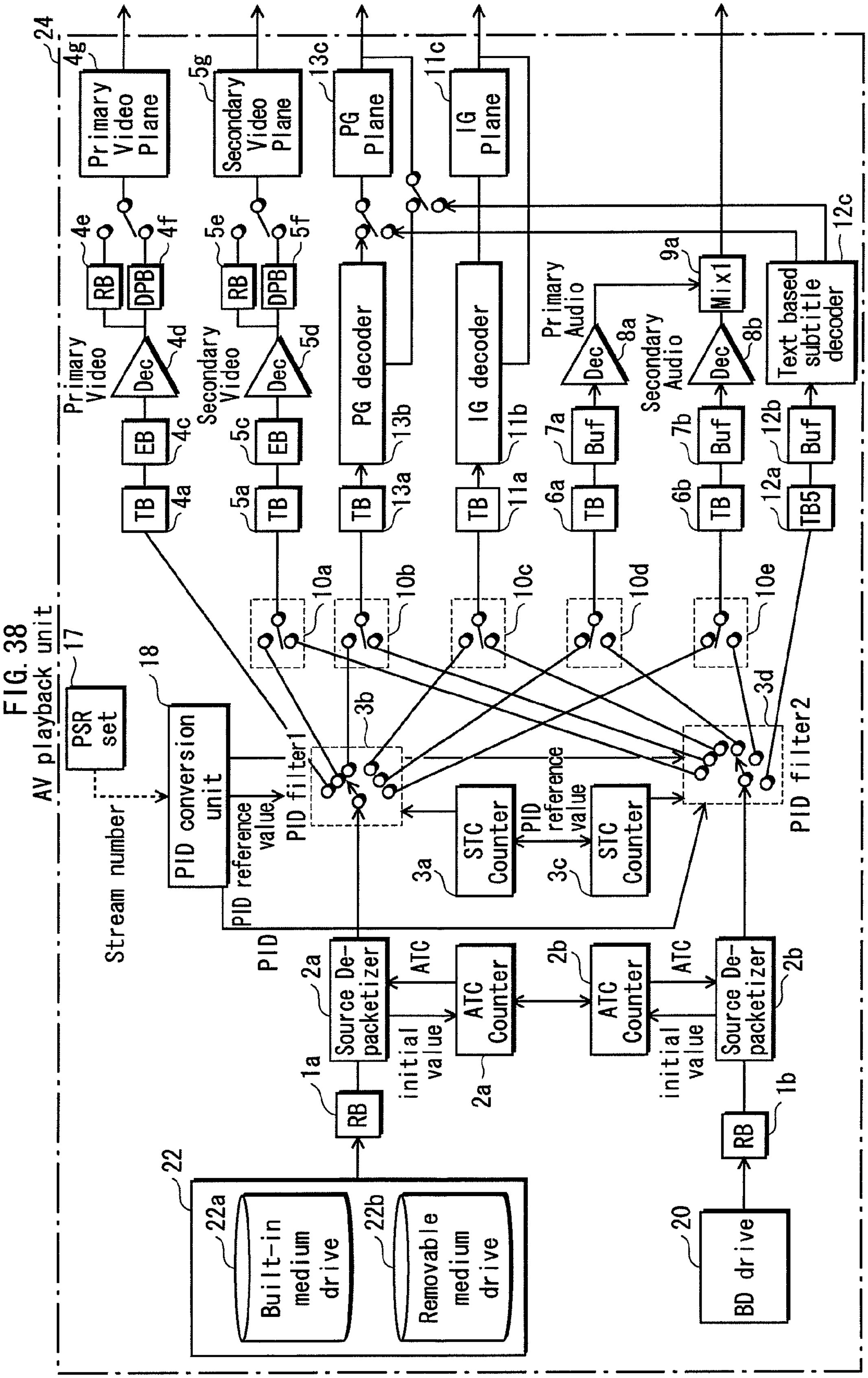
FIG. 38 shows the internal structure of the AV playback unit 24.

FIG. 38 shows the internal structure of the playback control engine 24. As shown in FIG. 38, the playback control engine 24 includes: read buffers (RB) 1*a* and 1*b*; ATC counters 2*a* and 2*b*; Source Depacketizers 2*a* and 2*b*; STC counters 3*a* and 3*b*; PID filters 3*a* and 3*b*; a transport buffer (TB) 4*a*; an elementary buffer (EB) 4*c*; a video decoder 4*d*; a re-order buffer 4*e*; a decoded picture buffer 4*f*; a Primary video plane 4*g*; a transport buffer (TB) 5*a*; an elementary buffer (EB) 5*c*; a video decoder 5*d*; a re-order buffer 5*e*; a decoded picture buffer 5*f*; a Secondary video plane 5*g*; buffers 6*a* and 6*b*; buffers 7*a* and 7*b*; audio decoders 8*a* and 8*b*; a mixer 9*a*; switches 10*a*, 10*b*, 10*c*, 10*d*, and 10*e*; a transport buffer (TB) 11*a*; an interactive graphics (IG) decoder 11*b*; an interactive graphics (IG) plane 11*c*; a transport buffer (TB) 12*a*; a buffer 12*b*; a text-based subtitle decoder 12*c*; a transport buffer (TB) 13*a*; a presentation graphics (PG) decoder 13*b*; and a presentation graphics (PG) plane 13*c*. Note that the output stage of the playback device is not shown in FIG. 38. The output stage will be described later with reference to another drawing showing the internal structure thereof.

The read buffers (RB) 1*a* stores a Source packet sequence read out from the local storage 22.

The read buffers (RB) 1*b* stores a Source packet sequence read out from the BD-ROM.

The ATC counter 2*a* is reset with use of an ATS contained in a Source packet that is located first in the playback section among a plurality of Source packets constituting the AV stream recorded on the local storage 22. After the reset, ATCs are output to the Source Depacketizer 2*a*.

The ATC counter 2*b* is reset with use of an ATS contained in a Source packet that is located first in the playback section among a plurality of Source packets constituting the AV stream recorded on the BD-ROM. After the reset, ATCs are output to the Source Depacketizer 2*b*.

The Source Depacketizer 2*a* extracts TS packets from the Source packets constituting the AV stream stored in the local storage 22, and transmits the extracted TS packets. When it transmits the TS packets, the Source Depacketizer 2*a* adjusts the time for inputting into the decoder, based on the ATS in each TS packet. More specifically, if a value of ATC generated by the ATC counter 2*a* matches a value of ATC in the Source packet when the Source Depacketizer 2*a* extracts a TS packet, then the Source Depacketizer 2*a* transfers only the TS packet to the PID filter 3*a* at the TS_Recording_Rate.

The Source Depacketizer 2*b* extracts TS packets from the Source packets constituting the AV stream stored in the BD-ROM, and transmits the extracted TS packets. When it transmits the TS packets, the Source Depacketizer 2*b* adjusts the time for inputting into the decoder, based on the ATS in each TS packet. More specifically, if a value of ATC generated by the ATC counter 2*b* matches a value of ATC in the Source packet when the Source Depacketizer 2*a* extracts a TS packet, then the Source Depacketizer 2*a* transfers only the TS packet to the PID filter 3*b* at the TS_Recording_Rate.

The STC counter 3*a* is reset with use of a PCR contained in the AV stream recorded on the local storage 22, and outputs STCs. After the reset, ATCs are output to the Source Depacketizer 2*a*. The PID filter 3*a* performs demultiplexing by referring to the ATCs output from the STC counter 3*a*.

The STC counter 3*b* is reset with use of a PCR contained in the AV stream recorded on the BD-ROM.

The PID filter 3*a* is a demultiplexer for demultiplexing the AV stream recorded on the local storage 22, selects a Source packet having a desired PID reference value from among the Source packets output from the Source Depacketizer 2*a*, and outputs the selected Source packet to the audio decoder 8*b*, interactive graphics decoder 11*b*, and presentation graphics decoder 13*b*. In this way, the element streams that are input into each decoder after passing through the PID filter 3*a* are decoded and played back in accordance with the PCR contained in the AV stream recorded on the local storage 22.

The PID filter 3*b* is a demultiplexer for demultiplexing the AV stream recorded on the BD-ROM, selects a Source packet having a desired PID reference value from among the Source packets output from the Source Depacketizer 2*b*, and outputs the selected Source packet to the video decoder 4*d*, video decoder 5*d*, audio decoder 8*a*, interactive graphics decoder 11*b*, and presentation graphics decoder 13*b*. These decoders receive element streams that have passed through the PID filter 3*b*, and decode, for playback, the element streams in accordance with the PCR contained in the AV stream recorded on the BD-ROM. In this way, the element streams that are input into each decoder after passing through the PID filter 3*b* are decoded and played back in accordance with the PCR contained in the AV stream recorded on the BD-ROM.

The transport buffer (TB) 4*a* is a buffer for temporarily storing TS packets belonging to the Primary video stream, that are output from the PID filter 3*b*.

The elementary buffer (EB) 4*c* is a buffer for storing pictures (I-Pictures, P-Pictures, and B-Pictures) that are in the encoded state.

The video decoder (Dec) 4*d* obtains a plurality of frame images by decoding each picture constituting the primary video, at a predetermined decode time (DTS), and writes the obtained frame images to the Primary video plane 4*g*.

The re-order buffer 4*e* is a buffer used to arrange the decoded pictures in order, from the encoding order to the display order.

The decoded picture buffer 4*f* is a buffer for storing uncompressed pictures that are obtained as a result of decoding by the video decoder (Dec) 4*d*.

The Primary video plane 4*g* is a memory area for storing pixel data of one picture constituting the primary video. Each piece of pixel data is represented by a 16-bit YUV value. The Primary video plane 4*g* stores pixel data corresponding to a resolution of 1920×1080.

The transport buffer (TB) 5*a* is a buffer for temporarily storing TS packets belonging to the Secondary video stream, that are output from the PID filter 3*b*.

The elementary buffer (EB) 5*c* is a buffer for storing pictures (I-Pictures, P-Pictures, and B-Pictures) that are in the encoded state.

The video decoder (Dec) 5*d* obtains a plurality of frame images by decoding each picture constituting the secondary video, at a predetermined decode time (DTS), and writes the obtained frame images to the Secondary video plane 5*g*.

The re-order buffer 5*e* is a buffer used to arrange the decoded pictures in order, from the encoding order to the display order.

The decoded picture buffer 5*f* is a buffer for storing uncompressed pictures that are obtained as a result of decoding by the video decoder (Dec) 5*d*.

The Secondary video plane 5*g* is a memory area for storing pixel data of one picture constituting the secondary video. Each piece of pixel data is represented by a 16-bit YUV value. The Primary video plane 5*g* stores pixel data corresponding to a resolution of 1920×1080.

The buffer 6*a* stores TS packets constituting the Primary audio stream, among the TS packets output from the demultiplexer 3*a*. The buffer 6*a* stores TS packets first-in-first-out so that the TS packets are sent to the audio decoder 8*a*.

The buffer 6*b* stores TS packets constituting the Secondary audio stream, among the TS packets output from the demultiplexer 3*b*. The buffer 6*b* stores TS packets first-in-first-out so that the TS packets are sent to the audio decoder 8*b*.

The audio decoder 8*a* converts the TS packets stored in the buffer 6*a* into PES packets, decodes the PES packets to obtain audio data in the uncompressed, LPCM state, and outputs the obtained audio data. This is a digital output of the Primary audio stream.

The audio decoder 8*b* converts the TS packets stored in the buffer 6*b* into PES packets, decodes the PES packets to obtain audio data in the uncompressed, LPCM state, and outputs the obtained audio data. This is a digital output of the Secondary audio stream.

The mixer 9*a* mixes the audio data in the LPCM state output from the audio decoder 8*a* with the audio data in the LPCM state output from the audio decoder 8*b*.

The switch 10*a* selects either a TS packet read out from the BD-ROM or a TS packet read out from the local storage 22, and supplies the selected TS packet to the Secondary video decoder 5*d* side.

The switch 10*b* selects either a TS packet read out from the BD-ROM or a TS packet read out from the local storage 22, and supplies the selected TS packet to the presentation graphics decoder 13*b* side.

The switch 10*c* selects either a TS packet read out from the BD-ROM or a TS packet read out from the local storage 22, and supplies the selected TS packet to the interactive graphics decoder 11*b* side.

The switch 10*d* switches between (a) TS packets that are provided from the demultiplexer 3*a* as a result of demultiplexing and constitute the Primary audio stream and (b) TS packets that are provided from the demultiplexer 3*b* as a result of demultiplexing and constitute the Primary audio stream, such that either the TS packets in (a) or the TS packets in (b) are supplied to the audio decoder 8*a*.

The switch 10*e* switches between (a) TS packets that are provided from the demultiplexer 3*a* as a result of demultiplexing and constitute the Secondary audio stream and (b) TS packets that are provided from the demultiplexer 3*b* as a result of demultiplexing and constitute the Secondary audio stream, such that either the TS packets in (a) or the TS packets in (b) are supplied to the audio decoder 8*b*.

The transport buffer (TB) 11*a* is a buffer for temporarily storing TS packets belonging to the IG stream.

The interactive graphics (IG) decoder 11*b* obtains uncompressed graphics by decoding the IG stream read out from the BD-ROM 100 or the local storage 22, and writes the obtained uncompressed graphics to the IG plane 11*c*.

The interactive graphics (IG) plane 11*c* is a plane on which pixel data constituting the uncompressed graphics obtained as a result of decoding by the IG decoder 11*b* is written.

The transport buffer (TB) 12*a* temporarily stores TS packets belonging to the textST stream.

The buffer 12*b* temporarily stores PES packets constituting the textST stream.

The text-based subtitle decoder 12*c* expands a subtitle represented by the textST stream read out from the BD-ROM 100 or the local storage 22, into a bit map and writes the bit map onto the PG plane 13*c*. In this expansion, the font data stored in the BD-ROM 100 or the local storage 22 is used. Accordingly, the font data should be read preliminarily before the textST stream is decoded.

The transport buffer (TB) 13*a* is a buffer for temporarily storing TS packets belonging to the PG stream.

The presentation graphics (PG) decoder 13*b* obtains uncompressed graphics by decoding the PG stream read out from the BD-ROM or the local storage 22, and writes the obtained uncompressed graphics to the PG plane 13*c*. With the decoding by the PG decoder 13*b*, the subtitle is displayed on the screen.

The presentation graphics (PG) plane 13*c* is a memory with an area for storing one screen of data, and can store one screen of uncompressed graphics.

The PSR set 17 is a built-in register provided in the playback device, and is composed of 64 Player Setting/Status Registers (PSRs) and 4,096 General Purpose Registers (GPRs). Among the PSRs, PSR4 through PSR8 store set values for representing the current playback time point.

Figure 39:
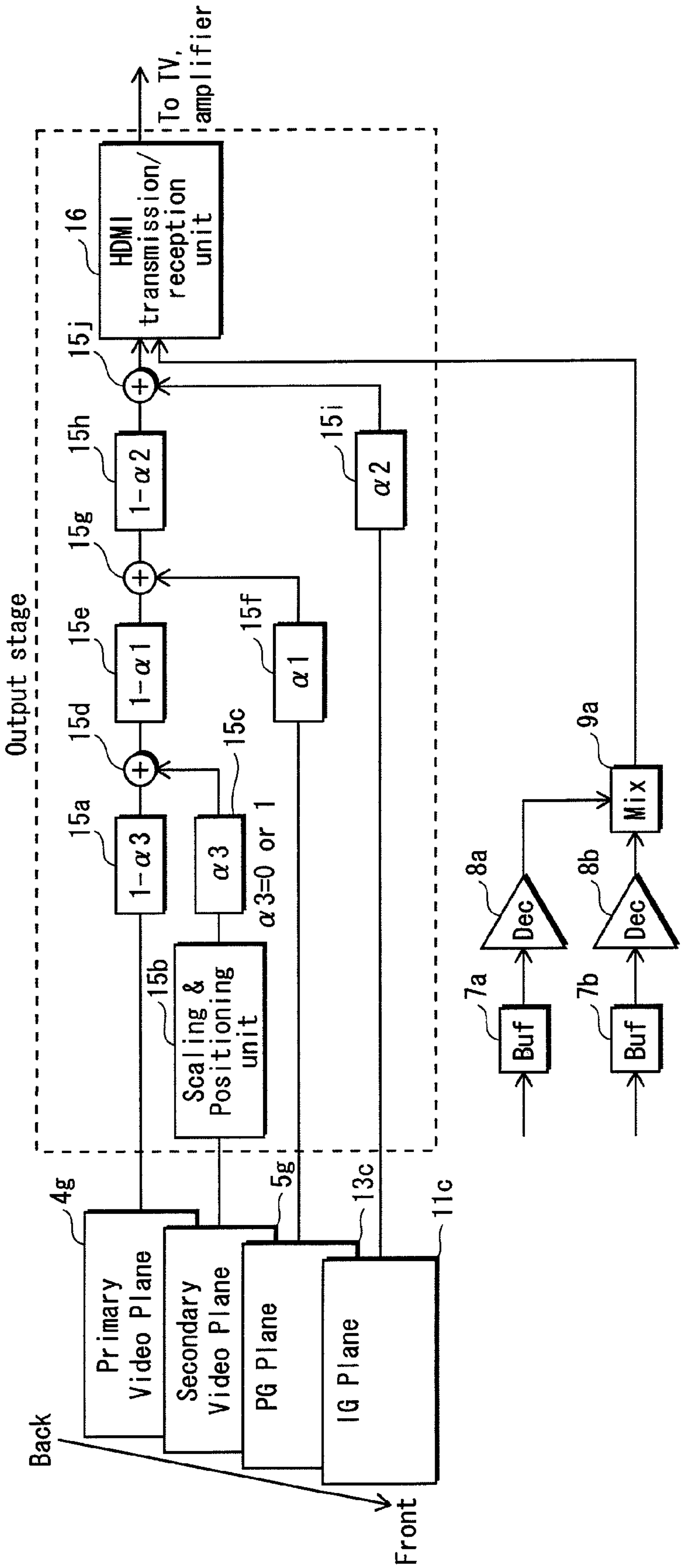
FIG. 39 shows the internal structure of the output stage of the playback device.

Up to now, the internal structure of the AV playback unit 24 has been explained. Next, the internal structure of the output stage of the AV playback unit 24 will be described. FIG. 39 shows the internal structure of the output stage of the playback device. As shown in FIG. 39, the output stage of the AV playback unit 24 includes a (1-α3) multiplication unit 15*a*, a scaling and positioning unit 15*b*, an α3 multiplication unit 15*c*, an addition unit 15*d*, a (1-α1) multiplication unit 15*e*, an α1 multiplication unit 15*f*, an addition unit 15*g*, a (1-α2) multiplication unit 15*h*, an α2 multiplication unit 15*i*, an addition unit 15*j*, and an HDMI transmission/reception unit 16.

The (1-α3) multiplication unit 15*a* multiplies transmission rate (1-α3) by the brightness of each pixel constituting an uncompressed digital picture stored in the video decoder 4*g*.

The scaling and positioning unit 15*b* performs the scaling (expanding/reducing) process onto an uncompressed digital picture stored in the video plane 5*g*, and performs the positioning process to rearrange the position thereof. The expanding/reducing is based on the PiP_scale of the metadata. The positioning is based on the PiP_horizontal_position and the PiP_vertical_position.

The α3 multiplication unit 15*c* multiplies transmission rateα3 by the brightness of each pixel constituting an uncompressed picture that has been subjected into the scaling and positioning by the scaling and positioning unit 15*b*.

The addition unit 15*d* obtains a composite picture by combining an uncompressed digital picture resulted from the multiplication of transmission rate α3 for each pixel by the α3 multiplication unit 15*c* and an uncompressed digital picture resulted from the multiplication of transmission rate (1-α3) for each pixel by the (1-α3) multiplication unit 15*a*.

The (1-α1) multiplication unit 15*e* multiplies transmission rate (1-α1) by the brightness of each pixel constituting the digital picture obtained as a result of the combination by the addition unit 15*d*.

The α1 multiplication unit 15*f* multiplies transmission rateα1 by the brightness of each pixel constituting an uncompressed graphics stored in the Presentation graphics plane 13*c*.

The addition unit 15*g* obtains a composite picture by combining an uncompressed digital picture resulted from the multiplication of transmission rate (1-α1) for each pixel by the (1-α1) multiplication unit 15*e* and an uncompressed graphics resulted from the multiplication of transmission rate α1 for each pixel by the α1 multiplication unit 15*f*.

The (1-α2) multiplication unit 15*h* multiplies transmission rate (1-α2) by the brightness of each pixel constituting the digital picture obtained as a result of the combination by the addition unit 15*g*.

The α2 multiplication unit 15*i* multiplies transmission rateα2 by the brightness of each pixel constituting an uncompressed graphics stored in the Interactive Graphics (IG) plane 11*c*.

The addition unit 15*j* obtains a composite picture by combining an uncompressed digital picture resulted from the multiplication of transmission rate (1-α2) for each pixel by the (1-α2) multiplication unit 15*h* and an uncompressed graphics resulted from the multiplication of transmission rate α2 for each pixel by the α2 multiplication unit 15*i*.

The HDMI transmission/reception unit 16 receives information of another device connected to the own device via the HDMI (High Definition Multimedia Interface), from the other device. The HDMI transmission/reception unit 16 also transmits digital uncompressed video obtained as a result of the combination by the addition unit 15*j*, to another device connected to the own device via the HDMI, together with audio data obtained as a result of the mixing by the mixer 9*a*.

As described above, the testST stream, Primary audio stream, Secondary audio stream, Out_of_MUX_Secondary video stream, PG stream, and IG stream are stored in the continuous data area of the additional content storage area. This enables the Primary audio stream and Secondary audio stream to be mixed and output smoothly without interruption, and enables the Picture in Picture to be played back smoothly without interruption.

Embodiment 7

In Embodiment 1, the AV streams are recorded into the allocation units. The present embodiment relates to an improvement where one AV stream is divided into a plurality of Extents so that the AV stream is recorded by the Extents. In such a case, the minimum data length per Extent needs to be studied. It is presumed here that the minimum data length is represented by "Sa". Originally, the AV streams are recorded onto an optical disc such as the BD-ROM, and are supplied to the playback device from the optical disc. Accordingly, in the case where the AV streams are recorded onto a removable medium and are supplied to the playback device from the removable medium, it is considered that an uninterrupted playback can be provided when it has been confirmed that an uninterrupted playback is provided by the same AV streams recorded on an optical disc such as the BD-ROM.

The TS packets read out from a removable medium are stored in a buffer called "read buffer", and then output to the decoder. The "Toverhead" is obtained by the following equation when the input to the read buffer is performed with a bit rate called "Rud" and the number of logical blocks in the ECC block is represented by "Secc":

$$Toverhead \leq (2 \times Secc \times 8)/Rud = 20 \text{ msec.}$$

TS packets read out from the removable medium are stored in the read buffer in the state of Source packets, and then supplied to the decoder at a transfer rate called "TS_Recording_rate".

To keep the transfer rate of the TS_Recording_rate while the TS packets are supplied to the decoder, it is necessary that during Tjump, the TS packets are continuously output from the read buffer to the decoder. The "Tjump" represents a time required to switch the destination to which the data read out from the removable medium is sent, from a continuous data area to another continuous data area.

Here, Source packets, not TS packets, are output from the read buffer. As a result, when the ratio of the TS packet to the Source packet in size is 192/188, it is necessary that during Tjump, the Source packets are continuously output from the read buffer at a transfer rate of "192/188×TS_Recording_rate".

Accordingly, the amount of occupied buffer capacity of the read buffer that does not cause an underflow is represented by the following equation:

$$B\text{occupied} \geq (T\text{jump}/1000 \times 8) \times ((192/188) \times \text{TS\_Recording\_rate}).$$

The input rate to the read buffer is represented by Rud, and the output rate from the read buffer is represented by TS_Recording_rate×(192/188). Therefore, the occupation rate of the read buffer is obtained by performing "(input rate)−(output rate)", and thus obtained by "(Rud−TS_Recording_rate)×(192/188)".

The time "Tx" required to occupy the read buffer by "Boccupied" is obtained by the following equation:

$$Tx.B\text{occupied}/(Rud.\text{TS\_Recording\_rate} \times (192/188)).$$

When reading from the removable medium, it is necessary to continue to input TS packets with the bit rate Rud for the time period "Tx". As a result, the minimum data length "Sa" per Extent when the AV stream is divided into a plurality of Extents to be recorded, is obtained by the following equations:

$$Sa = Rud \times Tx$$

$$= Rud \times .\text{occupied}/(Rud.\text{TS\_Recording\_rate} \times (192/188))$$

$$\geq Rud \times (T\text{jump}/1000 \times 8) \times ((192/188) \times \text{TS\_Recording\_rate})/(Rud.\text{TS\_Recording\_rate} \times (192/188))$$

$$\geq (Rud \times T\text{jump}/1000 \times 8) \times \text{TS\_Recording\_rate} \times 192/(Rud \times 188.\text{TS\_Recording\_rate} \times 192).$$

Hence, $$Sa \geq (T\text{jump} \times Rud/1000 \times 8) \times (\text{TS\_Recording\_rate} \times 192/(Rud \times 188.\text{TS\_Recording\_rate} \times 192)).$$

If each file extent constituting the AV stream has the data length that is equal to or larger than "Sa" that is calculated as a value that does not cause an underflow of the decoder, even if the Extents of each file constituting the AV stream are located discretely on the removable medium, TS packets are continuously supplied to the decoder so that the data is read out continuously during playback. The uninterrupted playback of AV streams is ensured when a continuous recording area supporting the "Sa" is allocated in the removable medium.

As described above, according to the present embodiment, when one AV stream is divided into a plurality of portions having the minimum data length that ensures an uninterrupted AV playback, and AV stream is recorded by the divided portions into the removable medium, and the AV stream supplied from the removable medium is played back, an uninterrupted playback is ensured.

<Supplementary Notes>

Up to now, the present invention has been described through the best modes or embodiments for carrying the invention that the Applicant recognize as of now. However, further improvements or changes can be added regarding the following technical topics. Whether to select any of the embodiments or the improvements and changes to implement the invention is optional and may be determined by the subjectivity of the implementer.

<"0"s in Upper Digits of DiscID>

Applications that operate on the MHP (Multimedia Home Platform) omit "0"s in the upper digits of IDs unique to the MHP. When the DiscID is used, it is also preferable to omit "0"s in the upper digits thereof. In view of this, in the embodiments of the present invention, the Java™ application may instruct to create a virtual package using a DiscID where "0"s in the upper digits thereof are omitted.

Figure 40:
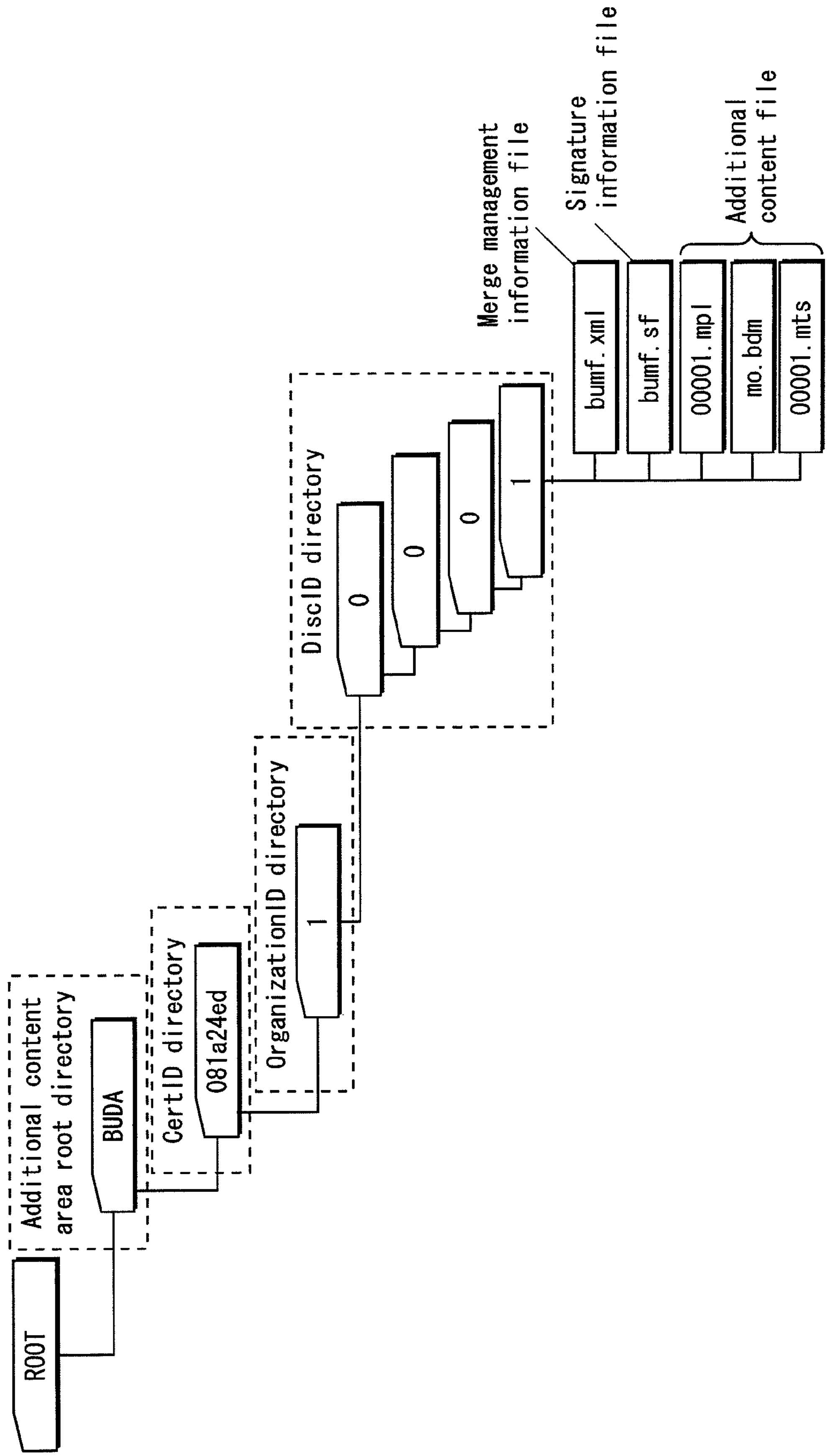
FIG. 40 shows the directory structure when "0"s in the upper digits are omitted.

In the case where "0"s in the upper digits are omitted, the removable medium has the directory structure as shown in FIG. 40.

FIG. 40 shows the directory structure when "0"s in the upper digits are omitted. The Organization ID directory and DiscID directory respectively have directory names that are a 32-bit Organization ID and a 128-bit DiscID represented in hexadecimal notation.

Of these, the DiscID has been made to shorten the entire path length by omitting the initial "0"s. However, when all initial eight characters are "0", the directory name is made of one character "0". Also, in the DiscID, when the intermediate part, not the initial part, includes a continuation of "0"s, the "0"s are not omitted. More specifically, when DiscID=00000000123456781234567812345678, the initial "0"s can be omitted, and the directory structure of the DiscID becomes 0/12345678/12345678/12345678. However, when DiscID=12345678000000001234567812345678, the continuous "0"s are not omitted, and the directory structure of the DiscID becomes 12345678/00000000/12345678/12345678. The target of the omission of initial "0"s is not limited to the DiscID, but may be CertID, as well.

<Variation of Continuous Data Area>

In the above-described embodiments, 4 MB allocation units constitute the continuous data area as the recording units. However, not limited to the allocation units, any recording unit may be used in so far as it ensures the playback quality of the additional contents in the AV stream format. For example, on an optical disc of the Zone CLV (Constant Linear Velocity) method, such as DVD-RAM and BD-RE, continuous 2 MB sectors in each Zone area may be used as the continuous data area. Also, sectors constituting ECC blocks may be used as the continuous data area. Further, the size of the recording unit of the continuous data area is not limited to 4 MB, but may be 3 MB or 2 MB.

Furthermore, it is described in the embodiments that the continuous data area is provided in the additional content storage area. However, the physical continuous data areas may be discretely provided when the continuous data areas can be identified by the absolute file paths. Similarly, it is described in the embodiments that the normal data area is provided in the additional content storage area of the BUDA directory. However, the physical normal data areas may be discretely provided when the normal data areas can be identified by the absolute file paths.

<Obtaining Unit>

It has been explained earlier that the obtaining unit described in "Means to Solve the Problems" section corresponds to the network interface 21. However, the additional contents may not necessarily be obtained via the network, but may be obtained via the USB connector or the HDMI connector, or may be obtained by copying from other recording mediums.

<Types of Second Recording Medium>

It is described in the embodiments that an SD memory card is an example of the second recording medium. However, the second recording medium may be a built-in medium such as HDD that supports the long file name, under the condition that a file system with the 8.3 format is adopted.

In this case, the BD-J application accesses the built-in medium as the second recording medium, using a directory name composed of eight or less characters, a file name composed of eight or less characters, and an extension composed of three or less characters.

<Programming Language Application Range>

It is described in the embodiments that Java™ is used as the programming language for the virtual machine. However, not limited to Java™, other programming languages, such as B-Shell, Perl Script, and ECMA Script, which are used in UNIX™ OS or the like, are available.

<Location of Contents>

It is described in the embodiments that the playback device plays back the BD-ROM. However, the present invention produces the same advantageous effect when the necessary data explained in the embodiments to be recorded on the BD-ROM are recorded on a writable optical recording medium.

<Optional Structural Elements of Playback Device 102>

The playback device 102 may be provided with a rendering engine as an optional element. The rendering engine is provided with basic software such as Java™ 2D or OPEN-GL, draws computer graphics in accordance with instructions fro a BD-J application, and outputs the drawn computer graphics to a plane memory. To perform the drawing at a high speed, it is preferable that a graphics accelerator is added to the playback device 102. Further, a floating pointed coprocessor for performing the floating point calculation may be implemented.

<How to Supply BD-J Application>

The above-described writing of additional contents can be applied to any device that can play back by associating the image playback with execution of the BD-J application. For example, it is applicable to the playback device 102 that is supplied with a BD-J application incorporated in broadcast waves or network streams.

<Program Description Language Application Range>

It is described in the embodiments that Java™ language is used as the object-oriented programming language. However, not limited to Java™, other programming languages, such as B-Shell, Perl Script, and ECMA Script, which are used in UNIX™ OS or the like, are available.

<BD-ROM Contents>

It is described in the embodiments that the BD-J application to be recorded on the BD-ROM is an application that constitutes a movie work. However, any application that is used while it is recorded on the BD-ROM may be the application to be recorded on the BD-ROM, excluding the applications that are used after they are installed into a local storage. For example, the application to be recorded on the BD-ROM may be an application constituting game software. Also, in the embodiments, the BD-ROM is selected as the disc medium. However, any portable recording medium for storing copyright-protected data may be adopted.

It is described in the embodiments that the AV streams and PlayList information are recorded onto the BD-ROM by the pre-recording technology and supplied to the users. However, they may be recorded onto the BD-RE by the real-time recording technology and supplied to the users.

In this case, the AV streams may be transport streams that are obtained by the recording device by encoding the analog input signals by the real time encoding, or may be transport streams that are obtained by the recording device by partializing the digitally input transport streams.

In the real-time recording, the recording device performs the process of generating the Clip information and PlayList information on the memory, as well as performing the process of recording an AV stream. More specifically, the recording device generates the Clip information and PlayList information, that are described in the embodiments, on the memory. After recording the AV stream, the recording device writes the generated Clip information and PlayList information onto the recording medium. With this structure, it is possible to generates the Clip information and PlayList information that are described in the embodiments, by using a home recording device or a personal computer that is provided with the functions of the recording device. Further, the AV stream, Clip information and PlayList information generated in this way may be written onto a write-once type recording medium.

<System LSI>

It is desirable that parts of the hardware of the playback device 102 that are mainly composed of logical elements, excluding mechanical structural elements (the BD drive 20 and the local storage 22) and the structural elements (video plane, graphics plane) that are implemented on a high-capacity memory, are realized as one system LSI. This is because the parts mainly composed of logical elements can be integrated with high density.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the playback device 102.

Such a system LSI can be embedded into various types of devices that can play back images, such as a television, game machine, personal computer, one-segment mobile phone, as well as into the playback device 102. The system LSI thus greatly broadens the use of the present invention.

When an elementary buffer, video decoder, audio decoder, and graphics decoder are integrated into a system LSI, it is desirable that the system LSI conforms to the Uniphier architecture.

A system LSI conforming to the Uniphier architecture includes the following circuit blocks.

Data Parallel Processor (DPP)

The DPP is an SIMD-type processor where a plurality of elemental processors perform a same operation. The DPP achieves a parallel decoding of a plurality of pixels constituting a picture by causing operating units, respectively embedded in the elemental processors, to operate simultaneously by one instruction.

Instruction Parallel Processor (IPP)

The IPP includes: a local memory controller that is composed of instruction RAM, instruction cache, data RAM, and data cache; processing unit that is composed of instruction fetch unit, decoder, execution unit, and register file; and virtual multi processing unit that causes the processing unit to execute a parallel execution of a plurality of applications.

MPU Block

The MPU block is composed of: peripheral circuits such as ARM core, external bus interface (Bus Control Unit: BCU), DMA controller, timer, vector interrupt controller; and peripheral interfaces such as UART, GPIO (General Purpose Input Output), and sync serial interface.

Stream I/O Block

The stream I/O block performs data input/output with the drive device, hard disk drive device, and SD memory card drive device which are connected onto the external busses via the USB interface and the ATA packet interface.

AV I/O Block

The AV I/O block, which is composed of audio input/output, video input/output, and OSD controller, performs data input/output with the television and the AV amplifier.

Memory Control Block

The memory control block performs reading and writing from/to the SD-RAM connected therewith via the external buses. The memory control block is composed of internal bus connection unit for controlling internal connection between blocks, access control unit for transferring data with the SD-RAM connected to outside of the system LSI, and access schedule unit for adjusting requests from the blocks to access the SD-RAM.

The following describes a detailed production procedure. First, a circuit diagram of a part to be the system LSI is drawn, based on the drawings that show structures of the embodiments. And then the constituent elements of the target structure are realized using circuit elements, ICs, or LSIs.

As the constituent elements are realized, buses connecting between the circuit elements, ICs, or LSIs, peripheral circuits, interfaces with external entities and the like are defined. Further, the connection lines, power lines, ground lines, clock signals and the like are defined. For these definitions, the operation timings of the constituent elements are adjusted by taking into consideration the LSI specifications, and band widths necessary for the constituent elements are secured. With other necessary adjustments, the circuit diagram is completed.

After the circuit diagram is completed, the implementation design is performed. The implementation design is a work for creating a board layout by determining how to arrange the parts (circuit elements, ICs, LSIs) of the circuit and the connection lines onto the board.

After the implementation design is performed and the board layout is created, the results of the implementation design are converted into CAM data, and the CAM data is output to equipment such as an NC (Numerical Control) machine tool. The NC machine tool performs the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the playback device 102 described in each embodiment above.

It should be noted here that the integrated circuit generated as described above may be called IC, LSI, ultra LSI, super LSI or the like, depending on the level of the integration.

It is also possible to achieve the system LSI by using the FPGA (Field Programmable Gate Array). In this case, a lot of logic elements are to be arranged lattice-like, and vertical and horizontal wires are connected based on the input/output combinations described in LUT (Look-Up Table), so that the hardware structure described in each embodiment can be realized. The LUT is stored in the SRAM. Since the contents of the SRAM are erased when the power is off, when the FPGA is used, it is necessary to define the Config information so as to write, onto the SRAM, the LUT for realizing the hardware structure described in each embodiment.

<Target of AV Playback>

The target of AV playback is not limited to the one defined for the BD-ROM, but may be any content that is composed of a digital stream, map information, and PlayList information. The digital stream is a multiplexed stream obtained by multiplexing the encoded video stream and encoded audio stream that have been encoded by the encoding method such as MPEG2 or MPEG4-AVC. The digital stream is called "VOB" in the DVD Video-Recording standard.

The map information is information that indicates relationships between the address information of the access unit (referring to a playback unit that can be decoded independently) in the above-described video stream, and the playback time on the playback time axis of the video stream. The map information is called "Time Map" in the DVD Video-Recording standard.

The PlayList information is information that defines one or more playback sections by a pair of time information as a start point and time information as an end point.

INDUSTRIAL APPLICABILITY

The playback device of the present invention can be manufactured and sold effectively, namely repetitively and continuously, in the industry for manufacturing devices. Especially, the playback device of the present invention can be used in the movie industry and the commercial equipment industry for producing image contents.

The invention claimed is:

1. A playback device for creating a virtual package, comprising:

an application manager operable to activate an application, as an activated application, when a first recording medium is loaded;

an interface operable to obtain an additional content corresponding to the first recording medium from outside the device, in accordance with a request from the activated application;

a controller operable to write the additional content in a storage area in a second recording medium identified by a file path attached to the additional content, in accordance with the request from the activated application;

a creator operable to create the virtual package by combining content recorded on the first recording medium with the additional content written in the second recording medium based on merge management information written in the second recording medium; and a player operable to play the content recorded on the first recording medium and the additional content written in the second recording medium that are included in the virtual package, in accordance with the request from the activated application, wherein the merge management information indicates a correspondence between a file path of the content included in the virtual package and the file path attached to the additional content, the file path of the content included in the virtual package being in a format of a file system of the first recording medium, the controller judges whether the additional content to be written in the second recording medium in accordance with the request from the activated application is an AV stream, by judging whether a file extension included in the file path attached to the additional content is an appropriate character sequence, when the additional content is to be written in the second recording medium, the controller writes the additional content into a continuous area that is composed of a plurality of continuous empty blocks in the second recording medium when the additional content is judged to be the AV stream and into any of a plurality of separately scattered empty blocks in the second recording medium when the additional content is not judged to be the AV stream, the appropriate character sequence is an extension composed of at most a predetermined number of characters that is less than a number of characters composing a file extension of an AV stream file that is compatible with the format of the file system of the first recording medium, and the player is operable to play the additional content that is judged to be the AV stream by accessing the plurality of continuous empty blocks into which the additional content is written, and operable to play the additional content that is not judged to be the AV stream by accessing the plurality of separately scattered empty blocks into which the additional content is written.

2. The playback device of claim 1, wherein a certificate identifier, an organization identifier, and a medium identifier are assigned to the first recording medium, the continuous area is provided in an additional content storage area in the second recording medium, the additional content storage area being identified by a file path that includes the certificate identifier, the organization identifier, and the medium identifier of the first recording medium.

3. The playback device of claim 2, wherein the format of the file system of the first recording medium allows for each directory name and each file name to include at most 255 characters, the file path attached to the additional content is in an 8.3 format where each directory name and each file name is at most eight characters and each file extension is at most three characters, and the extension composed of at most the predetermined number of characters is composed of at most three characters which is less than a file extension that is in the format of the file system of the first recording medium and is composed of at least four characters.

4. The playback device of claim 3, wherein when writing the additional content in the second recording medium, the controller checks whether there are sufficient empty blocks to constitute the continuous area, by referring to management information in the file system of the 8.3 format, and the continuous area is structured from the plurality of continuous empty blocks that have been confirmed to exist by the check of the controller.

5. The playback device of claim 4, wherein when an excessive empty space remains in the continuous area after the additional content being the AV stream is written into the continuous area, data is not written into the excessive empty space.

6. The playback device of claim 3, wherein the writing of the additional content by the controller is one of an additional writing and an overwriting, when writing the additional content in the second recording medium, the controller checks whether the writing requested by the activated application is the one of the additional writing and the overwriting, by referring to management information in the file system of the 8.3 format, the additional writing includes a process of reading data from the second recording medium onto a memory and then deleting the data from the second recording medium, and a process of obtaining new additional content by combining the additional content requested to be written with the data read onto the memory and then writing the new additional content into the continuous area, and the overwriting includes a process of deleting data from the second recording medium and then writing the additional content requested to be written into the continuous area.

7. The playback device of claim 3, wherein in the second recording medium, a directory corresponding to a certificate identifier, a directory corresponding to an organization identifier, and a directory set corresponding to a medium identifier exist, the directory corresponding to the organization identifier is under the directory corresponding to the certificate identifier, the directory set corresponding to the medium identifier is under the directory corresponding to the organization identifier, the directory set corresponding to the medium identifier includes a plurality of sub-directories in hierarchical layers, and the additional content storage area corresponds to a sub-directory among the plurality of sub-directories that is in a lowest layer among the hierarchical layers.

8. The playback device of claim 3, wherein a medium identifier assigned to the first recording medium is a character sequence composed of at most 32 characters, a directory set corresponding to the medium identifier includes four sub-directories in hierarchical layers, and each of the four sub-directories constituting the directory set corresponding to the medium identifier has a directory name composed of at most eight characters, which is divided from the character sequence composed of the at most 32 characters constituting the medium identifier.

9. The playback device of claim 1, wherein when the additional content to be written is the AV stream, and the continuous area in the second recording medium does not have sufficient empty space, the AV stream is written into any of the plurality of separately scattered empty blocks in the second recording medium, and a user is notified that the AV stream failed to be recorded correctly.

10. The playback device of claim 1, wherein when the additional content to be written is the AV stream, and the continuous area does not have sufficient empty space, the activated application is notified that the writing failed, and a user is notified that a digital stream failed to be recorded.

11. The playback device of claim 1, wherein the player is operable to play the additional content that is judged to be the AV stream by accessing the plurality of continuous empty blocks into which the additional content is written via a burst transfer.

12. A recording method for recording an additional content for creating a virtual package in a recording medium, the recording method being implemented on a computer, the recording method comprising:

activating an application, as an activated application, when a first recording medium is loaded;

obtaining an additional content corresponding to the first recording medium from outside the computer, in accordance with a request from the activated application;

controlling to write the obtained additional content in a storage area in a second recording medium identified by a file path attached to the additional content, in accordance with the request from the activated application;

creating the virtual package by combining content recorded on the first recording medium with the additional content written in the second recording medium based on merge management information written in the second recording medium; and playing the content recorded on the first recording medium and the additional content written in the second recording medium that are included in the virtual package, in accordance with the request from the activated application, wherein the merge management information indicates a correspondence between a file path of the content included in the virtual package and the file path attached to the additional content, the file path of the content included in the virtual package being in a format of a file system of the first recording medium, the controlling judges whether the additional content to be written in the second recording medium in accordance with the request from the activated application is an AV stream, by judging whether a file extension included in the file path attached to the additional content is an appropriate character sequence, when the additional content is to be written in the second recording medium, the additional content is written into a continuous area that is composed of a plurality of continuous empty blocks in the second recording medium when the additional content is judged to be the AV stream and into any of a plurality of separately scattered empty blocks in the second recording medium when the additional content is not judged to be the AV stream, the appropriate character sequence is an extension composed of at most a predetermined number of characters that is less than a number of characters composing a file extension of an AV stream file that is compatible with the format of the file system of the first recording medium, and when the additional content is played in accordance with the request from the activated application, the additional content that is judged to be the AV stream is played by accessing the plurality of continuous empty blocks into which the additional content is written, and the additional content that is not judged to be the AV stream is played by accessing the plurality of separately scattered empty blocks into which the additional content is written.

13. The recording method of claim 12, wherein the additional content that is judged to be the AV stream is played by accessing the plurality of continuous empty blocks into which the additional content is written via a burst transfer.

14. A non-transitory computer-readable recording medium storing a program for causing a computer to execute a process of recording an additional content for creating a virtual package onto a recording medium, the program causing the computer to execute:

activating an application, as an activated application, when a first recording medium is loaded;

obtaining an additional content corresponding to the first recording medium from outside the computer, in accordance with a request from the activated application;

controlling to write the obtained additional content in a storage area in a second recording medium identified by a file path attached to the additional content, in accordance with the request from the activated application;

creating the virtual package by combining content recorded on the first recording medium with the additional content recorded on the second recording medium based on merge management information written in the second recording medium; and playing the content recorded on the first recording medium and the additional content written in the second recording medium that are included in the virtual package, in accordance with the request from the activated application, wherein the merge management information indicates a correspondence between a file path of the content included in the virtual package and the file path attached to the additional content, the file path of the content included in the virtual package being in a format of a file system of the first recording medium, the controlling judges whether the additional content to be written in the second recording medium in accordance with the request from the activated application is an AV stream, by judging whether a file extension included in the file path attached to the additional content is an appropriate character sequence, when the additional content is to be written in the second recording medium, the additional content is written into a continuous area that is composed of a plurality of continuous empty blocks in the second recording medium when the additional content is judged to be the AV stream and into any of a plurality of separately scattered empty blocks in the second recording medium when the additional content is not judged to be the AV stream, the appropriate character sequence is an extension composed of at most a predetermined number of characters that is less than a number of characters composing a file extension of an AV stream file that is compatible with the format of the file system of the first recording medium, and when the additional content is played in accordance with the request from the activated application, the additional content that is judged to be the AV stream is played by accessing the plurality of continuous empty blocks into which the additional content is written, and the additional content that is not judged to be the AV stream is played by accessing the plurality of separately scattered empty blocks into which the additional content is written.

15. The non-transitory computer-readable recording medium of claim 14, wherein the additional content that is judged to be the AV stream is played by accessing the plurality of continuous empty blocks into which the additional content is written via a burst transfer.

* * * * *